United States Patent
Caruso et al.

(10) Patent No.: US 11,545,852 B1
(45) Date of Patent: Jan. 3, 2023

(54) SYSTEM AND METHOD FOR REMOTE MONITORING

(71) Applicant: CABLE TELEVISION LABORATORIES, INC., Louisville, CO (US)

(72) Inventors: Scott L. Caruso, Arvada, CO (US); Darshak Thakore, Broomfield, CO (US); Stephen Glennon, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/337,275

(22) Filed: Jun. 2, 2021

Related U.S. Application Data

(63) Continuation-in-part of application No. 16/727,077, filed on Dec. 26, 2019, now Pat. No. 11,088,568, which is a continuation-in-part of application No. 16/513,676, filed on Jul. 16, 2019, now Pat. No. 11,108,268.

(60) Provisional application No. 63/088,120, filed on Oct. 6, 2020, provisional application No. 63/074,585, filed on Sep. 4, 2020, provisional application No. 63/033,472, filed on Jun. 2, 2020, provisional application No. 62/789,396, filed on Jan. 7, 2019, provisional application No. 62/785,658, filed on Dec.
(Continued)

(51) Int. Cl.
| | | |
|---|---|---|
| G08C 19/22 | (2006.01) | |
| H04Q 9/00 | (2006.01) | |
| H02J 13/00 | (2006.01) | |
| H04L 67/12 | (2022.01) | |
| H04L 41/14 | (2022.01) | |
| H04L 41/0681 | (2022.01) | |

(52) U.S. Cl.
CPC .. *H02J 13/00002* (2020.01); *H02J 13/00006* (2020.01); *H04L 41/0681* (2013.01); *H04L 41/145* (2013.01); *H04L 67/12* (2013.01)

(58) Field of Classification Search
CPC .......... H02J 13/00002; H02J 13/00006; H04L 41/0681; H04L 41/145; H04L 67/12
USPC ..................................................... 340/870.07
See application file for complete search history.

(56) References Cited

U.S. PATENT DOCUMENTS

| | | |
|---|---|---|
| 10,892,838 B2 | 1/2021 | Cruickshank, III et al. |
| 2012/0265355 A1 | 10/2012 | Bernheim et al. |

(Continued)

FOREIGN PATENT DOCUMENTS

| | | |
|---|---|---|
| CN | 103293421 A | 9/2013 |

OTHER PUBLICATIONS

Meng Zhou, Lanlan Rui, Xuesong Qium Zhe Xia, Biyao Li, Evaluation of the Node Importance in Power Grid Communication Network and Analysis of Node Risk, Apr. 23-27, 2018, pp. 1-5 (Year: 2018).

*Primary Examiner* — Tanmay K Shah
(74) *Attorney, Agent, or Firm* — PdZ Patent Law, PLLC

(57) ABSTRACT

A method for remote monitoring includes (1) generating first sensor data from a first sensor at a first network node of a communications network and (2) sending the first sensor data from the first sensor to a second network node that is remote from the first network node, via the communications network. The first network node is powered from an electrical power grid that is separate from the communications network. The first sensor data may be raw sensor data and/or lossless sensor data.

19 Claims, 25 Drawing Sheets

Related U.S. Application Data

27, 2018, provisional application No. 62/698,694, filed on Jul. 16, 2018.

(56) References Cited

U.S. PATENT DOCUMENTS

| | | | |
|---|---|---|---|
| 2013/0346768 A1* | 12/2013 | Forbes, Jr. | H02J 3/388 |
| | | | 713/310 |
| 2018/0159879 A1 | 6/2018 | Mestha et al. | |
| 2018/0260561 A1* | 9/2018 | Mestha | G06F 21/554 |
| 2020/0218973 A1 | 7/2020 | Pi et al. | |

* cited by examiner

| 0 | | | 15 | 16 | | | 31 |
|---|---|---|---|---|---|---|---|
| HdrVer | TimeSrc | | MmtType | SensorType | | Seq | Flags |
| SensorID | | | | | | | |
| TimeSeconds | | | | | | | |
| TimeNs | | | | | | | |
| LaRes | LoRes | | AltRes | Reserved | | | |
| Lattitude | | | | | | | |
| Longnitude | | | | | | | |
| Altitude | | | | | | | |
| SampleCount | | | | SampleWidth | | | Rsv |
| SampleRate | | | | SampleFormat | | | |
| SampleFSDInt | | | | SampleFSDFrac | | | |
| Samples | | | | | | | |

FIG. 26

SYSTEM AND METHOD FOR REMOTE MONITORING

RELATED APPLICATIONS

This application is a continuation in part of U.S. patent application Ser. No. 16/727,077, filed on Dec. 26, 2019, which is a continuation in part of U.S. patent application Ser. No. 16/513,676, filed on Jul. 16, 2019, which claims the benefit of priority to U.S. Provisional Patent Application No. 62/698,694, filed on Jul. 16, 2018, and U.S. Provisional Patent Application No. 62/789,396, filed on Jan. 7, 2019. U.S. patent application Ser. No. 16/727,077 also claims the benefit of priority to U.S. Provisional Patent Application No. 62,785,658, filed on Dec. 27, 2018, and U.S. Provisional Patent Application No. 62/789,396, filed on Jan. 7, 2019. This application also claims benefit of priority to U.S. Provisional Patent Application No. 63/033,472, filed on Jun. 2, 2020, U.S. Provisional Patent Application No. 63/074,585, filed on Sep. 4, 2020, and U.S. Provisional Patent Application No. 63/088,120, filed on Oct. 6, 2020. Each of the aforementioned patent applications is expressly incorporated by reference herein in its entirety.

BACKGROUND

The field of the disclosure relates to real-time and interval data collection using massive distributed sensor networks, analysis, and anomaly detection for, in one implementation, power grid systems.

Current monitoring sensor technologies are limited by the need for sufficient power (either wired or through batteries), communications capabilities, and real estate at appropriate locations for effective data collection. Power grids are traditionally monitored through costly installation of new sensors with wireless communication capabilities or through monitoring equipment located at power substations. Both solutions are costly and plagued by delayed data reporting, loss of power when the energy grid suffers a failure, and coarse data resolution. For example, a single monitored substation may typically serve roughly 1000 or more homes. When power fails at these sites, any sensors connected directly to the power network lose both power and communication capabilities until such a time that power grid is restored. In a power grid embodiment, there can be a serious public safety issues while power is partially or totally offline. Additionally, power grid metrics today suffer from fragmentation issues due to the large number of individual power companies, delays in detection reporting times, and the lack of intelligence with secondary power within the collection framework.

SUMMARY

The described techniques relate to improved methods, systems, devices, and apparatuses that support distributed, secure, power grid data and other data collection, consensual voting analysis, and situational awareness and anomaly detection. Generally, the described techniques provide for a system of broadly distributed, secure, cloud-supported and communications-equipped sensors connected to a power grid or other network. These sensors may be coupled with a communications network different than the power grid network and may be configured to report, via the communications network, data (e.g., measurements taken by the sensor) to a central processing application. The central processing application may process, analyze, and monitor the data over time. For example, the central processing application may determine a normalized range for a metric indicated by the data based on a first set of data received from a set of the sensors. The central processing application may compare new data received from the sensors to the normalized range and generate data indicating a relationship between the new data and the normalized range. For example, the centralized processing application may determine a consensus value of the new data. In another example, the centralized processing application may rank the new data according to a difference between the values of the new data and the normalized range. Thus, the central processing application may determine a sensor (e.g., associated with the new data) that is most out of range. Additionally or alternatively, the central processing application may detect and interpret anomalies at various geographies (including regional national, and international levels, and with multiple utilities or other entities).

A method is described. In an embodiment, the method may include receiving, via a communications network from a set of network nodes of the communications network, a first set of data indicating a metric (e.g., a metric associated with a power grid), the communications network configured to provide a communication service to end devices at locations serviced by the power grid, where the set of network nodes use the power grid as a primary source of power, determining a normalized range for the metric based on the first set of data, receiving, via the communications network from the set of network nodes of the communications network, a second set of data indicating the metric, and generating a third set of data indicating a relationship between the second set of data and the normalized range for the metric.

An apparatus is described. The apparatus may include a processor, memory in electronic communication with the processor, and instructions stored in the memory. The instructions may be executable by the processor to cause the apparatus to receive, via a communications network from a set of network nodes of the communications network, a first set of data indicating a metric (e.g., a metric associated with a power grid), the communications network configured to provide a communication service to end devices at locations serviced by the power grid, where the set of network nodes use the power grid as a primary source of power, determine a normalized range for the metric based on the first set of data, receive, via the communications network from the set of network nodes of the communications network, a second set of data indicating the metric, and generate a third set of data indicating a relationship between the second set of data and the normalized range for the metric.

Another apparatus is described. The apparatus may include means for receiving, via a communications network from a set of network nodes of the communications network, a first set of data indicating a metric (e.g., a metric associated with a power grid), the communications network configured to provide a communication service to end devices at locations serviced by the power grid, where the set of network nodes use the power grid as a primary source of power, means for determining a normalized range for the metric based on the first set of data, means for receiving, via the communications network from the set of network nodes of the communications network, a second set of data indicating the metric, and means for generating a third set of data indicating a relationship between the second set of data and the normalized range for the metric.

A non-transitory computer-readable medium storing code is described. The code may include instructions executable by a processor to receive, via a communications network from a set of network nodes of the communications network, a first set of data indicating a metric (e.g., a metric associated with a power grid), the communications network configured to provide a communication service to end devices at locations serviced by the power grid, where the set of network nodes use the power grid as a primary source of power, determine a normalized range for the metric based on the first set of data, receive, via the communications network from the set of network nodes of the communications network, a second set of data indicating the metric, and generate a third set of data indicating a relationship between the second set of data and the normalized range for the metric.

Some examples of the method, apparatuses, and non-transitory computer-readable medium described herein may further include operations, features, means, or instructions for identifying a fourth set of data including an ordering, for each of the set of network nodes, of a set of quantized values according to values determined from the second set of data corresponding to the each of the set of network nodes, and determining a consensus value from the ordered sets of quantized values associated with the set of network nodes, where the third set of data includes the consensus value.

In some examples of the method, apparatuses, and non-transitory computer-readable medium described herein, the values determined from the second set of data include differences between the second set of data and the normalized range for the metric.

In some cases of the method, apparatuses, and non-transitory computer-readable medium described herein, determining the consensus value may include operations, features, means, or instructions for weighting one or more of the quantized values of the ordered set of quantized values for one or more of the set of network nodes based on a function of respective values of the second set of data for the one or more of the set of network nodes, a function of a difference between the ordered set of quantized values for a previous determination of the consensus value and the previously determined consensus value, an amount of traffic communicated via the one or more of the set of network nodes, a connectivity metric for the one or more of the set of network nodes, a relative network impact of unavailability of the one or more of the set of network nodes, or a combination thereof.

In some instances of the method, apparatuses, and non-transitory computer-readable medium described herein, identifying the fourth set of data may include operations, features, means, or instructions for identifying the set of quantized values for the metric, and ordering the set of quantized values for each of the set of network nodes according to the values of the third set of data to generate the fourth set of data.

In some examples of the method, apparatuses, and non-transitory computer-readable medium described herein, the second set of data received from the set of network nodes includes the fourth set of data.

Some cases of the method, apparatuses, and non-transitory computer-readable medium described herein may further include operations, features, means, or instructions for triggering an alert based on determining that the consensus value satisfies a threshold.

Some instances of the method, apparatuses, and non-transitory computer-readable medium described herein may further include operations, features, means, or instructions for receiving, via the communications network from the set of network nodes of the communications network, a fourth set of data indicating a second metric (e.g., a second method associated with the power grid) that is different than the first metric, and ranking the second set of data and the fourth set of data based on a magnitude of a difference between respective values of the second set of data and the fourth set of data and respective normalized ranges of the first metric and the second metric, where the third set of data may be based on the ranking.

In some examples of the method, apparatuses, and non-transitory computer-readable medium described herein, generating the third set of data may include operations, features, means, or instructions for accumulating the rankings of the second set of data and the fourth set of data.

In some cases of the method, apparatuses, and non-transitory computer-readable medium described herein, generating the third set of data may include operations, features, means, or instructions for weighting the rankings of the second set of data and the fourth set of data.

In some instances of the method, apparatuses, and non-transitory computer-readable medium described herein, the weighting may be based on a function of respective values of the rankings of the second set of data and the fourth set of data, a function of a difference between the second set of data and the fourth set of data and normalized ranges for the first metric and the second metric, an amount of traffic communicated via respective network nodes of the set of network nodes, a connectivity metric for respective network nodes the set of network nodes, a relative network impact of unavailability of respective network nodes of the set of network nodes, or a combination thereof.

Some examples of the method, apparatuses, and non-transitory computer-readable medium described herein may further include operations, features, means, or instructions for receiving a request for the third set of data associated with a geographical region including a subset of the set of network nodes from a third party, determining the third set of data for the geographical region based on the second set of data for the subset of the set of network nodes, and communicating the third set of data for the geographical region to the third party.

In some cases of the method, apparatuses, and non-transitory computer-readable medium described herein, determining the third set of data for the geographical region may include operations, features, means, or instructions for determining the third set of data based on the second set of data for the subset of the set of network nodes and at least one network node of the set of network nodes not within the subset of the set of network nodes.

In some instances of the method, apparatuses, and non-transitory computer-readable medium described herein, determining the third set of data for the geographical region may include operations, features, means, or instructions for weighting values determined from the second set of data for the subset of the set of network nodes and the at least one network node based on locations of the subset of the set of network nodes and the at least one network node relative to the geographical region.

In some examples of the method, apparatuses, and non-transitory computer-readable medium described herein, the set of network nodes may be coupled with respective secondary power sources separate from the power grid.

In some cases of the method, apparatuses, and non-transitory computer-readable medium described herein, the metric associated with the power grid corresponds to a voltage, a current, a phase, a phase jitter, or a frequency.

In some instances of the method, apparatuses, and non-transitory computer-readable medium described herein, the set of network nodes include head-ends for fiber communication links of the communications network.

Another method is described. In an embodiment, a method for remote monitoring includes (1) generating first sensor data from a first sensor at a first network node of a communications network, the first network node being powered from an electrical power grid that is separate from the communications network, and (2) sending the first sensor data from the first sensor to a second network node that is remote from the first network node, via the communications network.

In an embodiment, sending the first sensor data from the first sensor to the second network node includes sending the first sensor data via a secure connection between the first sensor and the second network node.

In an embodiment, there is a backup electrical power source at the first network node that is capable powering the first network node when the electrical power grid is unavailable to provide electrical power, In an embodiment, the communications network is a wireline communications network.

In an embodiment, the first sensor data is raw sensor data generated by the first sensor.

In an embodiment, sending the first sensor data from the first sensor to the second network node includes sending the first sensor data from the first sensor to the second network node in real-time.

In an embodiment, the first sensor data is substantially lossless.

In an embodiment, the method further includes generating data packets for transmission from the first sensor to the second network node, the data packets including the first sensor data.

In an embodiment, the data packets comply with a raw data transmission protocol (RDTP).

In an embodiment, the RDTP is a binary protocol.

In an embodiment, the method further includes including timing data in the data packets.

In an embodiment, the timing data is free-running timing data.

In an embodiment, the timing data is global positioning system (GPS) timing data.

In an embodiment, the timing data complies with a time protocol of the communications network.

In an embodiment, the timing data complies with an Institute of Electrical and Electronics Engineers (IEEE) 1588 Precision Time Protocol.

In an embodiment, the method further includes including location data in the data packets.

In an embodiment, the method further includes establishing a first private network encompassing the first sensor and the second network node.

In an embodiment, the private network is selected from the group consisting of a virtual private network and a Micronet.

In an embodiment, the method further includes authenticating the first sensor data.

In an embodiment, the method further includes sending the first sensor data from the first sensor to a third network node that is remote from the first network node, via the communications network.

In an embodiment, the method further includes (1) establishing a first private network encompassing the first sensor and the second network node and (2) establishing a second private network encompassing the first sensor and the third network node.

In an embodiment, the method further includes (1) sending the first sensor data to the second network node at a first resolution and (2) sending the first sensor data to the third network node at a second resolution that is different from the first resolution.

In an embodiment, the method further includes storing the first sensor data at the first network node.

In an embodiment, the method further includes storing a first subset of the first sensor data at the first network node while the communications network is unavailable.

In an embodiment, the method further includes sending the first subset of the first sensor data from the first network node to the second network node via the communications network when the communications network is available.

In an embodiment, the first sensor is selected from the group consisting of a voltage sensor, a current sensor, a temperature sensor, a humidity sensor, a visible light sensor, an infrared light sensor, an ultraviolet light sensor, a radio-frequency signal sensor, an air quality sensor, a smoke sensor, a radiation sensor, an electromagnetic pulse sensor, a motion sensor, an audio sensor, and a moisture sensor.

In an embodiment, the first sensor is a virtual sensor.

In an embodiment, the method further includes (1) generating second sensor data from a second sensor and (2) sending the second sensor data from the second sensor to the second network node, via the communications network.

In an embodiment, the second sensor data is lossless sensor data.

In an embodiment, the second sensor is located at the first network node.

In an embodiment, the second sensor is located at a third network node that is different from each of the first and second network nodes.

In an embodiment, the method further includes sending the second sensor data from the second sensor to a fourth network node that is remote from the third network node, via the communications network.

In an embodiment, (1) the first sensor is a voltage sensor, and (2) the second sensor is selected from the group consisting of a voltage sensor, a current sensor, a temperature sensor, a humidity sensor, a visible light sensor, an infrared light sensor, an ultraviolet light sensor, a radio-frequency signal sensor, an air quality sensor, a smoke sensor, a radiation sensor, an electromagnetic pulse sensor, a motion sensor, an audio sensor, and a moisture sensor.

In an embodiment, the first sensor data represents a characteristic of the electrical power grid at the first network node.

In an embodiment, the electrical power grid is a distribution electrical power distribution grid.

In an embodiment, the first sensor data comprises medical data.

In an embodiment, the second network node is selected from the group consisting of an aggregation server and a monitoring server.

In an embodiment, the first network node is one or more of a cable fiber node, a telecommunications remote terminal (RT), an optical network unit (ONU), a cellular wireless base station, and a satellite ground station.

Another apparatus is described. In an embodiment, a monitoring device for monitoring one or more characteristics of a node site of a communications network includes (1) a first sensor element configured to generate first sensor data representing a first characteristic at the node site, (2) a communication subsystem configured to send the first sensor data from the first sensor element to a remote network node, via the communications network, and (3) power supply circuitry configured to power the first sensor and the communication subsystem from an electrical power source of the node site.

In an embodiment, the communication subsystem is further configured to send the first sensor data from the first sensor element to the remote network node such that the first sensor data is lossless.

In an embodiment, the communication subsystem is further configured to generate data packets including the first sensor data for transmission from the first sensor element to the remote network node.

In an embodiment, the communications subsystem is further configured to generate the data packets such that the data packets comply with a raw data transmission protocol (RDTP).

In an embodiment, the communication subsystem is further configured to include timing data in the data packets.

In an embodiment, the monitoring device further includes a global positioning system (GPS) module configured to generate the timing data.

In an embodiment, the monitoring device further includes a second sensor element configured to generate second sensor data, where: (1) the communication subsystem is further configured to send the second sensor data from the second sensor element to the remote network node, via the communications network, and (2) the power supply circuitry is further configured to power the second sensor element from the electrical power source of the node site.

In an embodiment, the first sensor element is configured to sense a characteristic selected from the group consisting of voltage, current, temperature, humidity, visible light, infrared light, ultraviolet light, radio-frequency signals, air quality, smoke, radiation, electromagnetic pulses, audio, and moisture.

In an embodiment, the monitoring device further includes a storage subsystem configured to store the first sensor data.

BRIEF DESCRIPTION OF THE DRAWINGS

FIG. 26 illustrates one example of a data packet payload complying with a raw data transport protocol, according to an embodiment.

Figure 1:
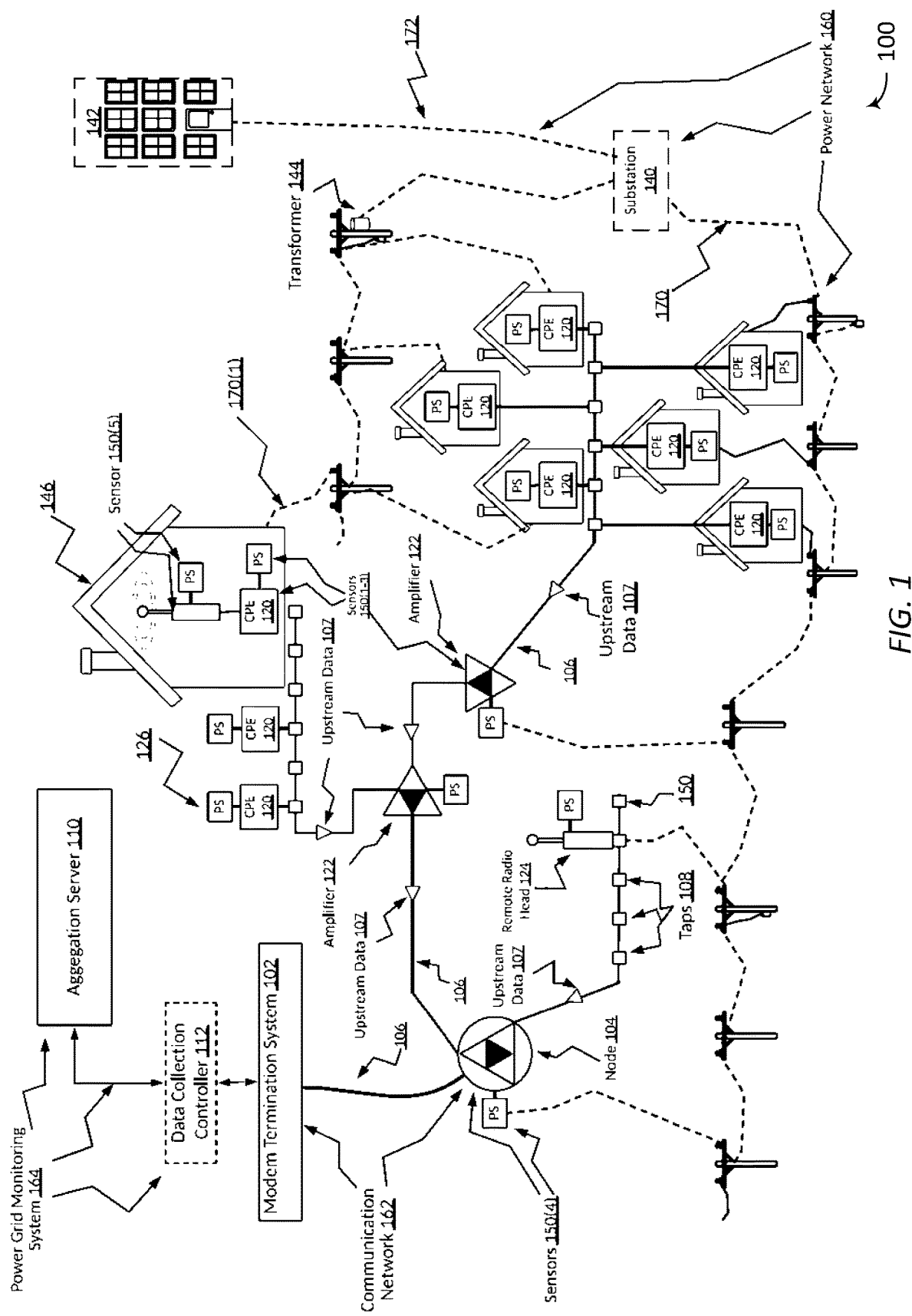
FIGS. 1-3 illustrate examples of a system that supports distributed, secure, data collection, consensual voting analysis, and situational awareness and anomaly detection in accordance with aspects of the present disclosure.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

The present systems and methods herein advantageously utilize an adjacent, optionally secure, and alternatively powered communications network to collect data metrics and/or record the status of, for example, a power grid or other systems(s) and/or network(s). For example, a communications network may be adjacent to the power grid and may be coupled with a set of sensors that are configured to collect data metrics of the power grid. As another example, a communications network may be coupled with a set of sensors that are configured to collect environmental data metrics. Examples of possible environmental metrics include, but are not limited to, temperature, humidity, visible light, infrared light, ultraviolet light, radio-frequency signals, air quality, presence of smoke, presence of radiation, presence of electromagnetic pulses, detected motion, audio, presence of moisture, etc. The present systems and methods may be implemented to augment or, in some circumstances, replace conventional data metrics and power monitoring practices at a more reliable and granular level. Conventional systems may include costly dedicated power monitoring units with mobile wireless connections (e.g., LTE, 3G, satellite etc.) at substations (which typically serve about 1000 homes) or attached to specific meters which must be collected manually through near-field wireless technologies (e.g., NFC, Bluetooth, etc.). The adjacent, optionally secure communications network described and illustrated herein may include, for example, an adjacent communications network having communications service nodes (typically serving 1-500 homes) configured as a data metrics system for monitoring and optionally analyzing a network, such as but not limited to one or more power grids. The communications service nodes may be supported by a secondary power source (e.g., may receive primary power from the power grid and secondary or backup power from a secondary power source such as one or more batteries or a backup generator). For ease of explanation, the following description references broadband communication network(s) or a fiber communications network as exemplary embodiments of the communication network, which is configured with a secondary power capability. A person of ordinary skill in the art, upon reading and comprehending the present description and associated illustrations, will understand that other examples of communications network technologies may be implemented according to the novel and advantageous principles herein.

The communications network may include a set of network nodes (e.g., communications service nodes). For example, the communications network may be a fiber communications network including network nodes. The network nodes may be coupled with a head-end for the fiber communications network by a communication line (e.g., Wireless local area, coaxial cable, fiber-optic cable, digital subscriber line, line of sight wireless). The network nodes may also be coupled with the power grid. That is, the network nodes may receive and use the power grid as a primary power source. Each network node may include one or more sensors configured to measure a metric, such as a metric associated with the power grid and/or an environmental metric. The communications network may communicate data collected by the sensors to a central processing application. The central processing application may determine a normalized range for the metric based on the data collected from the set of sensors. The communications network may communicate new sets of data (e.g., indicating values of the metric collected by the set of sensors) to the central processing application. The central processing application may compare the new sets of data to the normalized range and generate data indicating a relationship between the new data and the normalized range. For example, the central processing application may generate data indicating a consensus value of the new data. In another example, the central processing application may identify a sensor providing data that is most out of range (e.g., most different than the normalized range). Additionally or alternatively, the central processing application may perform geographical or group analysis of values from one type of sensor. For example, the central processing application may determine a most out of range sensor for a geographical region.

While the embodiments described herein are not limited to collecting power grid data, certain embodiments are particularly useful for reliable collection and analysis of power grid network metrics on a geographic scale beyond the broad coverage of any individual electricity provider's network, for example. There are numerous power utility companies that serve a small portion of the entire energy market. This results in fragmented data from one or more small utility companies that each cover a portion of a geographic area. Collection and analysis of data metrics of a power grid across more traditional geographies and markets such as neighborhoods, cities, regions, states, territories, nations, or other geographies may improve data metric analysis of the power grid. An aggregated data source or scale adjustable data source may enable valuable monitoring and analysis. For example, key analyses on network and infrastructure security on nationwide or global scale may be possible with a comprehensive data stream that spans multiple utility markets in order to analyze broader trends, outages, or anomalies.

Some exemplary embodiments described herein provide systems and methods for monitoring and maintaining a backup or alternative stream of data at a greater detail than is currently achievable with low resolution power grid substation data. In one embodiment of invention herein each monitoring sensor covers a much smaller geographic area, typically only 1-500 homes depending on the architecture of the deployment of the out-of-band or adjacent network. In these embodiments an alternative data stream may be leveraged to protect, for example, first responders, network technicians, etc. by providing a high quality, detailed/granular, alternatively powered, communicatively coupled out-of-band picture/data of a power grid's status via a variety of possible metrics (including, but not limited to, voltage, current, frequency, direction of electricity flow, quality of the electricity, voltage/current variance, etc.) during normal activity or outage or brown out events providing critically improved situational awareness to, for example first responders, emergency personnel, maintenance personnel, administrators, etc. Nevertheless, a person of ordinary skill in the art will understand, upon reading and comprehending the present application, how the systems and methods described herein apply to other fields (e.g., first responders, commercial or residential insurance, smart contracts, power generation siting, power transaction markets, etc.) where tracking the status and metrics of a network (such as a power grid) through an adjacent communications network with independent/secondary power is valuable.

In some instances, the data collected in real-time can also be securely stored in an aggregation and processing server(s) or, alternatively, in other secure storage, in order to construct a historic dataset. Such a dataset enables analysis and could be leveraged for a variety of uses including, but not limited to, power quality metrics over time, restoration and recovery prediction capabilities, or other analysis. In one exemplary embodiment a historical dataset and quality analysis is used to improve insurance policy writing inputs and improve overall cost prediction in a variety of scenarios where the power grid is an integral factor.

The highly granular nature of sensor data combined with in-network machine learning enables a system with significant event (e.g., outage, cybersecurity breach, weather or other environmental event, etc.) prediction capabilities due to the significant amount of raw data input in real-time and historically. Further enabling the predictive processing value and monitoring applications is the agnostic platform nature of the adjacent communications network and back-up power. While power grid equipment can easily monitor characteristics of electricity (e.g., voltage, current, resistance), because of its modular upgradability and underlying out-of-band communications and power supplies, equipment on a communications network can be easily configured to monitor an extremely wide range of network, environmental, atmospheric, and other conditions, even when power on the power grid is unreliable. This flexibility of data input coupled with unconfined geospatial boundaries enables next-generation monitoring, analysis, and prediction for critical infrastructure, such as power grids.

Aspects of the disclosure are initially described in the context of systems. Aspects of the disclosure are further illustrated by and described with reference to a flowchart, a system, an aggregate sensor data visualization, and process flows that relate to distributed, secure, power grid data collection, consensual voting analysis, and situational awareness and anomaly detection.

FIG. 1 illustrates an example of a system 100 that supports distributed, secure, data collection, consensual voting analysis, and situational awareness and anomaly detection in accordance with aspects of the present disclosure. System 100 may include a communications network 162 that is adjacent to a power grid 160. The communications network 162 may be coupled with a set of sensors 150 (distributed data collection elements). The sensors 150 may collect data related to a metric of the power grid 160, and system 100 is discussed herein primarily with respect to power grid 160 data collection. However, it is understood that sensors 150 are not limited to power grid data collection. To the contrary, sensors 150 could be configured to collect numerous other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture. Additionally, data collection controller 112 and aggregation server 110 are not limited to use in power grid monitoring. instead, the elements can facilitate monitoring and analysis of other data, including but not limited to data related to temperature, humidity, visible light, infrared light, ultraviolet light, radio-frequency signals, air quality, presence of smoke, presence of radiation, presence of electromagnetic pulses, motion, audio, and presence of moisture.

The communications network 162 may communicate the data to the aggregation server 110 by the modem termination system 102 and the data collection controller 112. This may enable the power grid monitoring system 164 to collect substantially real-time metrics (e.g., multiple readings on a per second or sub-minute basis) and/or interval data (e.g., 1-minute, 5-minute, or hourly readings).

Power grid 160 is shown to include a generation station 142 connected through a network of transmission power lines 172 to a substation 140. Substation 140 is connected with a network of distribution power lines 170 to a series of transformers 144 connected together by power lines 170. Distribution power lines 170(1) connect the power grid to end devices of power users, such as residential homes 146.

Communication network 162 is shown to include a modem termination system 102, a network node 104 (although more network nodes may be included), amplifiers 122 linked through communications lines 106 (such as DSL, coaxial cable, fiber optic cable, wireless links such as LTE wireless links, fifth generation (5G) cellular wireless links, sixth generation (6G) cellular wireless links, Wi-Fi wireless links, line of sight wireless links, etc.), and taps 108. An exemplary communications network 162 typically includes a head-end (not shown) connected with one or more modem termination system(s) 102. Taps 108 are in communication with communications network delivery technologies, such as remote radio heads 124 (such as a Wi-Fi access point, a small cell or a microcell or similar, etc.) or a customer premise equipment (CPE) 120 (e.g., a modem, a laptop, a smart phone, a tablet, a smart TV, small cell (or similar), or similar networking devices).

Power grid monitoring system 164 is shown to include an aggregation server or servers 110 (also understood as sensor data processing elements) connected, directly or indirectly, with a modem termination system 102. Aggregation server 110 may optionally be connected with a modem termination system 102 directly or through an intermediary data collection controller 112.

In an embodiment, the communications network 162 may be coupled with power supplies (PS) 126 that supply primary electrical power to network components (such as network nodes 104, some versions of taps 108, amplifiers 122, or CPE 120) throughout a communications network 162. PS 126 may condition, received conditioned power, or be directly or indirectly coupled to a power conditioning element (not shown). Upstream data 107 related to the power/electricity quality or power/electricity metrics of the power grid may be derived from the power conditioning elements, which are utilized to regulate and condition the power provided to communication network 162's active components, such as but not limited to amplifiers 122 and network nodes 104, see below for more details. The PSs 126 may couple the communications network 162 with the power grid 160. That is, the PSs 126 may condition or receive conditioned power via the power grid 160 and provide the conditioned power to the communications network 162 (e.g., supplying primary power to the network nodes 104). Thus, both the raw distribution-side power and the conditioned power side of grid 160 may be monitored.

Power grid monitoring system 164 is coupled with power grid 160 through an aggregation server 110 through the communications network 162. The power grid monitoring system 164 utilizes the aggregation server 110 to connect to a modem termination system 102 within the communications network 162. The communications network 162 may contain the plurality of PSs 126. For purposes of clarity, the PSs 126 are collectively also shown as sensors 150 in system 100 when utilized by the power grid monitoring system 164. However, in some cases, the sensors 150 may be distinct from the PSs 126. For example, the sensors 150 may be coupled with a network node 104 or included within the network node 104. For example, the sensors 150 may measure power as provided by the PSs 126 to the network nodes 104. In either case, the sensors 150 may be coupled with a PS 126. In some cases, one or more PSs 126 may include or be coupled with a secondary or backup power source. Thus, if the power grid 160 experiences a loss of power, the sensors 150 may still receive power (e.g., from the PSs 126) and may still be able to communicate data to the modem termination system 102.

Through its components and connections to the power grid 160 and communication network 162, power grid monitoring system 164 may monitor, for example, power grid metrics, such as but not limited to status (on/off), voltage, current, reflections, frequency, phase, resistance, etc. Power grid monitoring system 164, through its association to communication network 162, has an independent communication path for conveying power grid 160 metrics. Power grid monitoring system 164 may also have an independent power supply (e.g., via PSs 126 that include or are coupled with a secondary power source) that provides electricity to at least power grid monitoring system 164 if power grid 160 loses capacity or has reduced or limited capacity. In such a situation power grid monitoring system 164 is capable of extended monitoring and communication regarding the status of power grid 160 even when power grid 160 does not provide electricity to power grid monitoring system 164 and communication network 162.

In some embodiments, the power grid monitoring system 164 of system 100 and aggregation server 110 may collect a variety of different power grid metrics simultaneously. In this example some sensors 150 collect real-time measurements while other sensors 150 within the same power grid monitoring system 164 collect interval power grid data at, for example, 1-minute, 5-minute, or 1-hour intervals. The sensors 150 may be configured to collect data related to a metric such as a voltage, a current, a phase, a phase jitter, or a frequency associated with the power grid 160. Additionally or alternatively, the sensors 150 may be configured to collect data related to humidity, temperature, light, sound, particle or chemical readings. In some embodiments of power grid monitoring system 164 all sensors 150 may be deployed for a single purpose and collect all types of data. In some other embodiments of the power grid monitoring system 164, a first portion of the sensors 150 may be configured to collect a first metric (e.g., voltage) while a second portion of the sensors 150 are configured to collect a second metric (e.g., current, temperature, or humidity). In other implementations, aggregation server 110 aggregates and analyzes a combination of mixed sensor 150 types and transmission frequencies and pathways.

In one embodiment, sensors 150(1-5) may be part of communications network nodes and/or their power supplies 150(4), or customer network equipment and/or their power supplies attached to the power grid 150(1-3). In this embodiment modem termination systems 102, network amplifiers 150(1-3), remote radio heads 124, and/or taps 108 may be, act as or include all or a portion of sensors 150. Additionally, indoor or outdoor wireless communications equipment 150(5) (e.g., small cells, femtocells, picocells, Wi-Fi access points, eNodeBs, gNodeBs, or similar devices) could be used. System 100 is illustrated as an exemplary architecture to implement the power grid monitoring system 164 according to various embodiments of the present disclosure. Other architectures are contemplated by the present inventors, which do not depart from the scope herein. Furthermore, for ease of explanation, redundant components that may be implemented within system 100 are not illustrated, nor are link-level objects or implementations, security authentication objects/sequences/implementations, or other components that may be conventionally utilized in a communications network for communication, availability, or security purposes.

In an exemplary embodiment of power grid monitoring system 164, sensor 150 readings (e.g., data sets indicating the detected value of a metric of the power grid 160) are sent directly or indirectly via the communications network 162 to an aggregation server 110, where it is processed. In some cases, the sensor 150 readings may be sent to the aggregation server 110 by an indirect communication link. For example, the sensor 150 readings may pass through a network node 104 first as shown by communication lines 106 or the modem termination system 102. In one embodiment, aggregation server 110 utilizes an optional data collection controller 112 to request and securely receive the sensor 150 readings from the power grid monitoring system 164 network. Alternatively, the upstream data 107 is sent to aggregation server 110, which may exist on the internet, where it is accumulated, processed, and analyzed.

Figure 2:
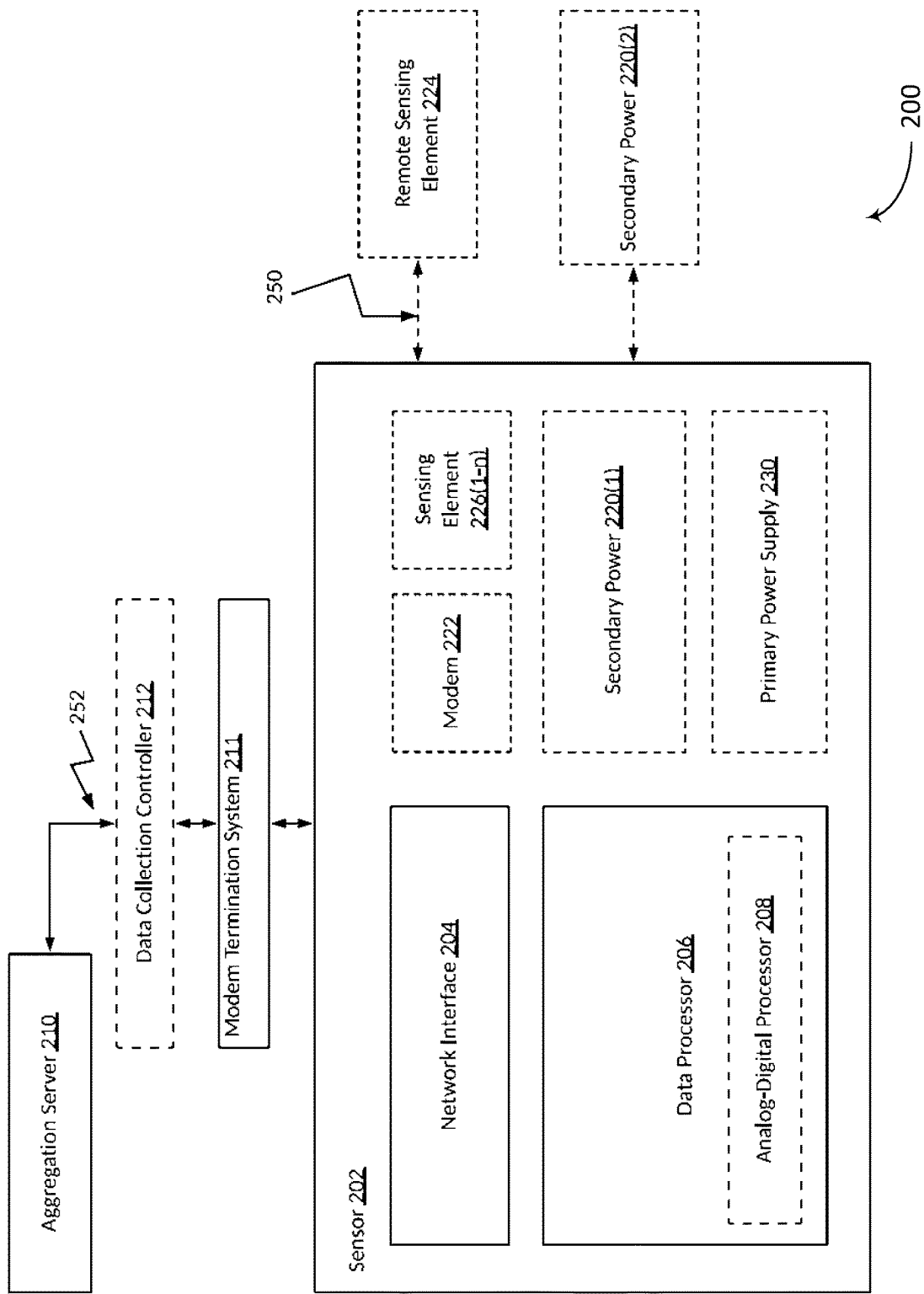

FIG. 2 illustrates an example of a system 200 that supports distributed, secure, power grid data collection, consensual voting analysis, and situational awareness and anomaly detection in accordance with aspects of the present disclosure. Although system 200 is discussed with respect to power grid data collection, it is understood that system 200 could be configured to support collection of other data types. For example, system 200 could be configured to support collection of data related to temperature, humidity, visible light, infrared light, ultraviolet light, radio-frequency signals, air quality, presence of smoke, presence of radiation, presence of electromagnetic pulses, motion, audio, and presence of moisture. System 200 may include aspects described with reference to FIG. 1. For example, the aggregation server 210 may be an example of the aggregation server 110, the data collection controller 212 may be an example of the data collection controller 112, the modem termination system 211 may be an example of the modem termination system 102, and the sensor 202 may be an example of the sensors 150. The system 200 may further include a remote sensing element 224 and secondary power sources 220.

Sensor 202 may collect data indicating a metric associated with a power grid (e.g., the power grid 160 as described with reference to FIG. 1). For example, the sensor 202 may monitor a voltage, a current, a frequency, a phase, a phase jitter, a power quality, or a power associated with the power grid. For example, the sensor 202 may be coupled with a power line (e.g., a power line 170 as described with reference to FIG. 1). The sensor 202 is shown including a network interface 204, data processor 206, and optionally, a modem 222, sensing element(s) 226(1-n) (in which n can be 0 or any integer, representing a single or a plurality of different or the same sensors), secondary power 220(1), and primary power supply 230. The modem termination system 211 may be the same or similar to the modem termination system 102 of FIG. 1. The primary power supply 230 may be the same or similar to the power supply 126 of FIG. 1. Additionally, sensor 202 is optionally connected with external remote sensing element(s) 224 via a wired or wireless communications connection 250, and/or an external secondary power source 220(2).

Sensor 202 is shown connected to or otherwise in communication (directly or indirectly) with aggregation server 210 via modem termination system 211. Sensor 202 can be connected to aggregation server 210 directly, or, indirectly through a modem termination system 211. Optionally, sensor 202 is connected to or in direct or indirect communication with remote sensing element 224, secondary power 220(2), and data collection controller 212.

Non-limiting examples of secondary power sources 220 include but are not limited to a battery, uninterruptible power supply (UPS), and/or an energy generation component such as a solar panel, wind turbine, or backup generator. In one exemplary embodiment of system 200, a sensor 202 (which may be the same or similar to sensor 150 in system 100 of FIG. 1) is connected to an aggregation server 210 (which, may be the same or similar to aggregation server 110 as shown in system 100 of FIG. 1) through a wired or wireless communications channel.

In one or more embodiments, an aggregation server 210 is securely connected with sensor(s) 202. Such an association enables secure data transmission of raw sensor data collected at the modem 222, power supply 230, remote sensing element 224, or other sensing elements 226(1-n), in which n can be 0 or any integer. A network interface 204 and data processor 206 are utilized within sensor 202 to process, receive, transmit, and interact with sensing elements 226(1-n), remote sensing element 224, power supply 230, or modem 222.

In further operation, system 200 may utilize a network interface 204 to communicate directly with an aggregation server 210, or through intermediary network elements (not pictured). Optionally, sensor 202 employs a data collection controller 212 to coordinate data requests and deliveries from sensor 202 to an aggregation server 210. In one exemplary embodiment the data collection controller 212 or aggregation server 210 may use secure data transmission (e.g., simple network management protocol, SNMP). Data collection can occur within or remotely to sensor 202 either directly through internal sensing elements 226(1-n) or other internal or external components such as an optional modem 222, primary power supply 230, or other means. In some embodiments of system 200 data collection may take place remotely from sensor 202 using external remote sensing element(s) 224 and through either wired or wireless connection 250 to sensor 202. Additionally, a data processor 206 may use an analog to digital processor 208 to convert analog signals received into digital ones for re-transmission to aggregation server 210.

Figure 3:
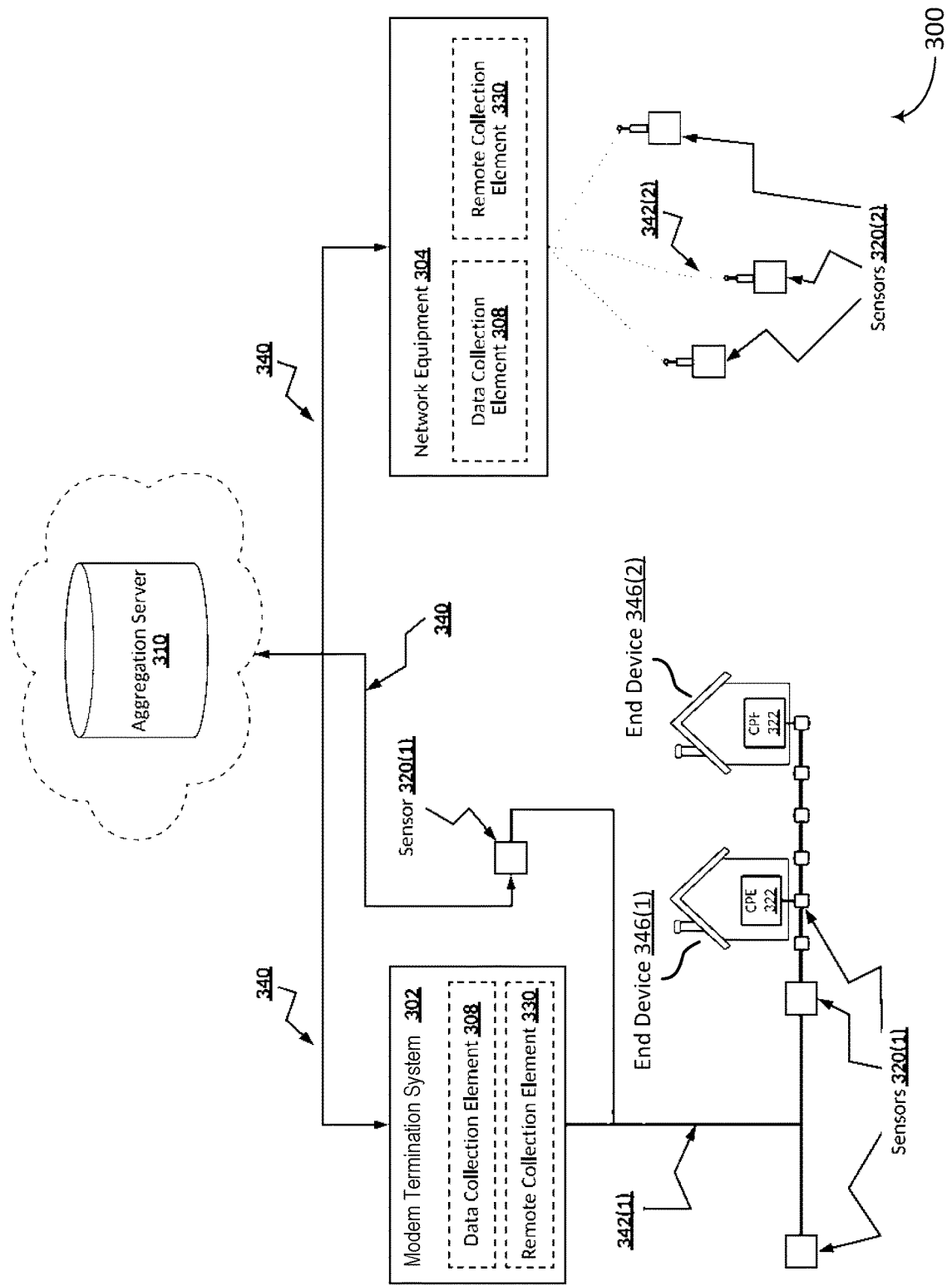

FIG. 3 illustrates an example of a system 300 that supports distributed, secure, power grid data collection, consensual voting analysis, and situational awareness and anomaly detection in accordance with aspects of the present disclosure. Although system 300 is discussed with respect to power grid data collection, it is understood that system 300 could be configured to support collection of other data types. For example, system 300 could be configured to support collection of data related to temperature, humidity, visible light, infrared light, ultraviolet light, radio-frequency signals, air quality, presence of smoke, presence of radiation, presence of electromagnetic pulses, motion, audio, and presence of moisture. FIG. 3 may include aspects described with reference to FIGS. 1 and 2. For example, system 300 may be an example of a power grid monitoring system as described with reference to FIG. 1. Additionally, the aggregation server 310 may be an example of the aggregation servers as described with reference to FIGS. 1 and 2, the modem termination system 302 may be an example of the modem termination systems as described with reference to FIGS. 1 and 2, the sensors 320 may be examples of the sensors as described with reference to FIGS. 1 and 2, the end devices 346 may include CPE (322) or aspects of residential homes as described with reference to FIG. 1, and the network equipment 304 may be an example of a network node 104 as described with reference to FIG. 1. In some cases, the modem termination system 302 may be an example of a network node. Additionally or alternatively, the modem termination system 302 may be an example of a head-end for a communications network (e.g., including the network equipment 304 and the connections 340).

Aggregation server 310 is shown in connection to or otherwise in communication (directly or indirectly) with modem termination system(s) 302, sensor(s) 320(1), and/or network equipment 304 through communications connections 340. Communication connection 340 may be wired (e.g., DSL, coaxial cable, fiber optic cables, etc.) or wireless (e.g., LTE, 3G, 5G, 6G, LEO satellite, GEO satellite, Wi-Fi, etc.). A modem termination system 302 or network equipment 304 is further shown in connection with sensors 320(1-2) through connections 342(1-2). Communications connections 342(1-2) may be wired (e.g., DSL, coaxial cable, fiber optic cables, etc.) or wireless (e.g., LTE, 3G, 5G, 6G, LEO satellite, GEO satellite, Wi-Fi, etc.).

In a non-limiting exemplary network configuration shown in system 300, an aggregation server 310 is optionally located on cloud-based computing servers, and is configured to collect power grid metrics (or other metrics) from one or more sensors 320(1-2). The aggregation server 310 securely stores, processes and analyzes a power grid network (e.g. power grid 160 of FIG. 1) via a communications network (e.g., communications network 162 of FIG. 1). For example, each sensor 320 may monitor a metric associated with a power grid. The sensors 320 may communicate, by the connections 342 and/or 340 (e.g., by the communications network), data indicating the metric to the aggregation server 310. The aggregation server 310 may determine a normalized range for the metric based on the data collected from the sensors 320. After the aggregation server 310 determines the normalized range, the sensors 320 may communicate new data to the aggregation server 310. The aggregation server 310 may compare the new sets of data to the normalized range and generate data indicating a relationship between the new data and the normalized range. For example, the aggregation server 310 may generate data indicating a consensus value of the new data. In another example, the aggregation server 310 may identify a sensor 320 providing data that is most out of range (e.g., most different than the normalized range). Additionally or alternatively, the aggregation server 310 may perform geographical or group analysis of values from one type of sensor 320. For example, the aggregation server 310 may determine a most out of range sensor 320 for a geographical region.

In one embodiment of system 300, a modem termination system 302, other network equipment 304, or sensors 320 (1-2) are connected to an aggregation server 310 through secure communications connections 340. Each of these network components may optionally include a data collection element 308 or remote collection elements 330 (some not pictured). Sensors 320(1-2) may be the same or different embodiments as sensors 202 in system 200 and 150 in system 100. Additionally, sensors 320(1-2) may be contained within or connected to customer premise equipment (CPE) 322 in some embodiments.

In the exemplary embodiment of a data collection network shown in system 300, an aggregation server 310 utilizes secure communications connections 340 to request and receive sensor 320(1-2) data. Such sensor data may be sent back to the aggregation server 310 on either a time interval or real-time basis. Exemplary secure channel configurations may include virtual private networks (VPNs), traffic tunnels, HTTP/S, or alternative similar secure network communication means deployable over communications connections 340. Alternatively, an aggregation server 310 may communicate indirectly with sensors 320(1-2) through a modem termination system 302 or other network equipment 304. Remote sensors 320(2) may be deployed for additional monitoring uses which in some embodiments include additional metrics such as temperature, noise, humidity etc. In such embodiments, an optional remote collection element 330 is configured to receive wireless data communications 342(2) from remote sensors 320(2) using wireless protocols such as LTE, 3G, 5G, 6G, LEO satellite, GEO satellite, Wi-Fi, Bluetooth, Zigbee, etc.

Figure 4:
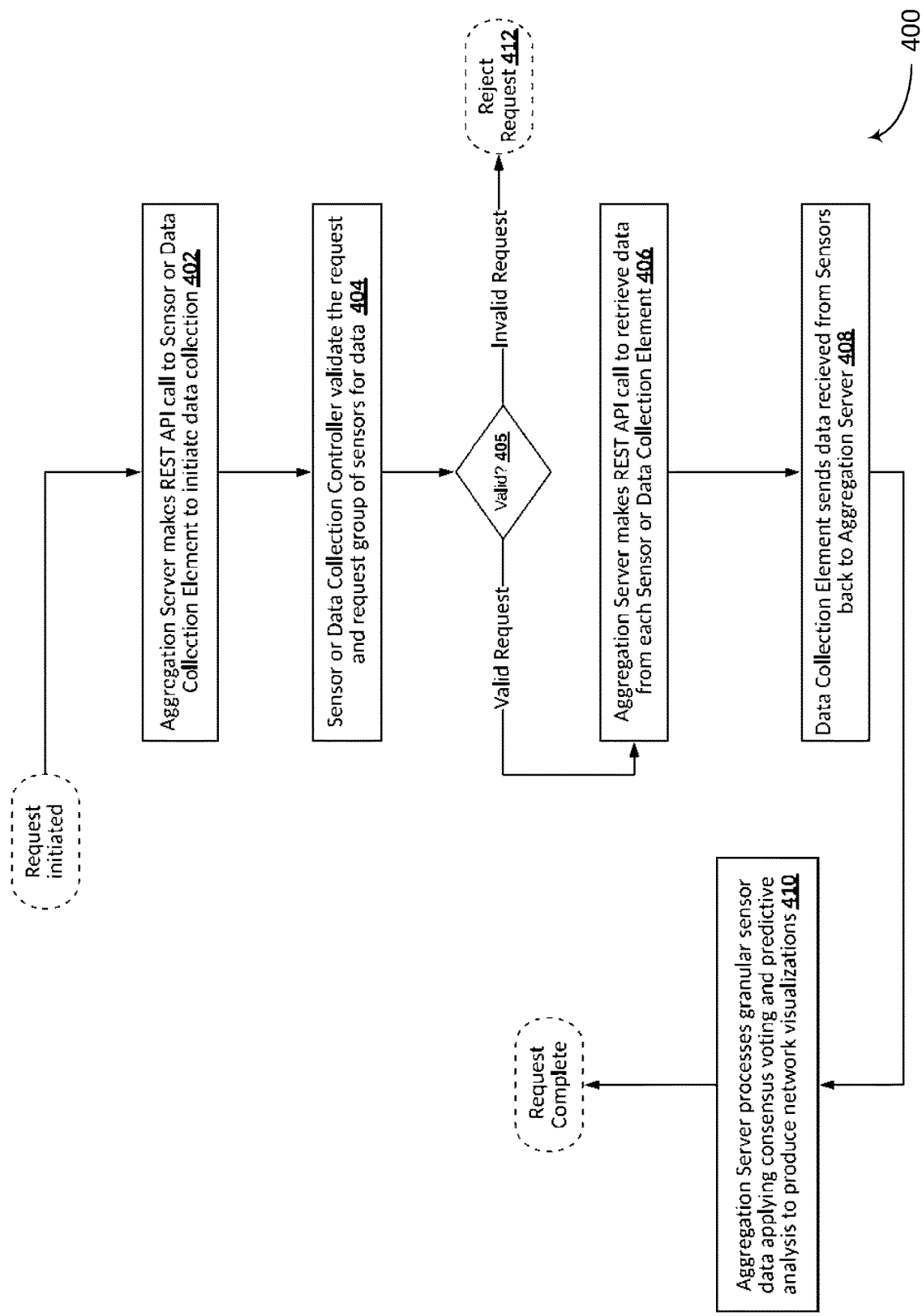
FIG. 4 illustrates an example of a flowchart that supports a system and method for distributed, secure, data collection, consensual voting analysis, and situational awareness and anomaly detection in accordance with aspects of the present disclosure.

FIG. 4 illustrates an example of a flowchart 400 that supports a method for distributed, secure, power grid data collection, consensual voting analysis, and situational awareness and anomaly detection in accordance with aspects of the present disclosure. Although flowchart 400 is discussed with respect to power grid collection, it is understood that the method of 400 could be applied to collection of other data types, including but not limited to data related to temperature, humidity, visible light, infrared light, ultraviolet light, radio-frequency signals, air quality, presence of smoke, presence of radiation, presence of electromagnetic pulses, motion, audio, and presence of moisture. FIG. 4 may illustrate an exemplary method that an aggregation server (e.g., as described with reference to FIGS. 1 through 3) may use to complete a secure push or pull data request 430 to individual or groups of sensors (e.g., as described with reference to FIGS. 1 through 3). The data request can collect real-time or time interval metrics, or both. In one exemplary method, power grid metrics (such as status, voltage, current, resistance, phase etc.) are sent to an aggregation server via data request 430.

The method illustrated by flowchart 400 includes a request initiation step 402, a request validation step 404 with optional rejection 412, a decision step 405, a retrieve call step 406, a send step 408, and a processing and analysis step 410.

The request may be initiated based on the aggregation server receiving a request (e.g., from a client device) for data relating to the power grid. For example, an electricity provider may issue a request to the aggregation server requesting data related to the power grid. In another example, the request may be initiated based on a predefined periodicity (e.g., every day, every week, every month). For example, the aggregation server may initiate a request every 24 hours. In some cases, the request may indicate a certain metric (e.g., a voltage, a current, a frequency, a phase, a phase jitter, a power quality, or a power factor) associated with the power grid. Additionally or alternatively, the request may indicate a geographical region. For example, the request may include a request for a metric associated with the power grid within a certain geographical region.

In step 402 an aggregation server makes a call to a sensor or a sensor's optional internal data collection element(s). One example of step 402 is aggregation server 310, 210, 110 sending a first application program interface (API) call to a sensor for data.

In method step 404 a sensor receives the request via a channel (e.g., HTTP/S or other similar communication protocol or secure communication protocol) and validates the request. In decision step 405 if valid, the sensor then makes a request to any other sensor(s) downstream or internal sensing elements. If the request is invalidated the request is rejected through optional step 412 and the aggregation server is notified. Valid data requests to sensor(s) are made through a secure data collection channel (e.g., simple network management protocol or similar secure protocol). One example of method step 404 is sensor 320, 202, 150 receiving a request from server 310, 210, 110 via a secure channel or communication protocol.

In method step 406 the aggregation server retrieves data collected from each validated data collection element. One example of step 406 is aggregation server 310, 210, 110, receiving data from sensor 320, 202, 150. In some cases, the request may request data indicating a certain metric associated with the power grid. Here, the aggregation server may receive data from sensors configured to measure the requested metric. In some other cases, the request may request data indicating more than one metric. Here, the aggregation server may receive data from multiple types of sensors (e.g., sensors configured to measure voltage, current, frequency, phase, phase jitter, power quality, or power factor, as well as sensors configured to measure other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture).

In step 408 the data collection element(s) sensor data received from sensors is sent back to the aggregation server via a secure channel, completing that data request cycle. In some embodiments the exemplary data request cycles shown in method 400 could occur at a variety of intervals, from sub-second requests to daily ones.

In step 410 sensor data is received from the collection element in the aggregation server where it is processed. For example, the aggregation server may apply granular-level consensus voting and predictive machine learning analysis to construct network visualizations tailored for a variety of uses cases, such as power grid monitoring, outage management and mitigation, power and communications network restoration estimates, adjacent network confirmation of network status, etc.

In some cases, the power grid monitoring may include the aggregation server receiving data from the sensors and processing the data. For example, the aggregation server may receive, from a set of sensors, a first set of data indicating a metric associated with a power grid by a communications network (e.g., a fiber communications network). The aggregation server may determine a normalized range for the metric based on the first set of data. For example, the aggregation server may determine a consensus value of the metric based on the first set of data, where the normalized range is based on the consensus value of the metric. The aggregation server may subsequently receive, from the set of sensors, a second set of data indicating the metric by the communications network. The aggregation server may process the second set of data to generate a third set of data indicating a relationship between the second set of data and the normalized range.

The third set of data may indicate a sensor associated with a most out of range value of the metric. For example, the aggregation server may determine which value within the second set of data is most different than the consensus value indicated by the first set of data. The third set of data may indicate the sensor associated with the most out of range value. Additionally or alternatively, the third set of data may relate to geographical or group analysis of values from one type of sensor. For example, the aggregation server may determine a most out of range sensor for a geographical region.

Figure 5:
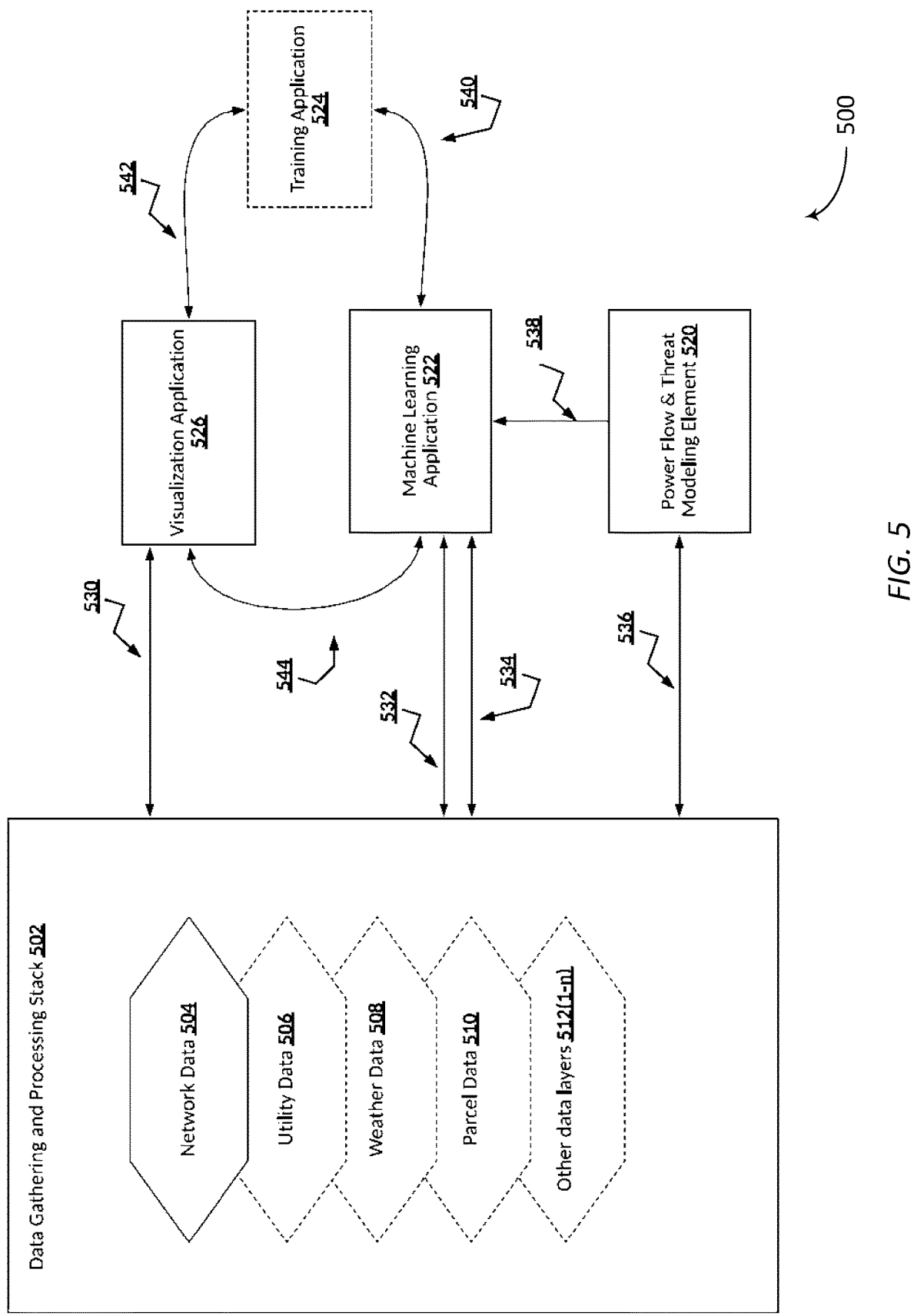
FIG. 5 illustrates an example of a system that supports distributed, secure, data collection, consensual voting analysis, and situational awareness and anomaly detection in accordance with aspects of the present disclosure.

FIG. 5 illustrates an example of a system 500 that supports distributed, secure, power grid data collection, consensual voting analysis, and situational awareness and anomaly detection in accordance with aspects of the present disclosure. Although system 500 is discussed with respect to power grid data collection, it is understood that system 500 could be configured to support other data types. For example, system 500 could be configured to support data related to temperature, humidity, visible light, infrared light, ultraviolet light, radio-frequency signals, air quality, presence of smoke, presence of radiation, presence of electromagnetic pulses, motion, audio, and presence of moisture. FIG. 5 may include aspects described with reference to FIGS. 1 through 4. For example, the system 500 may be an example of a network data aggregation and processing system 500 that enables advanced situational awareness, prediction, and anomaly detection in a network. Here, the system 500 may collect data from sensors (e.g., as described with reference to FIGS. 1 through 4) by a communications network such as a fiber communications network. The data collected may be processed using a machine learning application 522 to improve anomaly and cybersecurity threat detection and visualization capabilities across an entire power grid. These capabilities may be irrespective of individual power company boundaries and may provide previously unavailable cross-boundary perspectives.

Data aggregation and processing system 500 is shown to include a data gathering and processing stack 502 that contains layers of geospatial data, including network data 504. Network data 504 may be the same or similar network data as collected through the power grid monitoring system 164 of FIG. 1, for example. The data gathering and processing stack 502 can optionally include additional other layers of geospatial data, such as utility data 506, weather data 508, parcel data 510, or other data layers 512(1-n), in which n can be 0 or any integer. Data aggregation and processing system 500 is shown to include a power flow and threat modelling element 520, a visualization application 526, a machine learning application 522, and, optionally, a training application 524.

Data aggregation and processing system stack ("data stack") 502 is coupled with a visualization application 526 via a real-time data communications channel 530, which delivers real-time data from the data stack 502 to the visualization application 526. The data stack 502 is further coupled with a power flow and threat modeling element 520 via communications channel 536 which delivers historical data into the power flow and threat modeling element 520. The power flow and threat modeling element 520 is connected with the machine learning application 522 via a communications channel 538. The machine learning application 522 is also directly coupled with the data stack 502 via communications channels 532 and 534 and receives both real-time and historical data from the data stack. The visualization application 526 and the machine learning application 522 are connected via communications channel 544 such that analysis in the machine learning application 522 can be visualized in the visualization application 526. The machine learning application 522 and visualization application 526 can, optionally, be connected through an intermediary training application 524 via communications channels 542 and 540. Communications channels 530, 532, 534, 536, 538, 540, 542, and 544 discussed herein are a means for secure data transfer, such as through a wired connection (e.g., Ethernet, DSL, coaxial cable, fiber optic cable, etc.), or through a wireless one (e.g., Bluetooth, Zigbee, LTE, 3G, 5G, 6G, LEO-satellite, GEO-satellite, Wi-Fi, etc.).

In one embodiment, a data gathering and processing stack 502 is utilized to aggregate communications network data layer 504 alongside any number of optional secondary data layers. While the complementary data layers needed will vary by application and analysis requirements, some examples of commonly utilized data layers would be utility data 506, weather data 508, and/or parcel data 510. Additionally, other data layers 512(1-n) may be included in the data gathering and processing stack 502 as required by a specific application (n may be 1 or any integer). In this exemplary embodiment the data gathering and processing stack 502 is configured to produce geospatial data visualizations through a visualization application 526. In this or other embodiments, the data processing and intelligence system 500 can be configured to deliver real-time power flow and threat modelling through a power flow and threat modelling element 520. In any such embodiment a machine learning application 522 with optional training application 524 may be utilized to increase accuracy and efficiency of the visualization application 526 or power flow and/or threat modelling element 520.

In this exemplary embodiment the data gathering and processing stack 502 delivers real-time sensor data to the visualization application 526 which utilizes said sensor data to produce visualizations based on specific application requirements (e.g., sensor mapping, voltage over time, power outages, etc.). Additionally, the visualization application 526 can be configured to utilize a machine learning application 522 to improve the quality of data used in the visualizations. The machine learning application 522 receives data from the data stack 502 and applies machine learning algorithms to increase predictive capabilities. One example of which would be anticipating power outages through historical trends implying a correlation between weather events and power outages. This machine processed and classified data is returned to the visualization application 526. Optionally, the machine learning application 522 may use an intermediary training application 524 to take real-time data observations from the visualization application and apply training intelligence to the observed data. In this example, annotated data is then fed into the machine learning application 522 to improve predictive abilities and accuracy. One example of a training application 524 would be adding a human 'trainer' to the system to annotate data and correct the machine learning application 522 and improve classification. In one embodiment the power flow and threat modelling element 520 receives historical data from the data processing and gathering stack 502 which is utilized to create cybersecurity or national security threat models. These models can be used to identify and/or anticipate attacks, false-alarms, outages, or other non-regular events on the network (e.g., power grid). Threat models can further, in some embodiments, be delivered to the machine learning application 522 via communications channel 538 to add an additional training mechanism.

Figure 6:
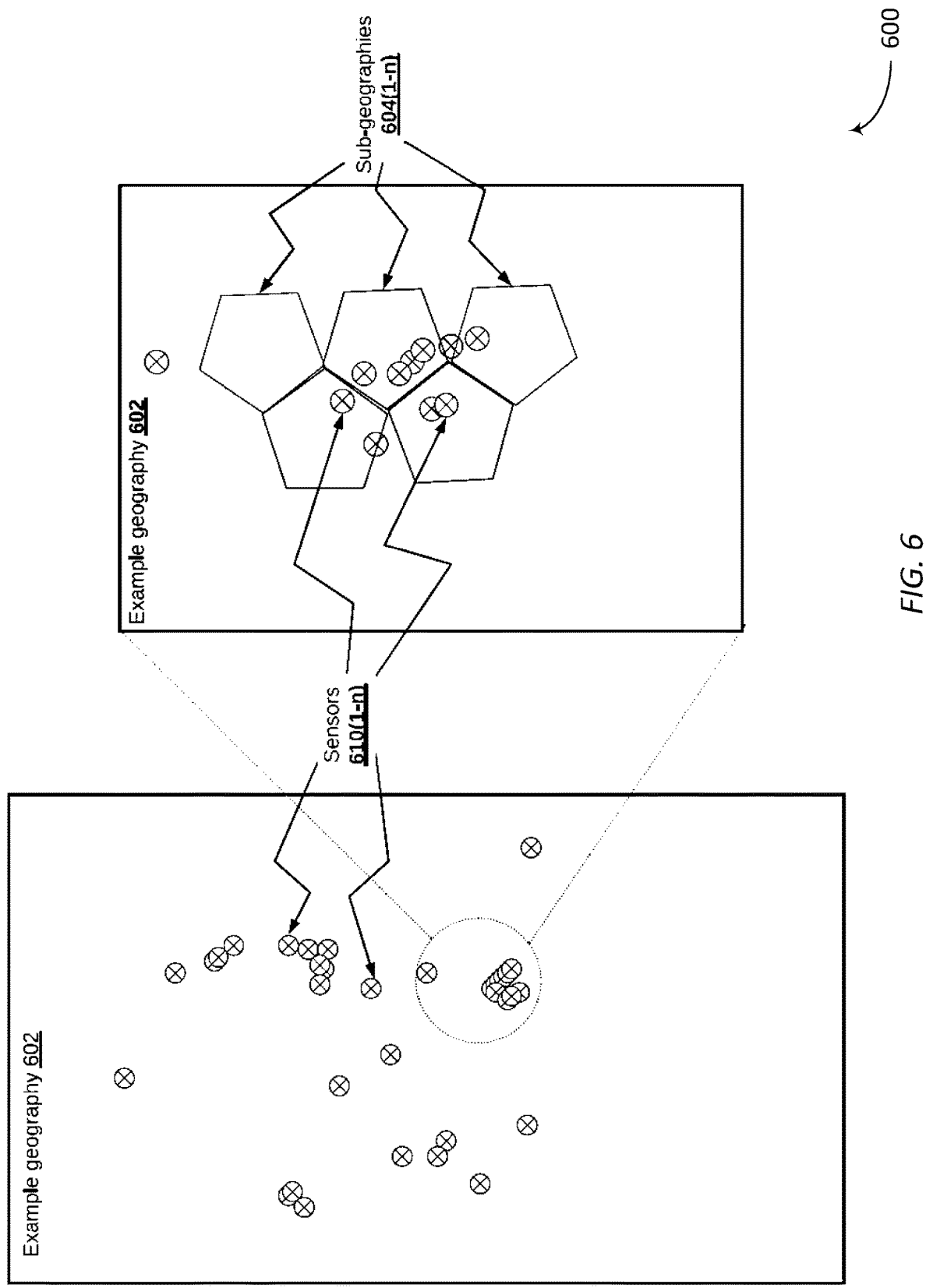
FIG. 6 illustrates an example of an aggregate sensor data visualization that supports distributed, secure, power grid data collection, consensual voting analysis, and situational awareness and anomaly detection in accordance with aspects of the present disclosure.

FIG. 1 illustrates an example of an aggregate sensor data visualization 100 that supports distributed, secure, power grid data collection, consensual voting analysis, and situational awareness and anomaly detection in accordance with aspects of the present disclosure. FIG. 6 may illustrate an aggregate sensor data visualization 600 across a geographically distributed sensor network using an example consensual voting implementation. Although FIG. 6 is discussed with respect power grid data, the FIG. 6 sensor data visualization could be adapted to visualize other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture. Geography 602 may have a plurality of sensors 610(1-n) (in which n may be 0 or any integer) located throughout the geography 602. FIG. 6 may include aspects described with reference to FIGS. 1 through 6. For example, the sensors 610 may be examples of the sensors as described with reference to FIGS. 1 through 5. The aggregate sensor data visualization 600 may employ a new method of consensus voting amongst the sensors 610(1-n) to determine consensus among a sub-geography 604 or cluster 604(1-n)(in which n may be 0 or any integer).

In some cases, each of the sensors 610(1-n) may be configured to monitor a metric associated with a power grid within the geography 602. The sensors 610(1-n) may be coupled with network nodes (e.g., as described with reference to FIGS. 1 and 2). The network nodes may communicate the data collected by the sensors 610(1-n) to an aggregation server. The aggregation server may perform data processing to generate data indicating normalized ranges, consensus outliers, or a relationship between the collected data and a normalized range associated with the data. In some cases, the data indicating the relationship between the collected data and the normalized range may be based on a consensus reading of the sensors 610(1-n) within the geography 602, within the sub-geography 604, or proximate to the sub-geography 604.

In existing large sensor datasets, there are a number of ways that one can perform sensor fusion so as to obtain a consensus reading of the sensors in a given area. For example, a consensus reading may be obtained by taking an average. That is, the value of the metric indicated by each sensor may be averaged. But averaging the data may suffer from the fact that unless the variance in readings is small, the average may wash out particular sensors with problematic readings. Alternatively, a consensus reading may be obtained by taking the majority vote of binary readings (e.g., anomalous or not), a method whose validity is based on the Condorcet Jury theorem from political science. The theorem addresses the relative probability of a given group of individuals arriving at a correct decision. Such a technique may be applicable to a group that wishes to reach a decision by majority vote. One of the two outcomes of the vote is correct, and each voter has an independent probability p of voting for the correct decision. The theorem asks how many voters should be included in the group. The result depends on whether p is greater than or less than ½. That is, if p is greater than ½ (each voter is more likely to vote correctly), then adding more voters increases the probability that the majority decision is correct. In the limit, the probability that the majority votes correctly approaches 1 as the number of voters increases. On the other hand, if p is less than ½ (each voter is more likely to vote incorrectly), then adding more voters makes things worse: the optimal jury consists of a single voter.

The majority vote of binary readings may be used in ensemble learning in the field of artificial intelligence. An ensemble method combines the predictions of many individual classifiers by majority voting. Assuming that each of the individual classifiers predict with slightly greater than 50% accuracy, then the ensemble of their predictions will be far greater than their individual predictive scores. While useful, this technique suffers from the fact that it can only address a binary situation, as to whether or not the voltage is above or below a given set point. It thus misses a lot of fine detail that might be of relevance to monitor the state of various systems including power grids.

A major improvement over majority voting is disclosed herein and is illustrated in one example by ranking the relative readings of all sensors involved using a new variant of Borda Counting. One key advantage of this new method over simply finding the "worst" case sensor, is that the entire sensor suite is ranked so that the most extreme n sensors can be identified. The Borda count is intended to elect broadly-acceptable options, rather than those preferred by a majority, and so is known as a consensus-based voting system rather than a majoritarian one.

A network has both local and system-wide issues. Local issues can be investigated by analyzing data emanating from a single modem connected to a power supply in the grid. System wide issues involve multiple sensors/modems distributed over an area that stream data which fluctuates over time. Here we describe a method that creates a consensus among many sensors and provides information on a system-wide basis or among clusters within the network. The system does not identify particular nodes that are causing a problem, only that the overall network or significant parts of it are mis-behaving in a particular way, i.e., one or more sensors are far out of range in a significant part of the network. Although the method is primarily discussed with respect to sensors configured to obtain power grid data, the method is applicable to sensors configured to obtain other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture.

In one embodiment, this consensus voting method can be applied to sensor data collected on a power grid. In one example voltage issues in network devices within a given area and timeframe can be classified using both unsupervised learning and sensor fusion techniques. This method enlarges the scope of data analysis from single sensors to any number of those covering a potentially large given area. The architecture considered here consists of a number of devices, each of which has one or more sensor values associated with it (e.g., queue length, power level, latency, etc.) Each device may have different sensors measuring the certain quantities, possibly different levels of resolution and accuracy.

The technique may employ ranking the different sensor values for voting purposes. Sensor values can either have a pre-defined discretization or use historical data to define normalized ranges. For example, in the discrete case a three-state scheme could be green-yellow-red and the node would rank its current state preferences based on these three candidate choices—e.g., yellow-red-green, yellow-green-red, etc. In this example, if the value of the sensor is in the yellow range then yellow is top choice, and if the sensor value is closer to red than green, then red is the second choice.

In one example embodiment, a search for issues with voltages in a particular area at a given time can be completed. The voltage thresholds can be broken into 5 classes as a ratio of the 120V reference voltages and their respective labels are shown in Table 1, below.

TABLE 1

Example Voltage Labels

| Voltage (120 V) | Label |
|---|---|
| (1.05, inf) | 5 |
| (1.02, 1.05] | 4 |
| (0.98, 1.02] | 3 |
| (0.95, 0.98] | 2 |
| [0, 0.95] | 1 |

Depending on the measured voltage, the device will be in one of the 5 states listed in the example shown in Table 1. These values can be used in conjunction with a Borda ranking as follows. For a given voltage the ranking is made according to the labels in order of their closeness to the given voltage. For example, if the given voltage is in the range [1.02, 1.03] then the Borda ranking is, in order of the labels, [1, 2, 5, 3, 4]. That is, label 4 gets a rank of 5 because the voltage is in the window of 4 and closer to label 3 than 5, etc. The results obtained from this example are shown in Tables 2 and 3, along with the majority vote results described above.

TABLE 2

Majority and Borda Voting with 100 clusters.

| Majority label | Borda Label | % Cases |
|---|---|---|
| 5 | 5 | 3 |
| 5 | 4 | 69 |

TABLE 2-continued

Majority and Borda Voting with 100 clusters.

| Majority label | Borda Label | % Cases |
| --- | --- | --- |
| 4 | 4 | 27 |
| 3 | 4 | 1 |

As can be seen, there are cases where the majority vote and the consensual Borda count disagree on the state of the cluster. These differences can have implications for any actions to take. In particular, most of the majority labels are 5, which is the maximum out of bound range which could indicate a significant action should be taken. However, Borda count found the consensus voltage label to be only a 4, which requires less intervention. In this scenario the device owners may make unnecessary and costly changes if they used a majority voting scenario.

TABLE 3

Majority and Borda Voting with 200 clusters

| Majority Label | Borda Label | % Cases |
| --- | --- | --- |
| 5 | 5 | 1 |
| 5 | 4 | 57 |
| 4 | 4 | 41.5 |
| 3 | 4 | 0.5 |

Figure 7:
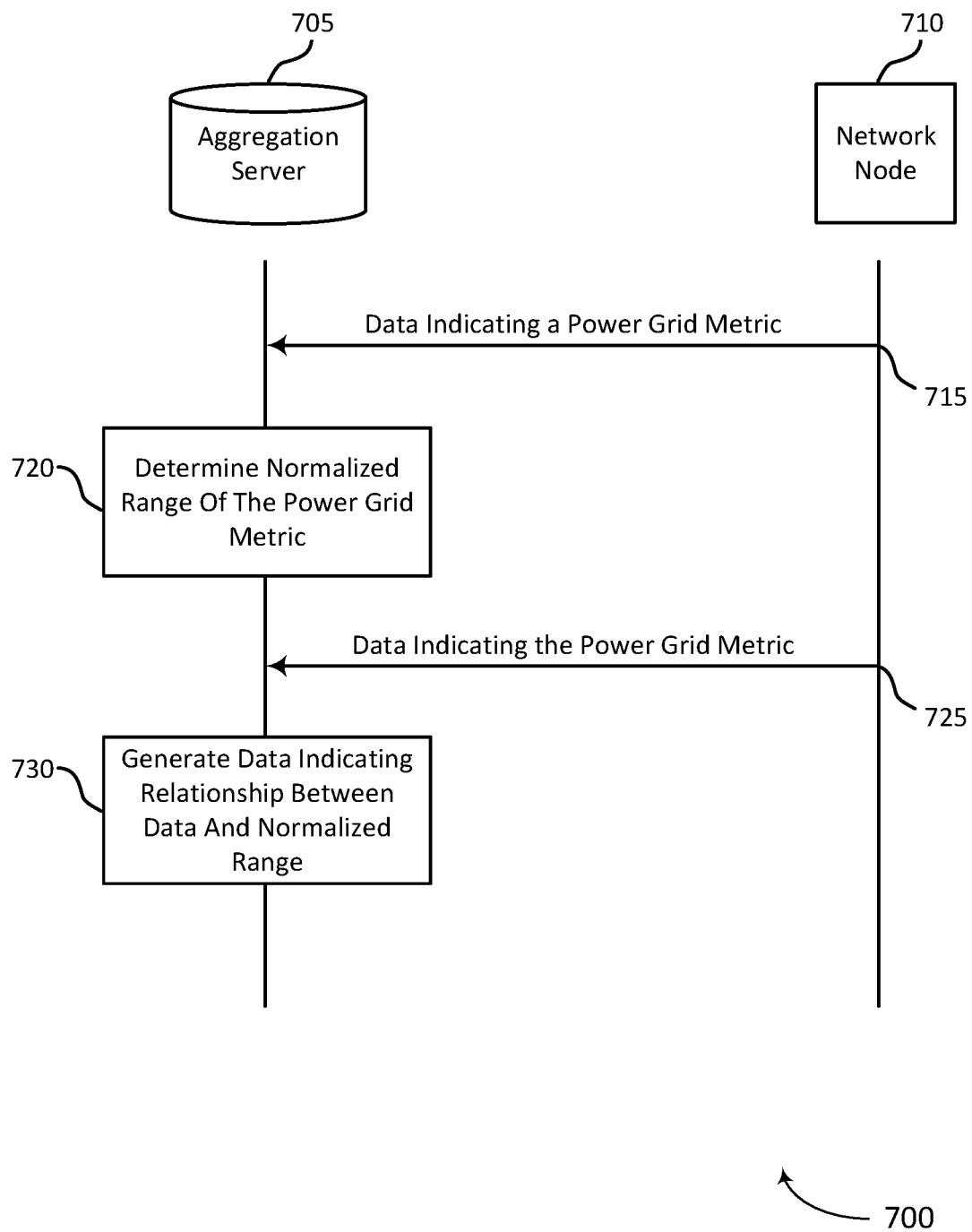
FIGS. 7 through 10 illustrate an example of process flows that support distributed, secure, data collection, consensual voting analysis, and situational awareness and anomaly detection in accordance with aspects of the present disclosure.

FIG. 7 illustrates an example of a process flow 700 that supports distributed, secure, power grid data collection, consensual voting analysis, and situational awareness and anomaly detection in accordance with aspects of the present disclosure. Although the FIG. 7 process flow is primarily discussed with respect to sensors configured to obtain power grid data, the method is applicable to sensors configured to obtain other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture. In some examples, FIG. 7 may illustrate aspects of FIGS. 1 through 6. For example, the aggregation server 705 may be an example of the aggregation servers as described with reference to FIGS. 1 through 6. Additionally, the network node 710 may be an example of a network node or a head-end as described with reference to FIGS. 1 through 6. The network node 710 and the aggregation server 705 may perform functions and communications to monitor a power grid. For example, the network nodes 710 may be network nodes 710 within a communications network such as a fiber or cable communications network. The network nodes 710 may provide a communication service to locations (e.g., including end devices) that are powered by the power grid. Thus, the network nodes 710 may receive data from sensors coupled with the power grid and communicate the data via the communications network to the aggregation server 705 for processing. The network nodes 710 may be powered by the power grid (e.g., as a primary power source), and may have a secondary or backup power source.

At 715, one or more network nodes 710 may communicate, to the aggregation server 705, data indicating a power grid metric. The one or more network nodes 710 may be coupled with one or more sensors. The sensors may be configured to monitor the metric associated with the power grid. For example, each network node 710 may be coupled with at least one sensor configured to monitor a voltage level associated with the power grid. In some cases, each network node 710 may be coupled to a sensor configured to monitor more than one metric associated with the power grid (or more than one sensor, each configured to monitor a different metric). Here, the network node 710 may collect data related to more than metric associated with the power grid (e.g., voltage, current, frequency, phase, phase jitter, power quality, or power factor). The data may include a set of values from each network node 710 indicating the metrics, each value determined by a different sensor.

At 720, the aggregation server 705 may determine normalized ranges of the power grid metrics indicated by the data received at 715. The aggregation server 705 may determine the normalized ranges by determining consensus values of the metrics indicated by the data (e.g., the first set of data). The aggregation server 705 may determine the consensus values by Borda counting and/or Borda ranking. That is, the data indicating the power grid metrics may include a ranking of a possible list of quantized values (or, in some cases, a range) of the power grid metrics (e.g., as described with reference to FIG. 6). Additionally or alternatively, the aggregation server may determine the ranking of the possible list of quantized values of the power grid metrics based on the power grid metric values indicated by the data received by the aggregation server 705 at 715. Thus, the aggregation server may determine, based on the consensual Borda count, normalized ranges of the power grid metrics. In some cases, the aggregation server 705 may determine normalized ranges for the power grid metrics according to one or more factors. For example, the aggregation server 705 may determine normalized ranges for the power grid metrics based on a time of day, a time of year, or a geographical region. In some cases, the aggregation server 705 may determine respective normalized ranges for each of a plurality of network nodes. For example, the aggregation server 705 may determine respective normalized ranges by applying Borda counting and/or Borda ranking to multiple measurements (e.g., over time) or by including (e.g., weighted) measurements from other network nodes that are proximate (e.g., geographically or based on network topology).

At 725, the network node 710 may communicate a second set of data indicating the power grid metrics. The second set of data may indicate the same power grid metrics and be collected by a same set of sensors (e.g., as the data communicated to the aggregation server 705 at 715).

At 730, the aggregation server 705 may generate data (e.g., a third set of data) indicating a relationship between the second set of data received at 725 and the normalized ranges of the power grid metrics determined at 720. For example, the aggregation server 705 may generate a third set of data indicating the consensus value indicated by the second set of data received at 725 with respect to the normalized ranges. In another example, the aggregation server 705 may generate a third set of data indicating a most out of range sensor (e.g., type of sensor associated with a given metric). Here, the network node 710 may communicate data associated with more than one metric (e.g., voltage and current). The aggregation server 705 may determine which set of sensors (e.g., sensors measuring voltage, sensors measuring current) indicate a consensus value that is most different than the normalized range for that power grid metric. Additionally or alternatively, the aggregation server 705 may determine which sensor (e.g., associated with the network node 710 or a different network node) detects a value within the data indicated at 725 that is most out of range when compared to the normalized range or with its respective normalized range.

Figure 8:
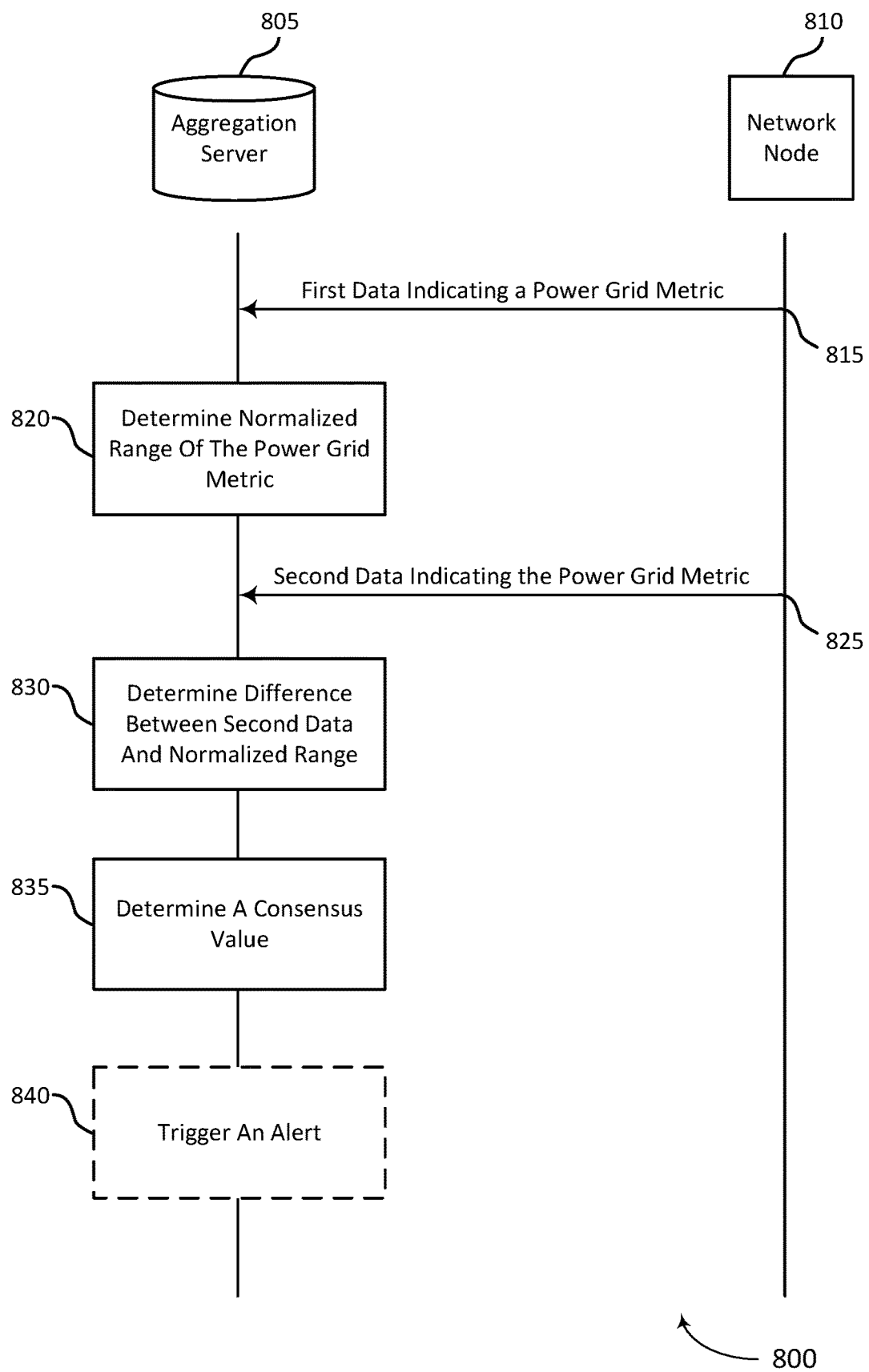

FIG. 8 illustrates an example of a process flow 800 that supports distributed, secure, power grid data collection, consensual voting analysis, and situational awareness and anomaly detection in accordance with aspects of the present disclosure. Although the FIG. 8 process flow is primarily discussed with respect to sensors configured to obtain power grid data, the process flow is applicable to sensors configured to obtain other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture. In some examples, FIG. 8 may illustrate aspects of FIGS. 1 through 7. For example, the aggregation server 805 may be an example of the aggregation servers as described with reference to FIGS. 1 through 6. Additionally, the network node 810 may be an example of a network node or a head-end as described with reference to FIGS. 1 through 7. The network node 810 and the aggregation server 805 may perform functions and communications to monitor a power grid. For example, the network nodes 810 may be network nodes 810 within a communications network such as a fiber or cable communications network. The network nodes 810 may provide a communication service to locations (e.g., including end devices) that are powered by the power grid. Thus, the network nodes 810 may receive data from sensors coupled with the power grid and communicate the data via the communications network to the aggregation server 805 for processing. The network nodes 810 may be powered by the power grid (e.g., as a primary power source), and may have a secondary or backup power source.

At 815, one or more network nodes 810 may communicate, to the aggregation server 805, data indicating a power grid metric. The one or more network nodes 810 may be coupled with one or more sensors. The sensors may be configured to monitor the metric associated with the power grid. For example, each network node 810 may be coupled with at least one sensor configured to monitor a voltage level associated with the power grid. In some cases, each network node 810 may be coupled to a sensor configured to monitor more than one metric associated with the power grid (or more than one sensor, each configured to monitor a different metric). Here, the network node 810 may collect data related to more than metric associated with the power grid (e.g., voltage, current, frequency, phase, phase jitter, power quality, or power factor). The data may include a set of values indicating the metric, each value determined by a different sensor.

At 820, the aggregation server 805 may determine a normalized range of the power grid metric indicated by the data received at 815. The aggregation server 805 may determine the normalized range by determining a consensus value of the metric indicated by the data (e.g., the first set of data). The aggregation server 805 may determine the consensus value by Borda counting and Borda ranking. That is, the data indicating the power grid metric may include a ranking of a possible list of quantized values (or, in some cases, a range) of the power grid metric (e.g., as described with reference to FIG. 6). Additionally or alternatively, the aggregation server may determine the ranking of the possible list of quantized values of the power grid metric based on the power grid metric values indicated by the data received by the aggregation server 805 at 815. Thus, the aggregation server may determine, based on the consensual Borda count, a normalized range of the power grid metric. In some cases, the aggregation server 805 may determine a normalized range for the power grid metric according to one or more factors. For example, the aggregation server 805 may determine a normalized range for the power grid metric based on a time of day, a time of year, or a geographical region. In some cases, the aggregation server 805 may determine respective normalized ranges for each of a plurality of network nodes. For example, the aggregation server 805 may determine respective normalized ranges by applying Borda counting and/or Borda ranking to multiple measurements (e.g., over time) or by including (e.g., weighted) measurements from other sensors that are proximate (e.g., geographically or based on network topology).

At 825, the network node 810 may communicate a second set of data indicating the power grid metrics. The second set of data may indicate the same power grid metrics and be collected by a same set of sensors (e.g., as the data communicated to the aggregation server 805 at 815). The second set of data may include a set of values of the power grid metrics measured by sensors. Alternatively, the second set of data may include a ranking of a possible list of quantized values (or possible ranges for the power grid metrics).

At 830, the aggregation server 805 may determine a fourth set of data indicating a relationship between the quantized set of values of the power grid metrics and the normalized ranges of the power grid metric. If the second set of data includes a set of values of the power grid metrics measured by the sensors, the aggregation server 805 may determine a possible list of quantized values associated with each of the set of values within the second set of data. The aggregation server 805 may then determine a difference between the quantized values associated with the power grid metrics and the normalized ranges of the power grid metrics.

Equation 1, shown below, illustrates an example technique utilized by the aggregation server 805 to determine the difference between the values within the second set of data and the normalized range of the power grid metric.

$$z_{ij} = (x_{ij}(t) - \text{ref}_{ij})/\sigma_{ij} \quad (1)$$

In Equation 1, j may correspond to a sensor type. For example, j may correspond to a sensor configured to monitor voltage, current, frequency, phase, phase jitter, power quality, and/or power factor of the power grid. Additionally, i may correspond to a specific network node 810. That is, the second set of data received at 825 may include data from more than one network node 810. Further, $x_{ij}(t)$ may correspond to a value (e.g., measured by a sensor type j and from the network node 810 indicated by i) received or measured at time t, $\text{ref}_{ij}$ may correspond to the normalized value or range determined at 830, and $\sigma_{ij}$ may correspond fluctuation levels. For example, $\sigma_{ij}$ may be calculated based on expected fluctuations and noise of the sensors, or a standard deviation calculated based on a rolling history of values for each sensor type j. In some examples, $z_{ij}$ may correspond to a z-score of the sensor or network node 810. The z-score may indicate a difference between the value indicated by the sensor or network node 810 from the normalized range $\text{ref}_{ij}$ determined at 830.

At 835, the aggregation server 805 may determine a consensus value associated with the z-scores of each of the values within the second set of data. In some cases, the aggregation server 805 may determine the consensus value by Borda counting and Borda ranking. Additionally or alternatively, the aggregation server 805 may weight the z-score associated with each network node 810 or sensor. For example, the aggregation server 805 may weight the z-score based on the fluctuation level of the sensor associated with the node 810 (e.g., $1/\sigma_j$). Additionally, the aggregation server 805 may determine the weight according to Equation 2, shown below.

$$wgt_j = \exp\left(\frac{-\sigma_j}{\langle\sigma\rangle}\right) \qquad (2)$$

Here, the weighting of the z-score $wgt_j$ may be a function (e.g., an exponential function) of the fluctuation level of the sensor $-\sigma_j$ and the average fluctuation level ($\sigma$). In another example, the aggregation server 805 may weight the z-score based on a norm calculated (e.g., a p-norm). Here, the z-score may be calculated as shown below, in Equation 3.

$$\text{Score}_c = (\Sigma_v^T \text{score}_z^p)^{1/p} \qquad (3)$$

Here, the score may correspond to the z-score, v may be a measured sensor value, T may be a total number of values, and c may be the sensor considered. In another example, the aggregation server 805 may weight the z-score based on a historical likelihood that the sensor or network node 810 indicated a value that is similar to or the same as a previously-determined consensus value (e.g., historical correlation to the consensus value). In another example, the aggregation server 805 may weight the z-score based on a relative amount of traffic the associated network node 805 sends and receives, a relative connectivity of the associated network node 805 to other network nodes 810 (e.g., a higher connectivity may correspond to a larger weight), and/or a relative impact on overall quality of service if the associated network node 810 goes down. For determining a consensus z-score of a given network node or a group of network nodes (e.g., a region), the z-scores of the group of network nodes or adjacent or proximate network nodes may be combined using a weighted combination or weighted Borda counting or weighted Borda ranking (e.g., according to quantized ranges of z-scores).

At 840, the aggregation server 805 may optionally trigger an alert. For example, the aggregation server 805 may compare the consensus value determined at 835 to a threshold value. If the consensus value satisfies the threshold (e.g., exceeds the threshold value), the aggregation server 805 may trigger an alert. The alert may indicate a decreased health of the power grid system based on the measured values of the power grid metric.

In some cases, the aggregation server 805 may determine network nodes or regions including one or more network nodes that have sensor values that are the furthest outliers by Borda counting or Borda ranking values for each of the network nodes or regions to determine consensus values associated with the network nodes or regions and comparing the resulting consensus values. The regions may be determined based on geographical boundaries (e.g., zip codes, geospatial information, city boundaries, county boundaries, and the like), and a given region may include power grids associated with one or more power providers or utilities. For example, at 825, the aggregation server 805 may receive a set of data (e.g., a fifth set of data) from a different set of network nodes indicating the power grid metrics. That is, the network nodes 810 may be a part of a first group of network nodes (e.g., associated with a first geographic region) and the different set of network nodes may be part of a second group of network nodes (e.g., associated with a second geographic region). The first and second groups of network nodes may be disjoint, or may partially overlap (e.g., some network nodes in adjacent regions may be included in Borda counting or Borda ranking). Here, the fifth set of data may include a set of values of the power grid metrics measured by sensors or a ranking of a possible list of quantized values of the power grid metrics.

The aggregation server 805 may determine a sixth set of data indicating a relationship between the quantized set of values of the power grid metrics (e.g., within the fifth set of data) and the normalized ranges of the power grid metric.

The aggregation server 805 may determine a consensus value associated with the z-scores of each of the values within the fifth set of data. The aggregation server 805 may compare the consensus values associated with the second set of data (e.g., for the first network node or group of network nodes) and the fifth set of data (e.g. for the second network node or group of network nodes) to determine the most out of range set of network nodes. In some cases, the aggregation server 805 may generate data (e.g., the third set of data) indicating the most out of range group of network nodes.

Figure 9:
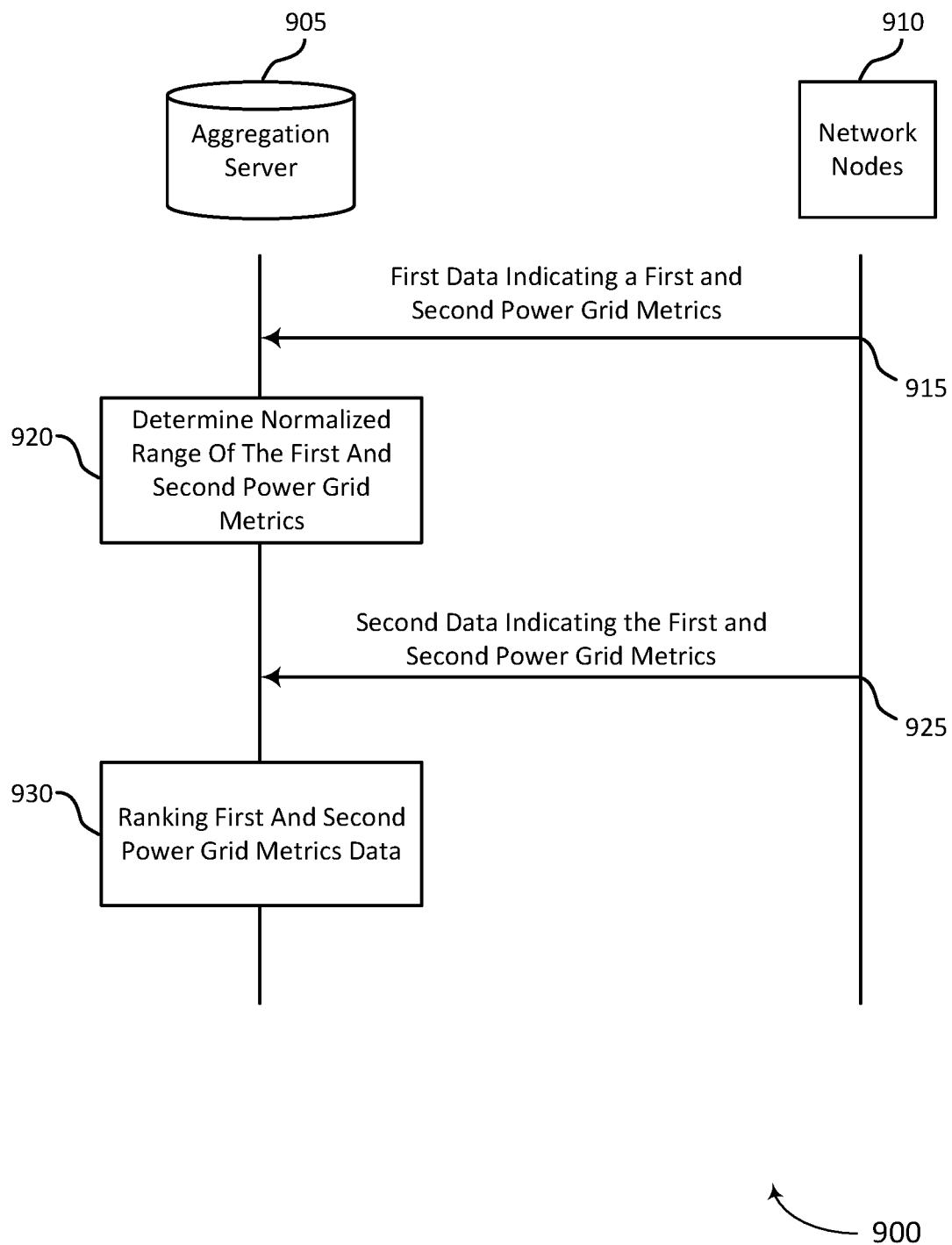

FIG. 9 illustrates an example of a process flow 900 that supports distributed, secure, power grid data collection, consensual voting analysis, and situational awareness and anomaly detection in accordance with aspects of the present disclosure. Although the FIG. 9 process flow is primarily discussed with respect to sensors configured to obtain power grid data, the process flow is applicable to sensors configured to obtain other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture. In some examples, FIG. 9 may illustrate aspects of FIGS. 1 through 8. For example, the aggregation server 905 may be an example of the aggregation servers as described with reference to FIGS. 1 through 8. Additionally, the network node 910 may be an example of a network node or a head-end as described with reference to FIGS. 1 through 8. The network nodes 910 and the aggregation server 905 may perform functions and communications to monitor a power grid. For example, the network nodes 910 may be network nodes 910 within a communications network such as a fiber or cable communications network. The network nodes 910 may provide a communication service to locations (e.g., including end devices) that are powered by the power grid. Thus, the network nodes 910 may receive data from sensors coupled with the power grid and communicate the data via the communications network to the aggregation server 905 for processing. The network nodes 910 may be powered by the power grid (e.g., as a primary power source), and may have a secondary or backup power source.

At 915, network nodes 910 may communicate, to the aggregation server 905, data indicating a first power grid metric and a second power grid metric. For example, the network nodes 910 may be coupled with a first set of sensors configured to measure a first power grid metric and a second set of sensors configured to measure a second power grid metric. In some cases, one or more of the sensors may be configured to measure both the first and second power grid metric.

At 920, the aggregation server 905 may determine a normalized range of the first and second power grid metrics indicated by the data received at 915. The aggregation server 905 may determine the normalized range by determining a consensus value of the metric indicated by the data (e.g., the first set of data). The aggregation server 905 may determine the consensus value by Borda counting and Borda ranking. That is, the data indicating the power grid metric may include a ranking of a possible list of quantized values (or, in some cases, a range) of the power grid metric (e.g., as described with reference to FIG. 6). Additionally or alternatively, the aggregation server may determine the ranking of the possible list of quantized values of the power grid metric based on the first and second power grid metric values indicated by the data received by the aggregation server 905 at 915. Thus, the aggregation server may determine, based on the consensual Borda count, normalized ranges of the first and second power grid metrics. In some cases, the aggregation server 905 may determine normalized ranges for the power grid metrics according to one or more factors. For example, the aggregation server 905 may determine normalized ranges for the power grid metrics based on a time of day, a time of year, or a geographical region.

At 925, the network node 910 may communicate a second set of data indicating the first and second power grid metrics. The second set of data may include a set of values of the power grid metric measured by sensors. Alternatively, the second set of data may include a ranking of a possible list of quantized values (or possible ranges for the power grid metric).

At 930, the aggregation server 905 may rank the first and second power grid metrics. That is, the aggregation server 905 may determine which of the first or second power grid metrics are most out of range. For example, the aggregation server 905 may determine a z-score for the first and second power grid metrics. In some cases, the aggregation server 905 may determine the z-score as described by Equation 1. The aggregation server 905 may, in some cases, weight the z-scores as described with reference to FIG. 8.

The aggregation server 905 may rank each network node 910 according to its z-score, as shown below with reference to Equation 4.

$$\text{rank}_{ij} = \text{sort}(z_{ij}) \qquad (4)$$

In Equation 4, the highest outlier (e.g., the network node 910 associated with a largest z-score) may have a rank N, where N is the number of sensor values for each network node. The aggregation server 905 may collect all the rank vectors (e.g., determined by Equation 4) and perform a Borda count for each sensor type (e.g., associated with the first power grid metric or the second power grid metric) according to Equation 5, shown below.

$$\text{vote}_j = \Sigma_i \, \text{rank}_{ij}$$

Accordingly, the sensor type with the most votes may correspond to the consensus most positively out of range sensor and the least votes may correspond to the most negatively out of range sensor. In some cases, if a network node 910 does not report a value for the power grid metric, the network node 910 may have not have a rank, which may not affect the highest vote-getters but may influence the vote count of the lowest vote-getter. In some cases, this may be rectified by 'range voting,' where the average rank is computed. Alternatively, the median rank may be used instead of the average. In either case, the missing data (e.g., a network node 910 that does not report a value) may not influence the vote.

Figure 10:
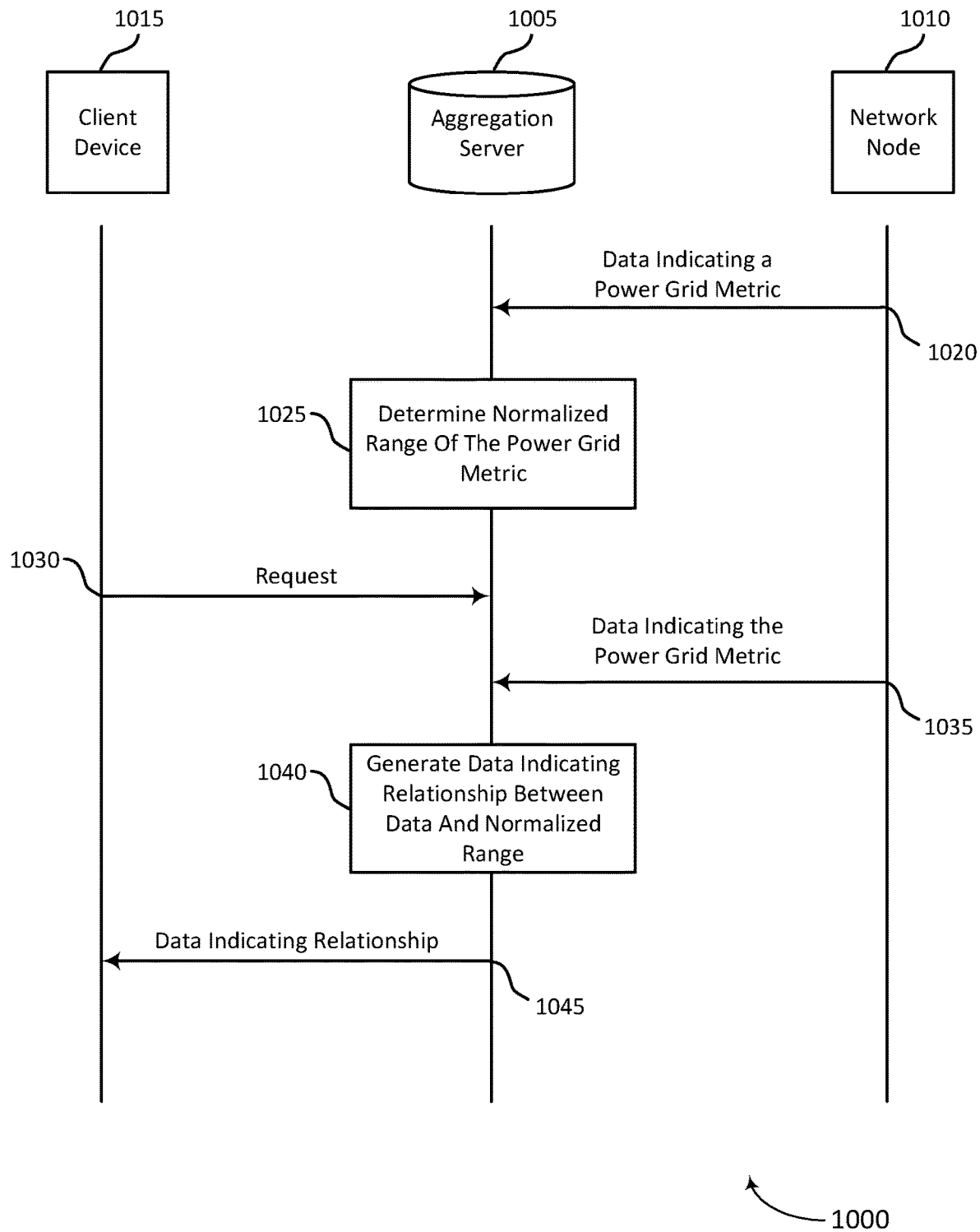

FIG. 10 illustrates an example of a process flow FIG. 10 that supports distributed, secure, power grid data collection, consensual voting analysis, and situational awareness and anomaly detection in accordance with aspects of the present disclosure. Although the FIG. 10 process flow is primarily discussed with respect to sensors configured to obtain power grid data, the process flow is applicable to sensors configured to obtain other types of data, including but not limited to data related to temperature, humidity, visible light, infrared light, ultraviolet light, radio-frequency signals, air quality, presence of smoke, presence of radiation, presence of electromagnetic pulses, motion, audio, and presence of moisture. In some examples, FIG. 10 may illustrate aspects of FIGS. 1 through 9. For example, the aggregation server 1005 may be an example of the aggregation servers as described with reference to FIGS. 1 through 9. Additionally, the network node 1010 may be an example of a network node or a head-end as described with reference to FIGS. 1 through 9. The network node 1010 and the aggregation server 1005 may perform functions and communications to monitor a power grid. For example, the network nodes 1010 may be network nodes 1010 within a communications network such as a fiber or cable communications network. The network nodes 1010 may provide a communication service to locations (e.g., including end devices) that are powered by the power grid. Thus, the network nodes 1010 may receive data from sensors coupled with the power grid and communicate the data via the communications network to the aggregation server 1005 for processing. The network nodes 1010 may be powered by the power grid (e.g., as a primary power source), and may have a secondary or backup power source. The process flow 1000 may further include a client device 1015. The client device 1015 may be configured to communicate with the aggregation server 1005.

At 1020, one or more network nodes 1010 may communicate, to the aggregation server 1005, data indicating a power grid metric. The one or more network nodes 1010 may be coupled with one or more sensors. The sensors may be configured to monitor the metric associated with the power grid. For example, each network node 1010 may be coupled with at least one sensor configured to monitor a voltage level associated with the power grid. In some cases, each network node 1010 may be coupled to a sensor configured to monitor more than one metric associated with the power grid (or more than one sensor, each configured to monitor a different metric). Here, the network node 1010 may collect data related to more than metric associated with the power grid (e.g., voltage, current, frequency, phase, phase jitter, power quality, or power factor). The data may include a set of values indicating the metric, each value determined by a different sensor or combination of sensors.

At 1025, the aggregation server 1005 may determine a normalized range of the power grid metric indicated by the data received at 1020. The aggregation server 1005 may determine the normalized range by determining a consensus value of the metric indicated by the data (e.g., the first set of data). The aggregation server 1005 may determine the consensus value by Borda counting and Borda ranking. That is, the data indicating the power grid metric may include a ranking of a possible list of quantized values (or, in some cases, a range) of the power grid metric (e.g., as described with reference to FIG. 6). Additionally or alternatively, the aggregation server may determine the ranking of the possible list of quantized values of the power grid metric based on the power grid metric values indicated by the data received by the aggregation server 1005 at 1020. Thus, the aggregation server may determine, based on the consensual Borda count, a normalized range of the power grid metric. In some cases, the aggregation server 1005 may determine a normalized range for the power grid metric according to one or more factors. For example, the aggregation server 1005 may determine a normalized range for the power grid metric based on a time of day, a time of year, or a geographical region.

At 1030, the aggregation server 1005 may receive a request from the client device 1015. For example, the client device 1015 may be associated with a power supplier. The request may include a request for a set of data (e.g., a third set of data) associated with a geographical region including a subset of the network nodes 1010 in communication with the aggregation server 1005.

At 1035, the one or more network nodes 1010 may communicate a second set of data indicating the power grid metric. In some cases, the one or more network nodes 1010 may be the same network nodes 1010 indicated within the request. The second set of data may indicate the same power grid metric and be collected by a same set of sensors (e.g., as the data communicated to the aggregation server 1005 at 1015).

At 1040, the aggregation server 1005 may generate data (e.g., the third set of data) indicating a relationship between the second set of data received at 1025 and the normalized range of the power grid metric determined at 1020. In some cases, the third set of data may be the data requested by the client device 1015 at 1030. The aggregation server 1005 may generate a third set of data indicating the consensus value indicated by the second set of data received at 1025 with respect to the normalized range. In another example, the aggregation server 1005 may generate a third set of data indicating a most out of range sensor. Here, the network node 1010 may communicate data associated with more than one metric (e.g., voltage and current). The aggregation server 1005 may determine which set of sensors (e.g., sensors measuring voltage, sensors measuring current) indicate a consensus value that is most different than the normalized range for that power grid metric. Additionally or alternatively, the aggregation server 1005 may determine which sensor (e.g., associated with the network node 1010 or a different network node) detects a value within the data indicated at 1025 that is most out of range when compared to the normalized range.

Certain embodiments of the systems discussed above are configured to stream sensor data, i.e., to continuously send sensor data in real-time, to one or more nodes via one or more communication networks, such as for stream processing of the sensor data where the sensor data is captured and analyzed "on the fly." For example, in certain embodiments of system 100 (FIG. 1), one or more sensors 150 are configured to continuously stream sensor data to aggregation server 110, and/or one or more other nodes, via communications network 162. In some embodiments, the sensor data sent to aggregation server 110 is raw data, i.e., data generated by sensors is not processed before being sent to aggregation server 110, other than as required for transmission via communications network 162 (e.g., conversion from analog form to digital form for transmission by communications network 162). For example, in certain embodiments, the sensor data is not analyzed, compressed, or batched before being sent to aggregation server 110, which helps minimize latency of sensor data received by aggregation server 110.

Additionally, in some embodiments, sensor data sent to aggregation server 110 is at least substantially lossless. In this document, sensor data is lossless if all sensor data generated during a sample period is sent to one or more nodes via one or more communication networks. Accordingly, lossless sensor data need not encompass all sensor data generated by a sensor; instead, lossless sensor data need only encompass all sensor data generated by the sensor during the sample period. Furthermore, lossless sensor data can be compressed if no data is lost. Moreover, any loss of sensor data after it leaves a sensor, such as due to dropped packets in a communication network transmitting the sensor data, does not cause lossless sensor data to lose its "lossless" characteristic. In this document, sensor data is "substantially lossless" if at least 98 percent of all sensor data generated during a sample period is sent to one or more nodes via one or more communication networks.

In embodiments of system 100 configured to continuously stream lossless sensor data to aggregation server 110, aggregation server 110 receives all data generated by sensors 150 during a sample period, instead of just snippets of the data. The fact that aggregation server 110 receives lossless sensor data may be particularly advantageous. For example, power grid 160 waveforms (e.g., voltage and/or current waveforms) sampled by sensors 150 can be regenerated from sensor data received by aggregation server 110, thereby enabling real-time remote monitoring of power grid 160, much like having an oscilloscope connected to power grid 160 at each sensor 150 location. Such ability to remotely monitor waveforms of power grid 160 in real-time offers unprecedented visibility into operation of power grid 160. For instance, assume an anomaly, such as a brownout, a surge, a fault, etc., occurs for only two alternating current (AC) cycles of power grid 160. This anomaly would last only around 33 or 40 milliseconds (assuming power grid 160 operates at 50 or 60 Hertz, respectively), and the anomaly would therefore likely not be captured by a power monitoring system that only periodically obtains sensor data. In embodiments of system 100 configured to continuously stream power grid 160 waveform data to aggregation server 110, in contrast, aggregation server 110 would receive waveform data captured during the anomaly (assuming sensors 150 capture data at a significantly greater rate than 50 or 60 Hertz), thereby enabling the anomaly to be detected and/or analyzed from data available at aggregation server 110.

Furthermore, certain embodiments of system 100 are configured to stream both sensor data and associated timing data to aggregation server 110, where timing data for a given sensor 150 indicates a time that the sensor captured its respective data. Consequently, aggregation server 110 can synchronize sensor data from a plurality of sensors 150, in these embodiments. Such ability to synchronize multiple sensor data streams can yield information about power grid 160 that cannot be obtained from unsynchronized data. For example, timing data for sensor data streams generated by multiple sensors 150 can be used to compare power grid 160 metrics captured by multiple sensors 150 at a common time, such as voltage at several locations on power grid 160 at a common time. Any significant difference in voltages captured by sensors 150 at a given time may indicate an anomaly because power grid 160 voltage will ideally be the same everywhere on a distribution line at a given time. It may not be possible to detect such anomaly with unsynchronized voltage data, however, because AC voltage varies over time, and measured voltages must therefore be synchronized to perform a meaningful comparison.

Discussed below are additional examples of systems that are configured to continuously stream sensor data to an aggregation server and/or other communication network node, such as for applications including but not limited to stream processing of sensor data. It is understood, though, that the present systems configured to continuously stream sensor data are not limited to these example embodiments.

Figure 11:
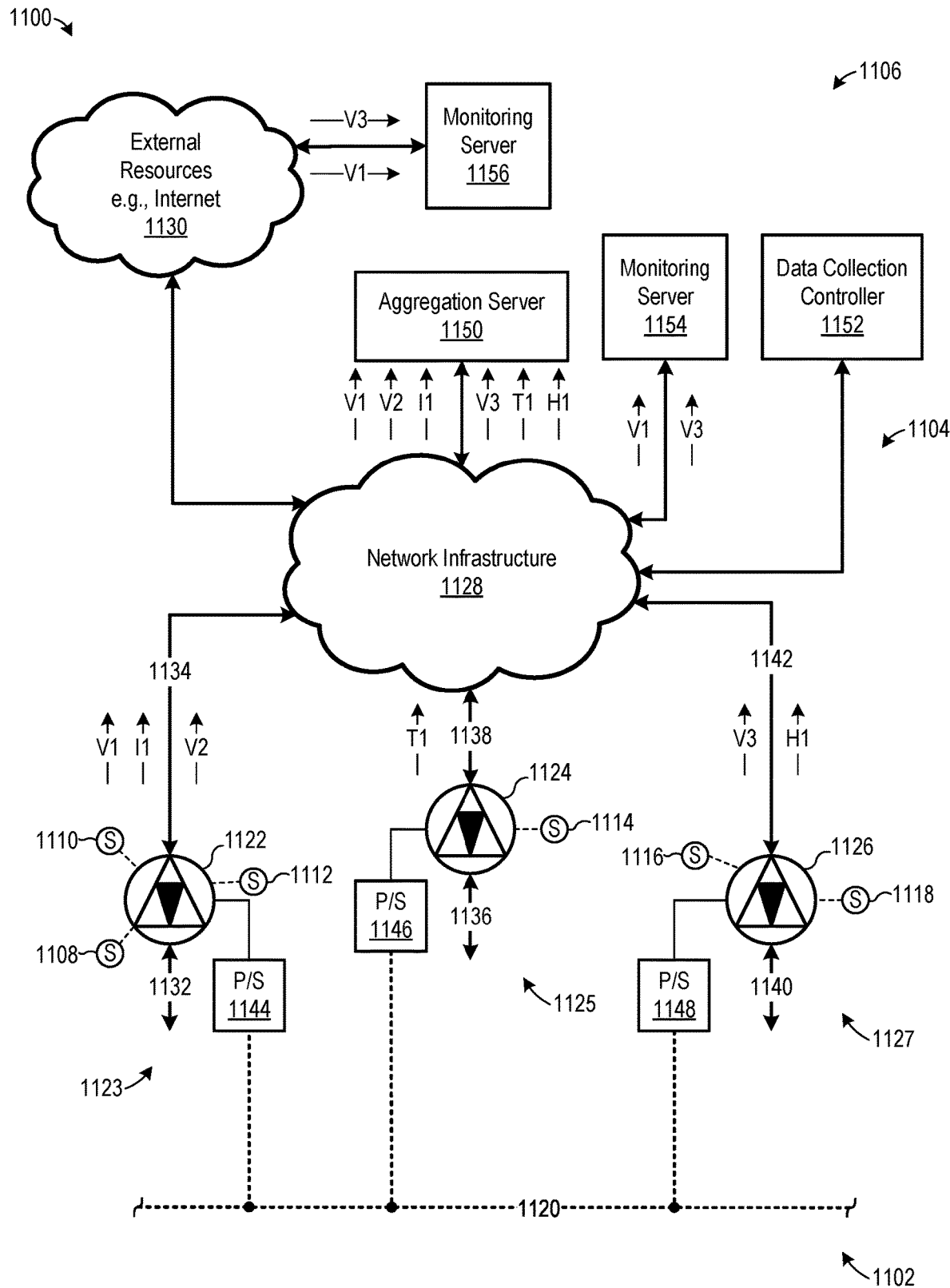
FIG. 11 is a block diagram of a system that is configured to continuously stream sensor data to one or more network nodes, according to an embodiment.

FIG. 11 is a block diagram of a system 1100 that is configured to continuously stream sensor data to one or more network nodes. System 1100 includes an electrical power grid 1102, a communications network 1104, a monitoring system 1106, and a plurality of sensors 1108-1118.

While only a single power line 1120 of electrical power grid 1102 is shown in FIG. 11 for illustrative clarity, it understood that electrical power grid 1102 can (and typically will) include additional elements, such as additional power lines, transformers, generation sources, switchgear, circuit breakers, fuses, etc. In some embodiments, electrical power grid 1102 is a distribution electrical power grid, and power line 1120 is accordingly a distribution power line. As known in the art, a distribution electrical power grid is configured to supply electrical power to end users, such as to homes and businesses, in a specific geographic area, such as in a city. As such, a distribution electrical power grid is different from a transmission electrical power grid which transmits electrical power over long distances. Additionally, while a distribution electrical power grid supplies electrical power to end users, a distribution electrical power grid typically does not encompass electrical power systems of the end users. For example, a distribution electrical power grid which provides electrical power to a house does not encompass electrical wiring within the house.

Communications network 1104, which is separate from electrical power grid 1102, serves at least part of a geographic area served by electrical power grid 1102. For example, communications network 1104 may provide wireline and/or wireless communication services to at least a portion of the geographic area served by electrical power grid 1102. FIG. 11 illustrates communications network 1104 as including fiber network nodes 1122, 1124, and 1126 that are communicatively coupled to external resources 1130 by network infrastructure 1128. Fiber network nodes 1122, 1124, and 1126 are located at node sites 1123, 1125, and 1127, respectively. Each fiber network node 1122, 1124, 1126 serves end users (not shown), such as homes or businesses, in a respective geographic area. For example, in a particular embodiment, each of fiber network nodes 1122, 1124, and 1126 serves end users in different respective neighborhoods. Each fiber network node 1122, 1124, 1126 is configured to communicatively interface one or more electrical cables serving end users with optical cables coupled to network infrastructure 1128. Specifically, fiber network node 1122 communicatively interfaces one or more electrical cables 1132 with one or more optical cables 1134, fiber network node 1124 communicatively interfaces one or more electrical cables 1136 with one or more optical cables 1138, and fiber network node 1126 communicatively interfaces one or more electrical cables 1140 with one or more optical cables 1142. Fiber network nodes 1122, 1124, and 1126 include, for example, cable fiber nodes, telecommunications remote terminals (RTs), or optical network units (ONUs).

The configuration of communications network 1104 may vary without departing from the scope hereof. For example, one or more of fiber network nodes 1122, 1124, and 1126 could be replaced by a different type of network node, such as a wireless base station. Additionally, the number of network nodes of communications network 1104 may vary without departing from the scope hereof. Furthermore, while FIG. 11 depicts fiber network nodes 1122, 1124, and 1126 being communicatively coupled to network infrastructure 1128 in a star configuration, the topology of communications network 1104 could vary. For example, optical cables 1134, 1138, and 1142 could be replaced with a single optical cable communicatively coupling fiber network nodes 1122, 1124, and 1126 to network infrastructure 1128 in a ring configuration.

Fiber network nodes 1122, 1124, and 1126 are electrically powered from electrical power grid 1102 via respective power supplies 1144, 1146, and 1148. Power supplies 1144, 1146, and 1148 are located at node sites 1123, 1125, and 1127, respectively. Each power supply 1144, 1146, and 1148 electrically interfaces its respective fiber network node 1122, 1124, and 1126 with power line 1120. In some embodiments, each power supply 1144, 1146, and 1148 is configured to convert electrical power on power line 1120 to a form that is compatible with its respective fiber network node 1122, 1124, 1126. For example, each power supply 1144, 1146, and 1148 may convert voltage and/or frequency of electrical power on power line 1120 to values that are compatible with its respective fiber network node 1122, 1124, 1126. Accordingly, some embodiments of power supplies 1144, 1146, and 1148 include power conversion circuitry. Additionally, power supplies 1144, 1146, and 1148 optionally include one or more backup power sources, such as backup batteries and/or a backup generator, that are configured to electrically power their respective fiber network nodes 1122, 1124, and 1126 if electrical power grid 1102 is unavailable, such as due to a power failure. Although FIG. 11 depicts power supplies 1144, 1146, and 1148 being separate for their respective fiber network nodes 1122, 1124, and 1126, the power supplies could be partially or fully integrated with their respective fiber network nodes without departing from the scope hereof.

Network infrastructure 1128 communicatively couples network nodes of communications network 1104 to external resources 1130. External resources 1130 include, for the example, the public Internet, one or more additional communications networks, and/or external content sources. Network infrastructure 1128 may include, without limitation, one or more of optical communication links, electrical communication links, wireless communication links, splitters, concentrators, amplifiers, repeaters, modem termination systems, optical line terminals, routers, switches, servers, etc. In some embodiments, network infrastructure 1128 includes cable network infrastructure, wireline telecommunications infrastructure, and/or wireless telecommunications structure.

Monitoring system 1106 includes an aggregation server 1150, a data collection controller 1152, a monitoring server 1154, and a monitoring server 1156. Aggregation server 1150 is configured to receive sensor data from sensors 1108-1118 via communications network 1104. Data collection controller 1152 is configured to control generation and delivery of sensor data from sensors 1108-1118, and monitoring servers 1154 and 1156 are configured to provide access to sensor data and/or to analyze sensor data. The number and configuration of monitoring severs of Monitoring system 1106 may vary without departing from the scope hereof, and in some alternate embodiments, one or more monitoring servers are integrated with aggregation server 1150. The functions of aggregation server 1150, data collection controller 1152, and monitoring servers 1154 and 1156 are discussed further below. Each of aggregation server 1150, data collection controller 1152, and monitoring server 1154 is directly connected to communications network 1104, and each of these elements if therefore a respective network node of communications network 1104. Monitoring server 1156, in contrast, is indirectly communicatively coupled to communications network 1104 via external resources 1130. Nevertheless, monitoring server 1156 may potentially be considered another network node of system 1100, such as if monitoring server 1156 is part of a private network established by data collection controller 1152. Private networks are discussed further below with respect to FIG. 14.

Each sensor 1108-1118 is configured to generate sensor signals representing one or more characteristics at a respective node site 1123, 1125, or 1127, where possible characteristics include, but are not limited, characteristics of electrical power grid 1102, characteristics of communication network 1104, and environmental characteristics. In this particular example, sensors 1108-1118 are configured as follows. Sensor 1108 is configured to generate sensor signals V1 representing voltage of electrical power grid 1102 at node site 1123. In some embodiments, voltage V1 represents actual voltage of power line 1120, while in some other embodiments, voltage V1 represents a voltage that is derived from voltage of power line 1120. Sensor 1110 is configured to generate sensor signals I1 representing electrical current flowing from power supply 1144 to fiber network node 1122. In an alternate embodiment, however, sensor 1110 is configured to generate sensor signals I1 representing electrical current flowing through power line 1120 at node site 1123. Sensor 1112 is configured to generate sensor signals V2 representing voltage provided by power supply 1144 to fiber network node 1122.

Sensor 1114 is located at node site 1125 and is configured to generate sensor signals T1 representing a temperature at node site 1125. In some embodiments, the temperature at node site 1125 is an ambient temperature at node site 1125 while in some other embodiments, the temperature at node site 1125 is an internal temperature of fiber network node 1124 and/or power supply 1146. Each of sensors 1116 and 1118 is located at node site 1127. Sensor 1116 is configured to generate sensor signals V3 representing voltage of electrical power grid 1102 at node site 1127. In some embodiments, voltage V3 represents actual voltage of power line 1120, while in some other embodiments, voltage V3 represents a voltage that is derived from voltage of power line 1120. Sensor 1118 is configured to generate sensor signals H1 representing humidity at node site 1127. In some embodiments, the humidity at node site 1127 is an ambient humidity at node site 1127, while in some other embodiments, the humidity at node site 1127 is an internal humidity of fiber network node 1126 and/or power supply 1148. As discussed below, each sensor 1108-1118 sends it respective sensor data V1, I1, V2, T1, V3, and H1 to aggregation sever 1150 (and/or another network node) via communications network 1104.

The number, configuration, and locations of sensors in system 1100 may vary as a design choice. For example, system 1100 could be modified so that there are additional sensors at node site 1125 or so that there are fewer sensors at node site 1123. Additionally, sensors of system 1100 are not limited to voltage sensors, current sensors, temperature sensors, and humidity sensors. Instead, a sensor could be configured to sense essentially any characteristic that can be sensed at a node site. Examples of other possible sensor types include, but are not limited to, a visible light sensor, an infrared light sensor, an ultraviolet light sensor, a radiofrequency signal sensor, an air quality sensor, a smoke sensor, a radiation sensor, an electromagnetic pulse sensor, a motion sensor, an audio sensor, and a moisture sensor. Below are several example applications of sensors of system 1100 for applications other than monitoring electrical power grid 1102. Sensors of system 1100, though, are not limited to these example applications.

A temperature sensor and a humidity sensor could each used to gather weather data in an area served by communications network 1104. A visible light sensor could be placed inside a cabinet of fiber network node 1122, 1124, 1126, or its associated power supply 1144, 1146, 1148, to detect the cabinet being open. An infrared light sensor could be used to detect a fire or other abnormal heat source in the vicinity of a node site 1123, 1125, 1127. An ultraviolet light sensor could be used, for example, to generate data for calculating a UV index in an area served by communications network 1104. A radio frequency sensor could be used to determine what radio frequency spectrum is in use in an area served by communications network 1104, such as to help determine ideal frequencies for communication signals in network 1104. An air quality sensor could be used to determine air quality in an area served by communications network 1104, as well to detect presence of one or more airborne contaminants. A smoke sensor may be used to detect a fire in the vicinity of a node site 1123, 1125, 1127, and a radiation sensor could be used to detect presence of radiation in the vicinity of a node site 1123, 1125, 1127. An electromagnetic pulse sensor could be used to detect abnormal electromagnetic activity in the vicinity of a node site 1123, 1125, 1127. A motion sensor could be used to detect motion at a node site 1123, 1125, 1127, such as for security purposes, and a moisture sensor could be used to detect flooding at a node site 1123, 1125, 1127. An audio sensor could be used to detect unusual sounds, such as gunshot sounds, in the vicinity of a node site 1123, 1125, 1127.

Sensors of system 1100 need not have a static configuration. Instead, the sensors could be reconfigurable. For example, one or more sensors could be a software defined sensor where a characteristic sensed by the sensor is defined by software. Furthermore, one or more sensors of system 1100 could be virtual sensors, i.e., sensors implemented in software and/or firmware. For example, a sensor measuring communications network latency, as experienced by a fiber network node 122, 1124, 1126, could be implemented by a processor of the fiber node executing instructions in software and/or firmware stored in a memory of the fiber network node. As another example, a processor of a monitoring device could be configured to poll a telemetry module of a fiber network node 122, 1124, 1126, or its respective power supply 1144, 1146, 1148, to obtain sensor data generated internal to the fiber network node or power supply.

While FIG. 11 includes dashed lines depicting each sensor 1108-1118 being logically associated with its respective fiber network node 1122, 1124, or 1126, the sensors need not be physically integrated in their respective fiber network node. For example, one or more sensors 1108-1118 could be physically located in the power supply 1144, 1146, or 1148 powering its respective fiber network node. In some of these embodiments, a sensor uses a modem or other communication device of a power supply 1144, 1146, or 1148 to communicatively interface the sensor with communications network 1104. As another example, one or more sensors 1108-1118 could be located in their own respective enclosures at their respective node sites 1123, 1125, 1127.

Each sensor 1108-1118 is electrically powered by the power supply 1144, 1146, 1148 of its respective node site 1123, 1125, 1127. For example, each of sensors 1108, 1110, and 1122 is powered by power supply 1144. Such configuration is particularly advantageous in embodiments where power supplies 1144, 1146, and 1148 include a backup power source because the backup power source enables the sensors to remain operating even when electrical power grid 1102 is unavailable. Accordingly, sensors in these embodiments may be capable of detecting and reporting electrical power grid 1102 status, and/or status of other sensed characteristics, even when electrical power grid 1102 is unavailable or incapable of providing reliable electrical power to the sensors.

In some embodiments, sensor data V1, I1, V2, T1, V3, and H1 is raw and/or lossless. Additionally, each sensor 1108-1118 is configured to stream it generated sensor data to aggregation sever 1150, or in other words, each sensor 1108-1118 is configured to continuously send its sensor data to aggregation server 1150 as the sensor data is generated, via communications network 1104. Accordingly, aggregation server 1150 receives sensor data V1, I1, V2, T1, V3, and H1 in real-time, such as for stream processing of the sensor data by aggregation server 1150 and/or by a monitoring server. Aggregation server 1150 is optionally configured to store received sensor data V1, I1, V2, T1, V3, and H1. One or more monitoring severs, such as monitoring sever 1154 and/or monitoring server 1156, may obtain some or all of sensor data V1, I1, V2, T1, V3, and H1 from aggregation server 1150. Alternately or additionally, one or more sensors 1108-1118 may send its sensor data directly to monitoring server 1154 and/or 1156, so that the monitoring server does not need to obtain the sensor data from aggregation sever 1150. FIG. 11 illustrates monitoring servers 1154 and 1156 receiving sensor data V1 and V3 respectively generated by sensors 1108 and 1116, although such illustration should not be construed as a limitation on what sensor data is received by the monitoring servers. In some embodiments, monitoring servers 1154 and 1156 are operated by different parties who both have interest in sensor data V1 and V3. For example, monitoring server 1154 may be operated by an owner of communications network 1104 and monitoring server 1156 may be operated by an owner of electrical power grid 1102.

Sensors 1108-1118 are configured to send their respective sensor data V1, I1, V2, T1, V3, and H1 to aggregation server 150, for example, by generating data packets including the sensor data and sending the data packets to aggregation server 1150 via communications network 1104. In some embodiments, sensors 1108-1118 are configured to generate the data packets such that the data packets comply with a raw data transmission protocol (RDTP), where a RDTP is a data transmission protocol designed for transmitting raw data. Use of a RDTP to transmit sensor data V1, I1, V2, T1, V3, and H1, instead of a data transmission protocol designed for transmission of other data types, helps minimize use of communications network 1104 resources for transmitting the sensor data. Use of a RDTP also helps minimize latency of sensor data V1, I1, V2, T1, V3, and H1, and the RDTP may therefore be particularly useful in stream processing applications of the sensor data. In some embodiments, the RDTP is a binary protocol, i.e., a protocol that uses all values of a data structure, instead of a text-based protocol which uses only data structure values corresponding to human-readable characters, to maximize transmission efficiency. One example of a RDTP payload configuration is discussed below with respect to FIG. 26.

Some embodiments of sensors 1108-1118 are configured to generate data packets such that the data packets include timing data and/or location data, as well as sensor data. The timing data indicates at what time the sensor data was captured or sampled by its respective sensor. For example, timing data accompanying sensor data V1 indicates when sensor 1108 sampled voltage on power line 1120. Inclusion of timing data in data packets advantageously enables the sensor data to be synchronized, such as by aggregation sever 1150 and/or monitoring severs 1154 and 1156. The timing data is, for example, (1) free-running timing data, (2) global positioning system (GPS) timing data, (3) network timing data, e.g., timing data that complies with a time protocol of communications network 1104, or (4) timing data that complies with an Institute of Electrical and Electronics Engineers (IEEE) 1588 Precision Time Protocol. Location data indicates where a sensor generating corresponding data packets is located, such as longitude and latitude of the sensor. Accordingly, location data could be used by aggregation server 1150 and/or monitoring servers 1154 and 1156 to construct a map of electrical power grid 1102 and/or a map of communications network 1104, because the location data indicates locations of the sensors.

One or more of sensors 1108-1118 are optionally further configured to locally store their generated sensor data, such as to enable the sensor data to be obtained, albeit not in real-time, if communications network 1104 is unavailable to transmit the sensor data to aggregation server 1150. Some embodiments of sensors 1108-1118 are configured to automatically (1) locally store generated sensor data when communications network 1104 is unavailable and (2) subsequently send the stored sensor data to aggregation server 1150 when communications network 1104 is available again.

Monitoring servers 1154 and 1156 are configured, for example, to access some or all of sensor data V1, I1, V2, T1, V3, and H1, such as to enable monitoring of electrical power grid 1102, and/or the environment of electrical power grid 1102, in real-time or on a historical basis. Monitoring servers 1154 and 1156 may also be configured to analyze sensor data in-real time and/or off-line. Furthermore, some embodiments of monitoring servers 1154 and 1156 are configured to automatically detect occurrence of an event, such as an anomaly on electrical power grid 1102, or an unusual situation in the vicinity of one or more node sites 1123, 1125, 1127, from sensor data. Discussed below are several example configurations of monitoring servers 1154 and 1156. However, it is understood that monitoring servers 1154 and 1156 are not limited to these example configurations.

Figure 12:
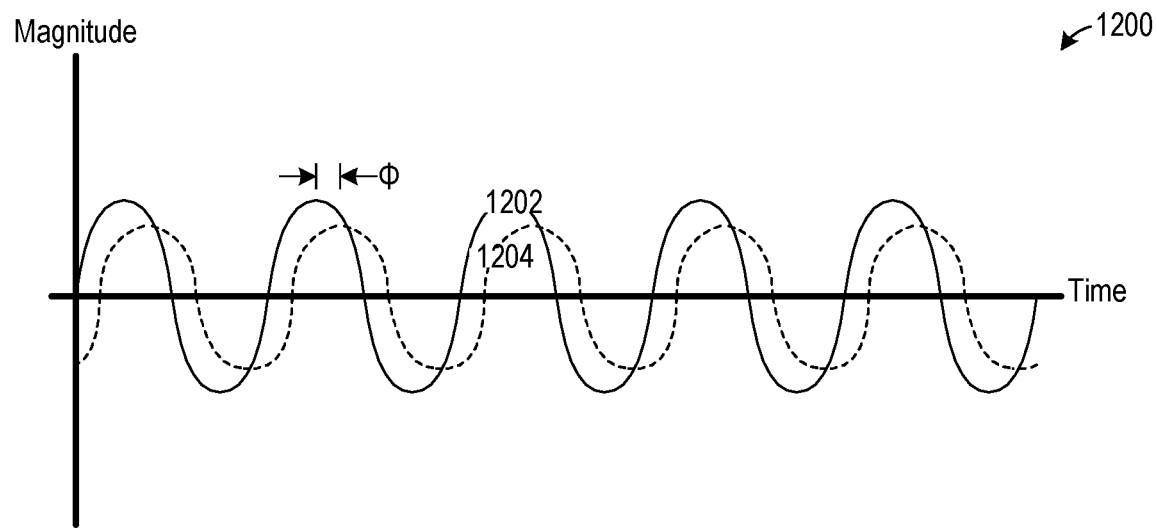
FIG. 12 is one example of a graph generated by a monitoring server of the FIG. 11 system.

One embodiment of monitoring server 1154 is configured to generate a graph 1200 (FIG. 12) of real-time voltage and current versus time from sensor data V1, sensor data I1, and corresponding timing data. Monitoring server 1154 is configured, for example, to display graph 1200 to a user and/or to provide the data of graph 1200 to an application, such as an electrical power grid monitoring application. Curve 1202 represents voltage of electrical power grid 1102 as sensed by sensor 1108 at node site 1123, and curve 1204 represents current sensed by sensor 1110 at node site 1123. Accordingly, graph provides 1200 essentially the same information as would an oscilloscope connected to electrical lines at node site 1123, thereby enabling remote monitoring and/or troubleshooting of electrical power grid 1102 and/or power supply 1144.

Figure 13:
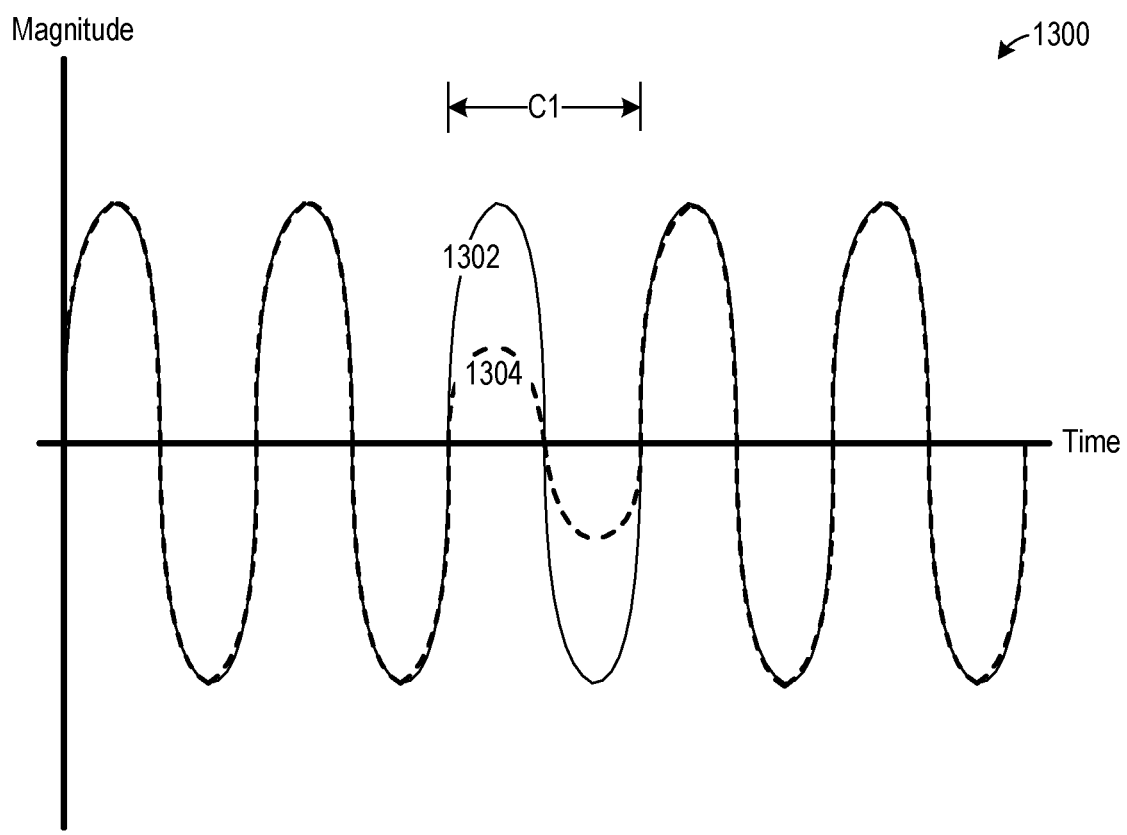
FIG. 13 is another example of a graph generated by a monitoring server of the FIG. 11 system.

Additionally, one embodiment of monitoring server 1154 is configured to generate a graph 1300 (FIG. 13) of real-time voltage versus time from sensor data V1, sensor data V3, and corresponding timing data. Monitoring server 1154 is configured, for example, to display graph 1300 to a user and/or to provide the data of graph 1300 to an application, such as an electrical power grid monitoring application. Curve 1302 represents voltage on power line 1120 at node site 1123 as sensed by sensor 1108, and curve 1304 represents voltage on power line 1120 as sensed by sensor 1116 at node site 1127. The two voltages should ideally be the same because voltage on power line 1120 should be the same along an entire length of power line 1120, neglecting non-idealities in power line 1120. Indeed, graph 1300 shows the two power line voltages being the same during most of the time-period captured by graph 1300. However, voltage at node site 1127 is less than voltage at node site 1123 during cycle C1, which indicates a brown-out condition on power line 1120 at node site 1127. It should be noted that the lossless nature of sensor data V1 and V3 enables construction of real-time curves 1302 and 1304 so that individual cycle C1 can be observed. If sensor data V1 and V3 were instead snippets of data generated by sensors 1108 and 1116, respectively, it is unlikely that the sensor data would have sufficient granularity to capture the brownout in cycle C1.

Some embodiments of monitoring servers 1154 and/or 1156 are configured to analyze sensor data, such as to provide real-time or long term-analytics based on some, or all, of the sensor data. For example, certain embodiments are configured to analyze sensor data to provide real-time and/or long-term analytics for electrical power grid 1102 or another sensed characteristics. For example, a particular embodiment of monitoring server 1154 is configured to analyze sensor data V1 and V3 to provide real-time detection and notification of an anomaly, such as a brownout, surge, fault, etc., on electrical power grid 1102. Additionally, some embodiments of monitoring server 1154 are configured to analyze sensor data to determine phase offset between voltage and current waveforms in a particular portion of electrical power grid 1102 and thereby determine direction of electrical power flow in this portion of electrical power grid 1102. Furthermore, some embodiments of monitoring server 1154 are configured to analyze sensor data collected over a significant time-period, such as to provide a report of power grid 1102's performance over this time-period. Monitoring servers 1154 and/or 1156 optionally use techniques such as rotating time slice and/or parallel processing to efficiently analyze sensor data.

Some embodiments of aggregation server 1150 and/or or monitoring servers 1154 and 1156 are configured to provide third-party access to sensor data received from sensors 1108-1118, such as real-time sensor data and/or stored historical sensor data. Accordingly, certain embodiments of monitoring servers 1154 and 1156 include an application programing interface (API), or similar feature, to provide third-party access to sensor data of system 1100.

Although monitoring servers 1154 and 1156 are illustrated in FIG. 11 as being discrete elements, one or more of these servers may include multiple elements that need not be disposed at a common location. For example, one or more of monitoring servers 1154 and 1156 could be implemented in a distributed computing environment, sometimes referred to as a "cloud" computing environment. In some embodiments, the distributed computing environment includes "edge" computing resources, i.e., computing resources located relatively close to the sensors of system 1100, to minimize latency in sensor data received by the distributed computing resources.

As mentioned above, data collection controller 1152 is configured to control generation and delivery of sensor data from sensors 1108-1118. For example, certain embodiments of data collection controller 1152 are configured to start and stop operation of sensors 1108-1118, and some embodiments of data collection controller 1152 are configured to set sensor data transmission rate of one or more sensors 1108-1118. Data collection controller 1152 may also be configured to provision new sensors 1108-1118, authenticate sensor data from sensors 1108-1118, and/or control encryption of sensor data.

Additionally, some embodiments of data collection controller 1152 are configured to control delivery of sensor data to monitoring servers 1154 and 1156, as well as to other recipients of sensor data. For example, data collection controller 1152 may be configured to control delivery of sensor data V1 and V3 to monitoring servers 1154 and 1156. Data collection controller 1152 is not limited to controlling sensor data delivery merely by starting and stopping sensor data delivery. Instead, particular embodiments of data collection controller 1152 are further configured to control rate of sensor data delivery to a monitoring server or other recipient. For instance, assume that monitoring server 1154 requires sensor data V1 and V3 in high resolution, while monitoring server 1156 can achieve acceptable operation with sensor data in low resolution. Data collection controller 1152 may be configured to cause every data packet encompassing sensor data V1 and V3 to be delivered to monitoring server 1154 to achieve high resolution, while causing only every other data packet encompassing sensor data V1 and V3 to be delivered to monitoring server 1156 to reduce data transmission bandwidth consumed by transmitting sensor data.

Certain embodiments of data collection controller 1152 are configured to control delivery of sensor data to a recipient by establishing a private network (secure connection) encompassing the requisite sensor(s) and the recipient. In some embodiments, the private network is a virtual private network (VPN) between a sensor and a recipient, such that sensor data is encrypted while be transmitted between the sensor and the recipient. In some other embodiments, the private network is a "Micronet." A Micronet is a type of private network that offers significant advantages over a conventional VPN. For example, some Micronet embodiments are configured to automatically organize connected devices, such as one or more sensors and a monitoring server, into a trusted domain. The devices within the trusted domain can securely communicate with each other, and the Micronet may permit limited communication between devices within the trusted domain and devices outside of the trusted domain. Additional information on Micronets may be found in U.S. Patent Application Publication No. 2020/0092254, published on May 19, 2020, which is incorporated herein by reference.

Figure 14:
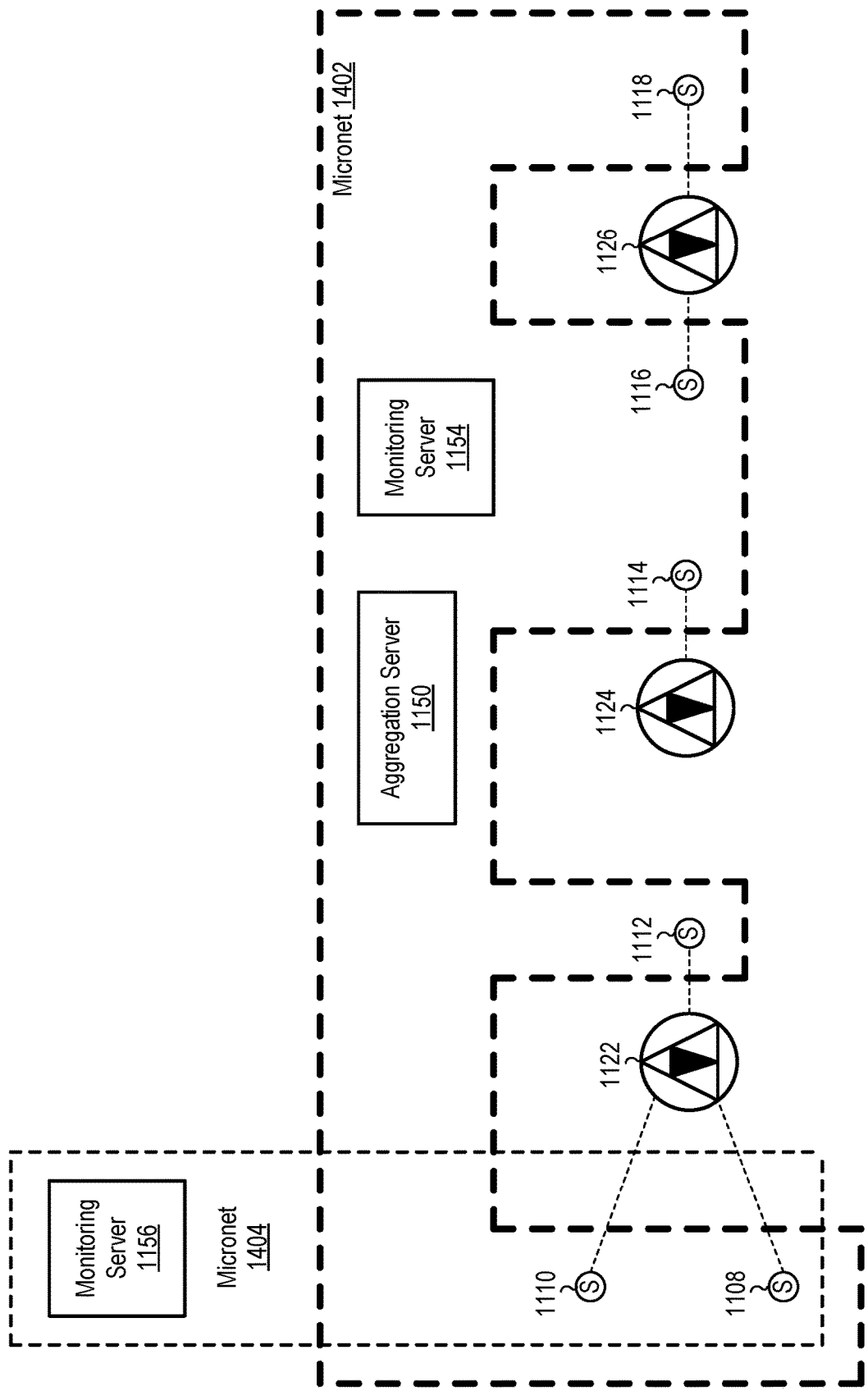
FIG. 14 illustrates an example logical private network configuration of the FIG. 11 system, according to an embodiment.

FIG. 14 illustrates one example logical Micronet configuration of system 1100 by data collection controller 1152. In this example logical configuration, data collection controller 1152 has established two Micronets, i.e., Micronets 1402 and 1404. Micronet 1402 logically encompasses each of sensors 1108-1118 as well as aggregation server 1150 and monitoring server 1154. Accordingly, sensors 1108-1118, aggregation server 1150, and monitoring server 1154 can freely and securely communicate with each other. In one embodiment, the elements encompassed by Micronet 1402 are operated by a common party, such as by the owner of communication network 1104 or the owner of power grid monitoring system 1106. Micronet 1404, on the other hand, encompasses sensors 1108 and 1110, as well as monitoring server 1156. Accordingly, sensor 1108, sensor 1110, and monitoring server 1156 can freely and securely communicate with each other. However, monitoring server 1156 cannot access data associated with sensors 1112-1118, aggregation server 1150, or monitoring server 1154, unless permitted by Micronet 1402. The FIG. 14 logical configuration may be particularly advantageous in applications where (1) sensors 1108-1118, aggregation server 1150, and monitoring server 1154 are operated by a first party, (2) monitoring server 1156 is operated by a second party, and (3) the first party wishes to limit the second party to accessing solely sensor data generated by sensors 1108 and 1110.

One or more of Micronets 1402 and 1404 could be replaced with a different type of private network. For example, Micronet 1404 could be replaced with two VPNs, i.e., a first VPN logically connecting sensor 1108 and monitoring server 1156 and a second VPN logically connecting sensor 1110 and monitoring server 1156.

FIGS. 15-20 collectively illustrate several example embodiments of node site 1123 of FIG. 11. However, the configuration of node site 1123 (and other node sites of system 1100) is not limited to these example configurations. Additionally, other node sites of system 1100 could be configured in a manner similar to any of the examples of FIGS. 15-20.

Figure 15:
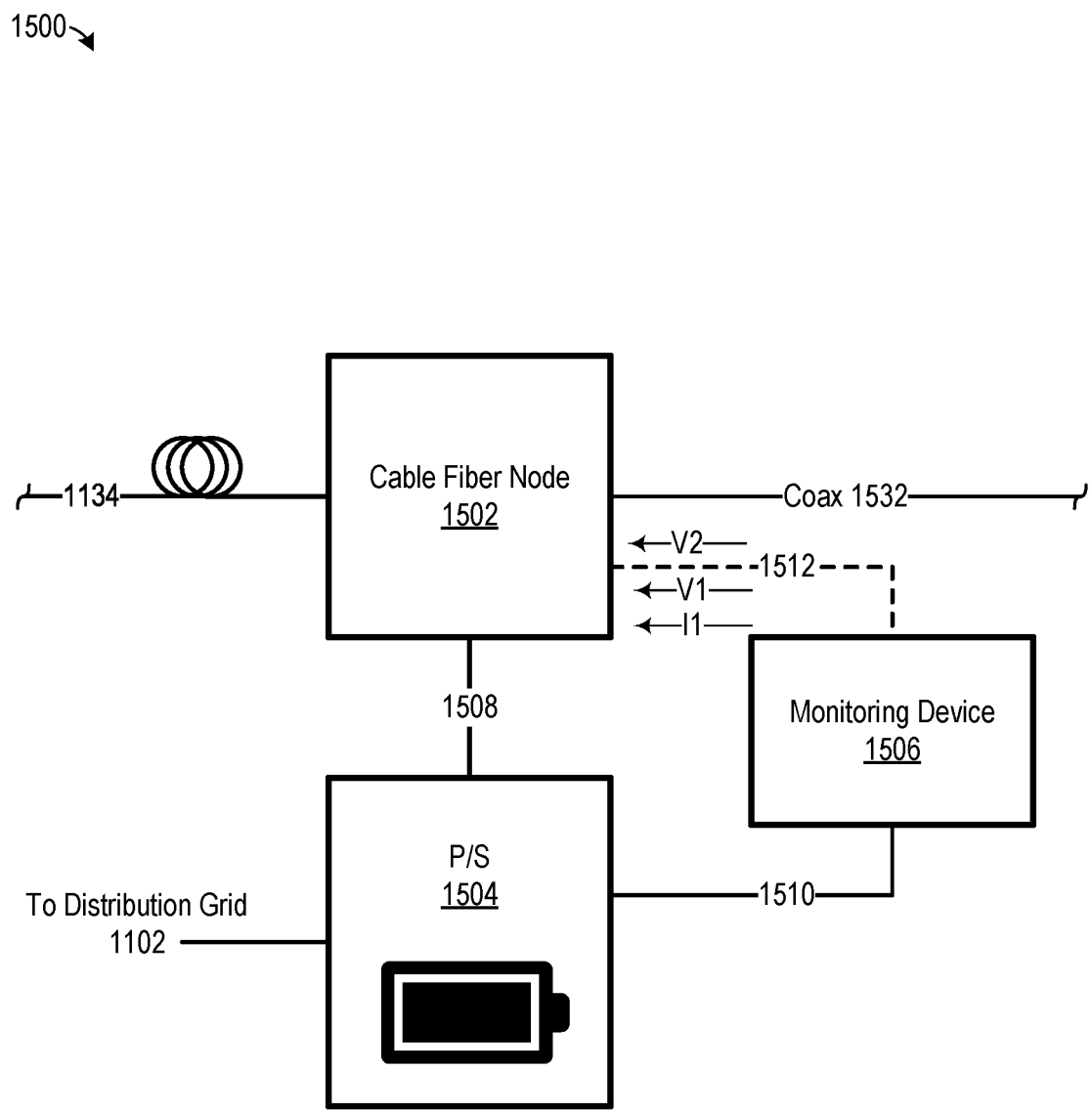
FIG. 15 is a block diagram of a node site including a cable fiber node, according to an embodiment.

FIG. 15 is a block diagram of a node site 1500, which is one possible embodiment of node site 1123 of FIG. 11. Node site 1500 includes a cable fiber node 1502, a power supply 1504, and a monitoring device 1506. Cable fiber node 1502 is an embodiment of fiber network node 1122 of FIG. 11. Cable fiber node 1502 is configured to interface one or more coaxial electrical cables 1532, which are embodiments of electrical cables 1132 of FIG. 11, with one or more optical cables 1134. Power supply 1504, which is an embodiment of power supply 1144 of FIG. 11, is configured to provide electrical power to cable fiber node 1502 and monitoring device 1506 via electrical buses 1508 and 1510, respectively. Power supply 1504 includes a backup electrical power source, as symbolically shown by a battery symbol, so that power supply 1504 is capable of powering cable fiber node 1502 and monitoring device 1506 even when electrical power grid 1102 is unavailable. Monitoring device 1506 encompasses each of sensors 1108, 1110, and 1112 which are internal to monitoring device 1506 and are therefore not shown in FIG. 15. Accordingly, monitoring device 1506 is configured to generate sensor data V1, I1, and V2, which is communicatively coupled to cable fiber node 1502 for transmission to aggregation server 1150, as symbolically shown by a logical connection 1512 between monitoring device 1506 and cable fiber node 1502. Logical connection 1512 need not be a physical connection between monitoring device 1506 and cable fiber node 1502. For example, monitoring device 1506 could instead be physically connected to a modem (not shown) in power supply 1504, where the modem is physically connected to cable fiber node 1502, such that sensor data V1, I1, and V2 is transmitted to cable fiber node 1502 via power supply 1504.

Figure 16:
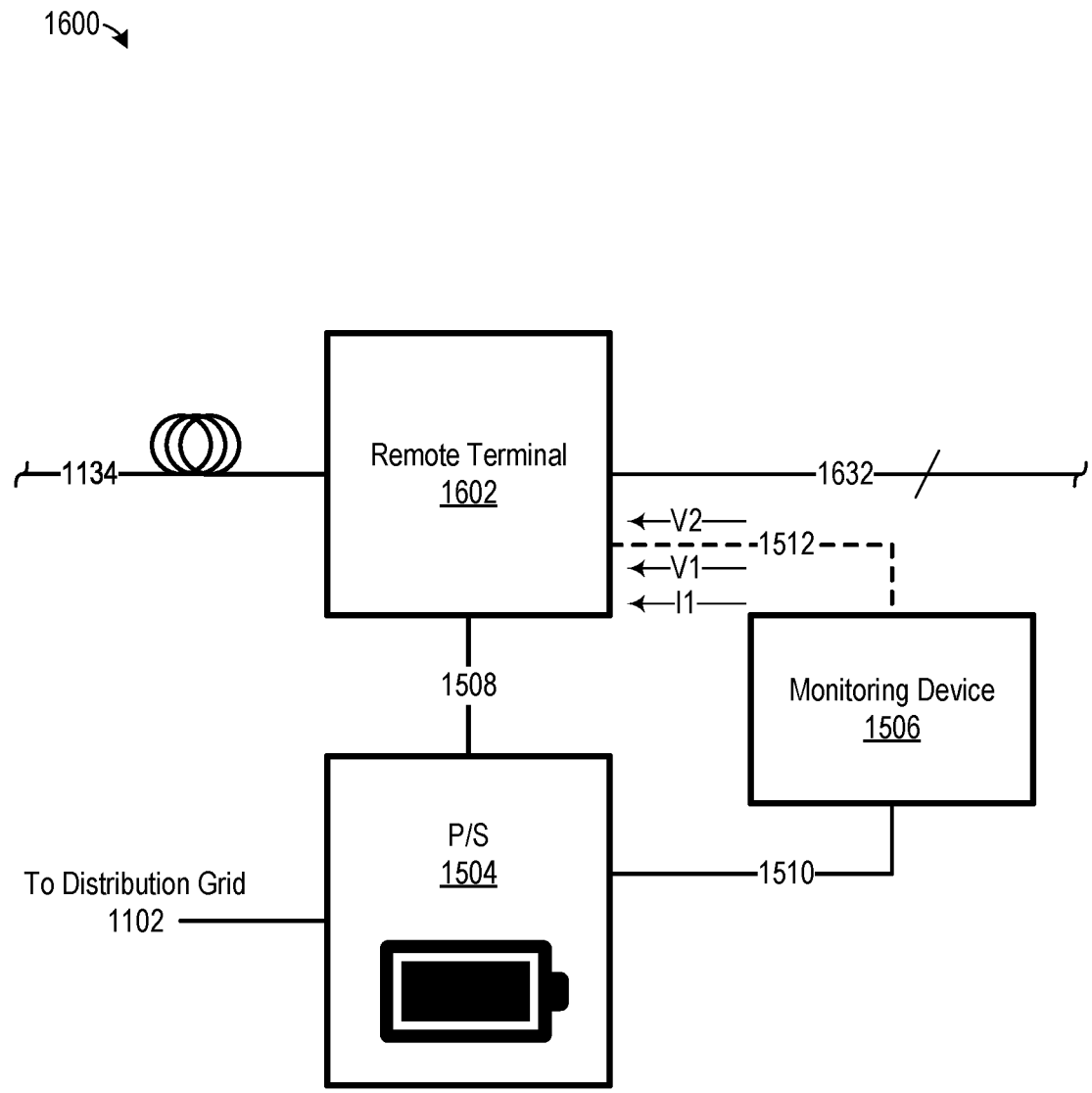
FIG. 16 is a block diagram of a node site including a telecommunications remote terminal, according to an embodiment.

FIG. 16 is a block diagram of a node site 1600, which is an alternate embodiment of node site 1500 of FIG. 15 where cable fiber node 1502 is replaced with a telecommunications remote terminal 1602. Remote terminal 1602 is an embodiment of fiber network node 1122 of FIG. 11. Remote terminal 1602 is configured to interface one or more twisted pair telephone electrical cables 1632, which are embodiments of electrical cables 1132 of FIG. 11, with one or more optical cables 1134.

Figure 17:
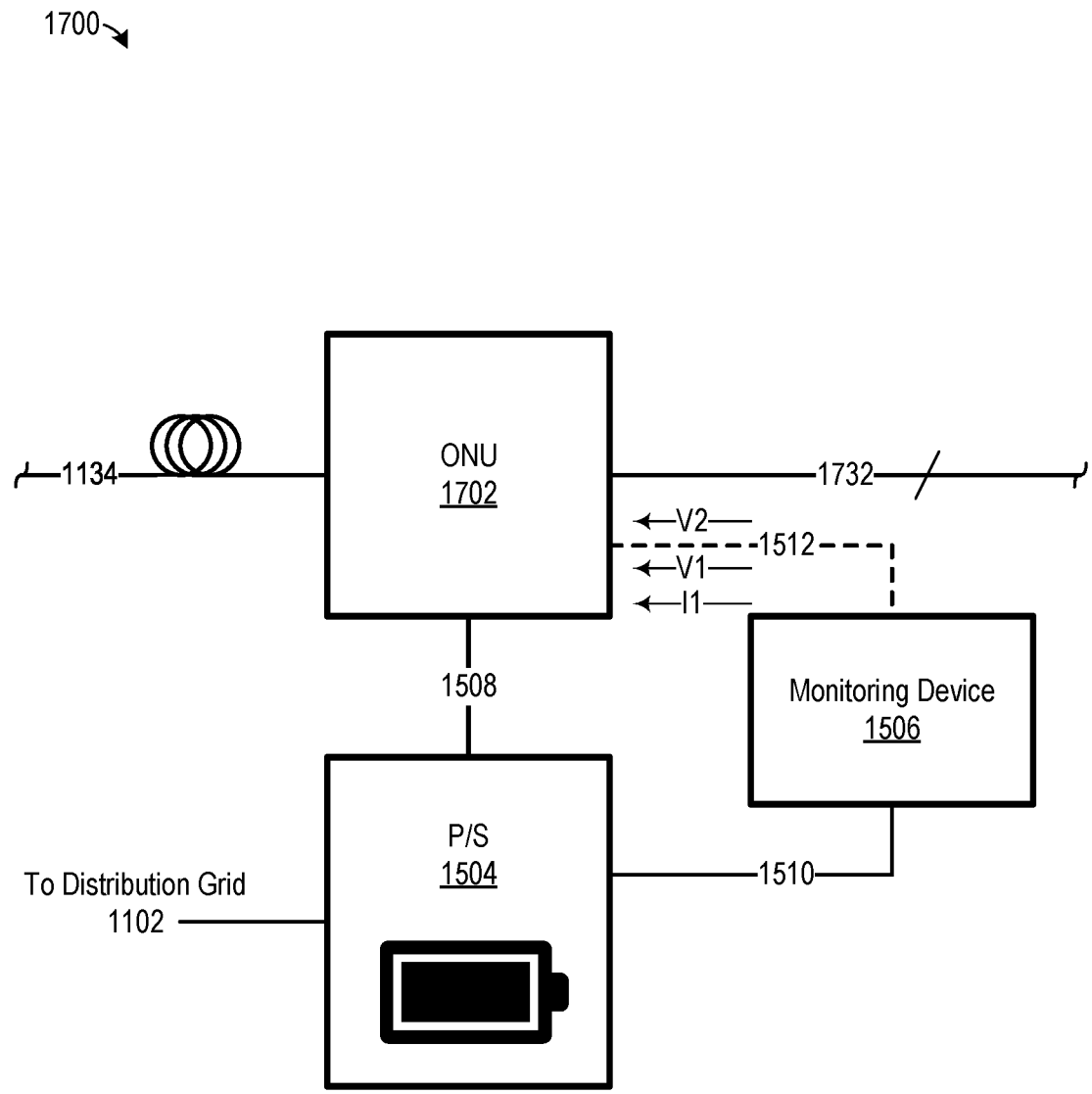
FIG. 17 is a block diagram of a node site including an optical network unit, according to an embodiment.

FIG. 17 is a block diagram of a node site 1700, which is an alternate embodiment of node site 1500 of FIG. 15 where cable fiber node 1502 is replaced with an optical network unit 1702. Optical network unit 1702 is an embodiment of fiber network node 1122 of FIG. 11. Optical network unit 1702 is configured to interface one or more twisted pair electrical cables 1732 (e.g., Ethernet electrical cables), which are embodiments of electrical cables 1132 of FIG. 11, with one or more optical cables 1134.

Figure 18:
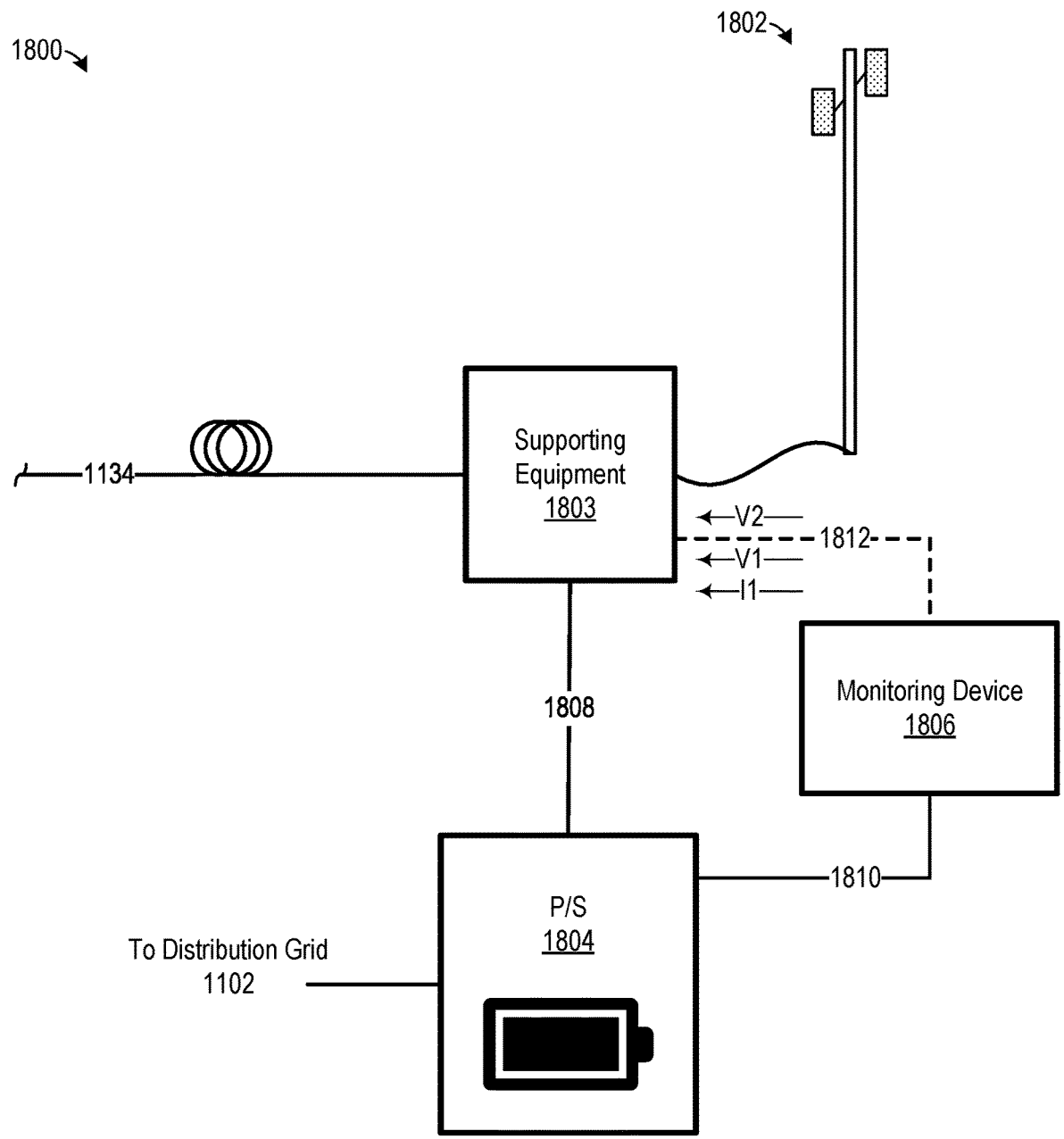
FIG. 18 is a block diagram of a node site including a wireless base station, according to an embodiment.

FIG. 18 is a block diagram of a node site 1800, which is a possible embodiment of node site 1123 of FIG. 11 where the node site is configured as a wireless base station instead of as a fiber network node. Node site 1800 includes an antenna structure 1802, supporting equipment 1803, a power supply 1804, and a monitoring device 1806. Antenna structure 1802 and supporting equipment 1803 collectively replace fiber network node 1122 of FIG. 11. Antenna structure 1802 is configured to send and receive wireless communication signals, including but not limited to, fourth generation (4G) cellular wireless communication signals, fifth generation (5G) cellular wireless communication signals, sixth generation (6G) cellular wireless communication signals, and/or Wi-Fi wireless communication signals. Supporting equipment 1803 is configured to interface antenna structure 1802 with one or more optical cables 1134. Supporting equipment 1803 includes, for example, an amplifier and baseband circuitry, although the actual elements of supporting equipment 1803 will depend on the radio access architecture of a wireless communication network including node site 1800.

Power supply 1804, which is an embodiment of power supply 1144 of FIG. 11, is configured to provide electrical power to supporting equipment 1803 and monitoring device 1806 via electrical buses 1808 and 1810, respectively. Power supply 1804 includes a backup electrical power source, as symbolically shown by a battery symbol, so that power supply 1804 is capable of powering supporting equipment 1803 and monitoring device 1806 even when electrical power grid 1102 is unavailable. Monitoring device 1806 encompasses each of sensors 1108, 1110, and 1112 which are internal to monitoring device 1806 and therefore are not shown in FIG. 18. Accordingly, monitoring device 1806 is configured to generate sensor data V1, I1, and V2, which is communicatively coupled to supporting equipment 1803 for transmission to aggregation server 1150, as symbolically shown by a logical connection 1812 between monitoring device 1806 and supporting equipment 1803. Logical connection 1812 need not be a physical connection between monitoring device 1806 and supporting equipment 1803. For example, monitoring device 1806 could instead be physically connected to a modem (not shown) in power supply 1804, where the modem is physically connected to supporting equipment 1803, such that sensor data V1, I1, and V2 is transmitted to supporting equipment 1803 via power supply 1804.

Figure 19:
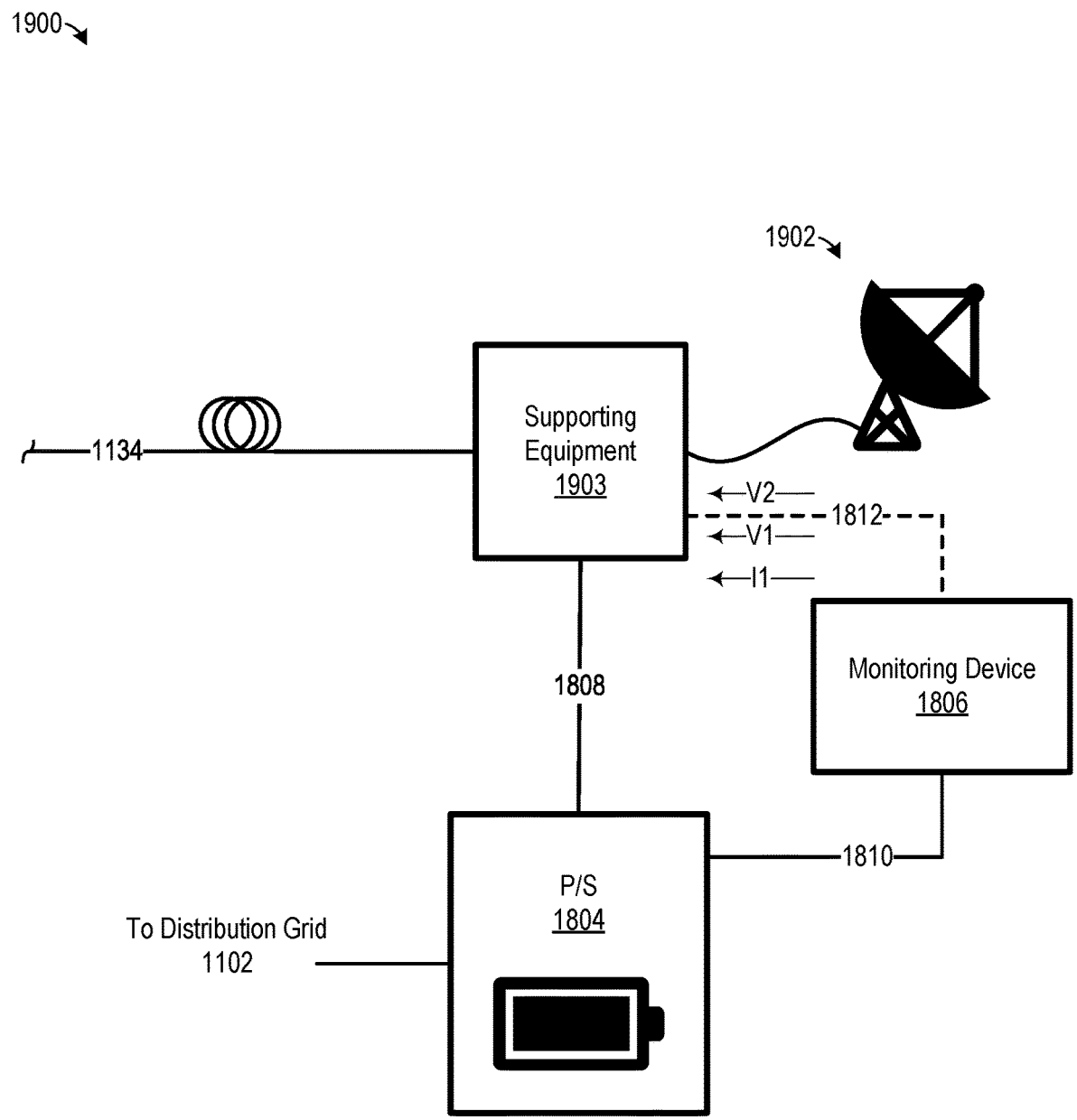
FIG. 19 is a block diagram of a node site including a satellite ground station, according to an embodiment.

FIG. 19 is a block diagram of a node site 1900, which is an alternate embodiment of node site 1800 of FIG. 18 where wireless base station antenna structure 1802 and support equipment 1803 are replaced with a satellite antenna 1902 and supporting equipment 1903, respectively. Accordingly, node site 1900 is a satellite ground station node site instead of a wireless base station ground site. Supporting equipment 1903 is configured to interface satellite antenna 1902 with one or more optical cables 1134.

Figure 20:
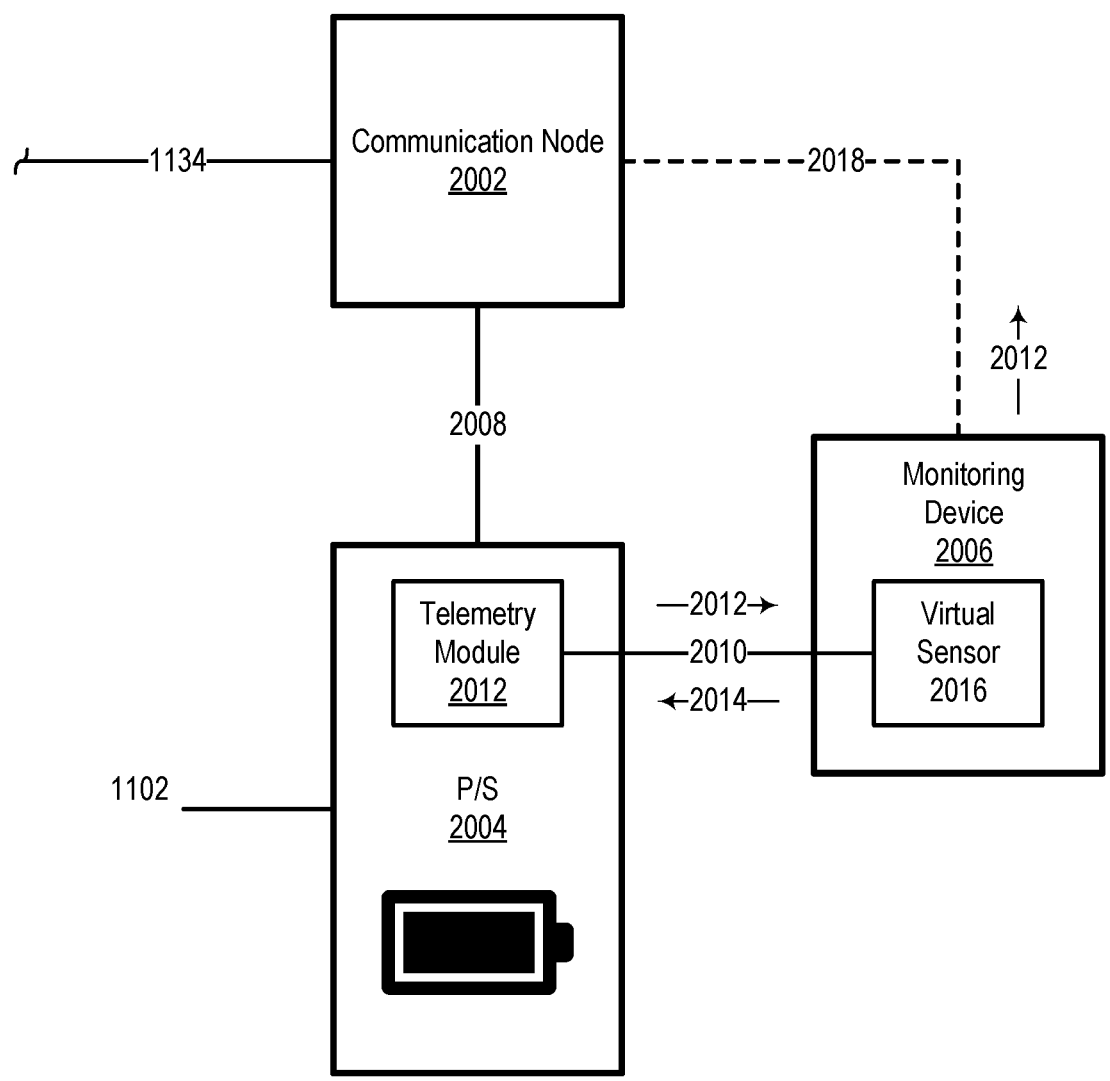
FIG. 20 is a block diagram of a node site including a virtual sensor, according to an embodiment.

FIG. 20 is a block diagram of a node site 2000, which is another possible embodiment of node site 1123 of FIG. 11. Node site 200 includes a communication node 2002, a power supply 2004, and a monitoring device 2006. Communication node 2002 replaces fiber network node 1122 of FIG. 11, and communication node 2002 could be any communication node that interfaces with one or more optical cables 1134. For example, communication node 2002 could be a fiber network node, a wireless base station, or a satellite ground station. Power supply 2004, which is an embodiment of power supply 1144 of FIG. 11, is configured to provide electrical power to communication node 2002 and monitoring device 2006 via electrical buses 2008 and 2010, respectively. Power supply 2004 includes a backup electrical power source, as symbolically shown by a battery symbol, so that power supply 2004 is capable of powering communication node 2002 and monitoring device 2006 even when electrical power grid 1102 is unavailable. Power supply 2004 further includes a telemetry module 2012 configured to provide sensor data 2012 from sensors internal to power supply 2004 in response to a polling request 2014.

Monitoring device 2006 and power supply 2004 collectively embody sensors 1108, 1110, and 1112. Specifically, monitoring device 2006 implements a virtual sensor 2016 which generates polling requests 2014 and receives sensor data 2012 from telemetry module 2012, where sensor data 2012 includes sensor data equivalent to sensor data V1, I1, and V2 of FIG. 11. Virtual sensor 2016, in turn, streams sensor data 2012 from telemetry module 2012 to communication node 2002, for transmission to aggregation server 1150 via communications network 1104, as symbolically shown by a logical connection 2018 between monitoring device 2006 and communication node 2002. Logical connection 2018 need not be a physical connection between monitoring device 2006 and communication node 2002. For example, monitoring device 2006 could instead be physically connected to a modem (not shown) in power supply 2004, where the modem is physically connected to communication node 2002, such that sensor data 2012 is transmitted to communication node 2002 via power supply 2004.

Figure 21:
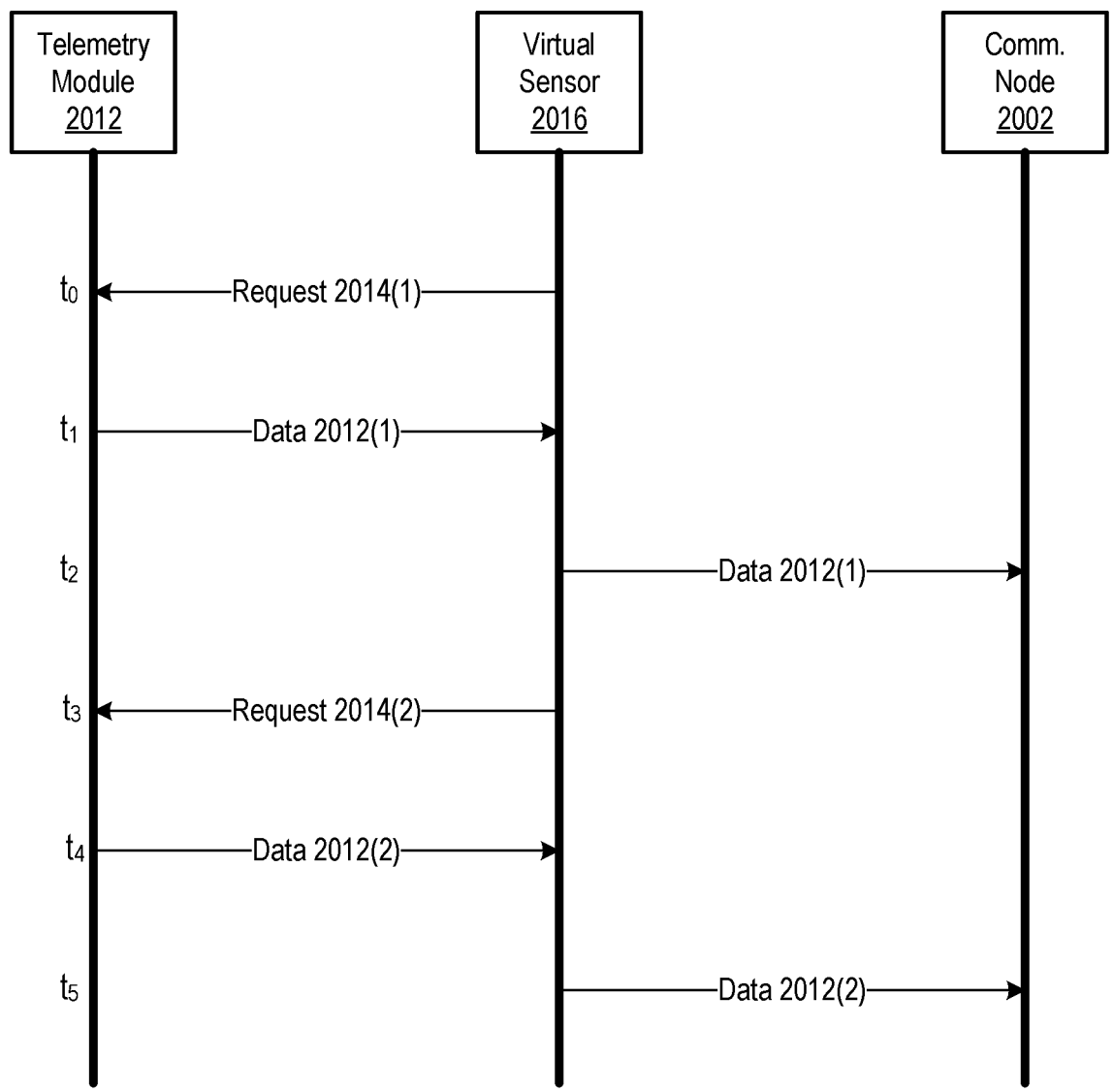
FIG. 21 is a dataflow diagram illustrating an example of operation of the FIG. 20 virtual sensor.

FIG. 21 is a dataflow diagram 2100 illustrating an example of operation of virtual sensor 2016. At time to, virtual sensor 2016 sends a polling request 2014(1) to telemetry module 2012. Telemetry module 2012 responds to the polling request at time $t_1$ by sending sensor data 2012(1) to virtual sensor 2016. Virtual sensor 2016 then sends sensor data 2012(1) to communication node 2002 at time $t_2$. Virtual sensor 2016 sends another polling request 2014(2) to telemetry module 2012 at time $t_3$, and telemetry module 2012 responds at time $t_4$ by sending sensor data 2012(2) to virtual sensor 2016. Virtual sensor 2016 then sends sensor data 2012(2) to communication module 2002 at time $t_5$. The above-described process repeats so that virtual sensor 2016 streams sensor data 2012 generated within power supply 2004 to communication node 2002. Each instance of sensor data 2012 includes data from the same sensors, but each instance of sensor data 2012 includes sensor data captured at a different time. For example, sensor data 2012(2) includes data from the same sensors as sensor data 2012(1), but sensor data 2012(2) was captured later than sensor data 2012(1). In some embodiments, telemetry module 2012 provides timing data (not shown) as well as sensor data 2012 in response to a polling request 2014, such as for synchronizing sensor data.

Figure 22:
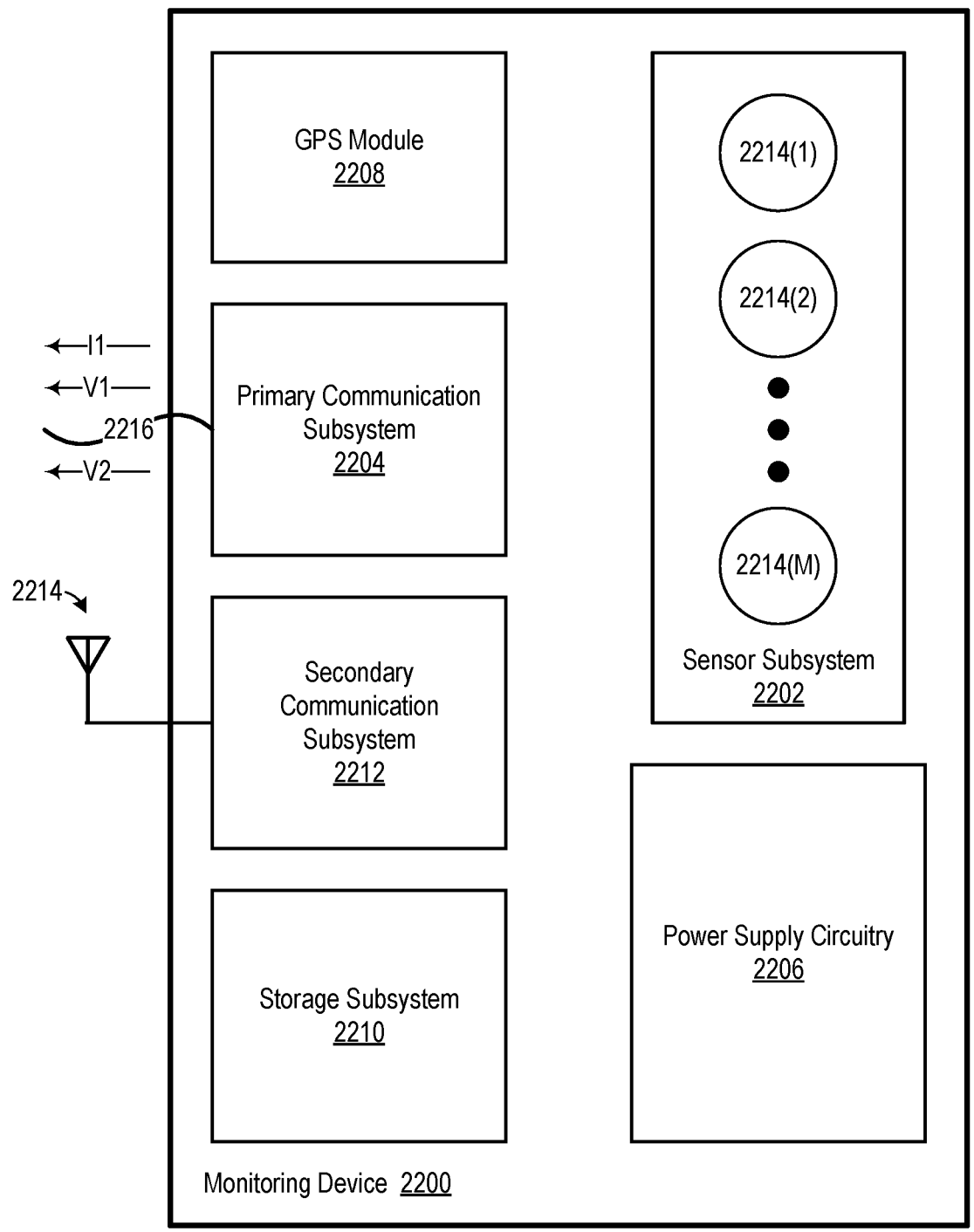
FIG. 22 is a block diagram of a monitoring device, according to an embodiment.

FIG. 22 is a block diagram of a monitoring device 2200, which is one possible embodiment of each of monitoring devices 1506 (FIGS. 15-17) and 1806 (FIGS. 18 and 19). Monitoring device 2200 includes a sensor subsystem 2202, a primary communication subsystem 2204, and power supply circuitry 2206. Monitoring device 2200 optionally further includes one or more of a GPS module 2208, a storage subsystem 2210, and a secondary communication subsystem 2212. Sensor subsystem 2202 includes M sensor elements 2214, where M is an integer greater than or equal to one. Each sensor element 2214 may be configured to sense essentially any characteristic, such as voltage, current, temperature, humidity, visible light, infrared light, ultraviolet light, radio-frequency signals, air quality, smoke, radiation, electromagnetic pulses, audio, moisture, etc. Although sensor elements 2214 are depicted as being single elements, one or more sensor elements 2214 may be formed of multiple constituent elements. For example, a sensor element 2214 configured to sense current may include a current transformer connected to amplifier circuitry via one or more cables.

Primary communication subsystem 2204 is configured to stream sensor data generated by each sensor element 2214 to a remote network node (e.g., aggregation server 1150) via a communication medium 2216, where sensor data generated by each sensor element 2214 is sent as a separate data stream. Communication medium 2216 is, for example, a wireline communication medium, such as an optical cable or an electrical cable. In some embodiments, primary communication subsystem 2204 is configured to generate respective data packets for each sensor element 2214, such as data packets complying with a RDTP, where the data packets include sensor data generated by the sensor element. For example, consider an embodiment of monitoring device 2200 configured to implement sensors 1108, 1110, and 1112 of node site 1123 of FIG. 11. In this embodiment, sensor element 2214(1) is a voltage sensor configured to generate sensor data V1, sensor element 2214(2) is a current sensor configured to generate sensor data I1, and sensor element 2214(3) is a voltage sensor configured to generate sensor data V3. Primary communication subsystem 2204 is configured to stream each of sensor data V1, I1, and V2 as a separate data stream via communication medium 2216 in a lossless manner, such as using a RDTP.

Power supply circuitry 2206 is configured to power the elements of monitoring device 2220, including sensing elements 2214 and primary communication subsystem 2204, from an electrical power source of a network node hosting monitoring device 2220. For example, in the above-discussed embodiment of monitoring device 2200 configured to implement node site 1123, power supply circuitry 2206 is configured to power monitoring device 2200 from power supply 1144 of node site 1123.

Optional GPS module 2208 is configured to generate timing data and/or location data, such as for primary communication subsystem 2204 to include in data packets containing sensor data. Optional storage subsystem 2210 is configured to locally store sensor data generated by sensing elements 2214, such as to enable the sensor data to be obtained off-line if there is no communications network available to transmit the sensor data in real-time. Secondary communication subsystem 2212 is configured to serve as a partial or full backup to primary communication subsystem 2204, such as if communication medium 2216 is disrupted. In some embodiments, secondary communication subsystem 2212 includes a wireless transceiver 2214, such that secondary communication subsystem 2212 can establish a wireless communication link with another device, such as another monitoring device 2200 instance. In certain embodiments, wireless transceiver 2214 complies with a LoRa (long range) modulation standard.

Figure 23:
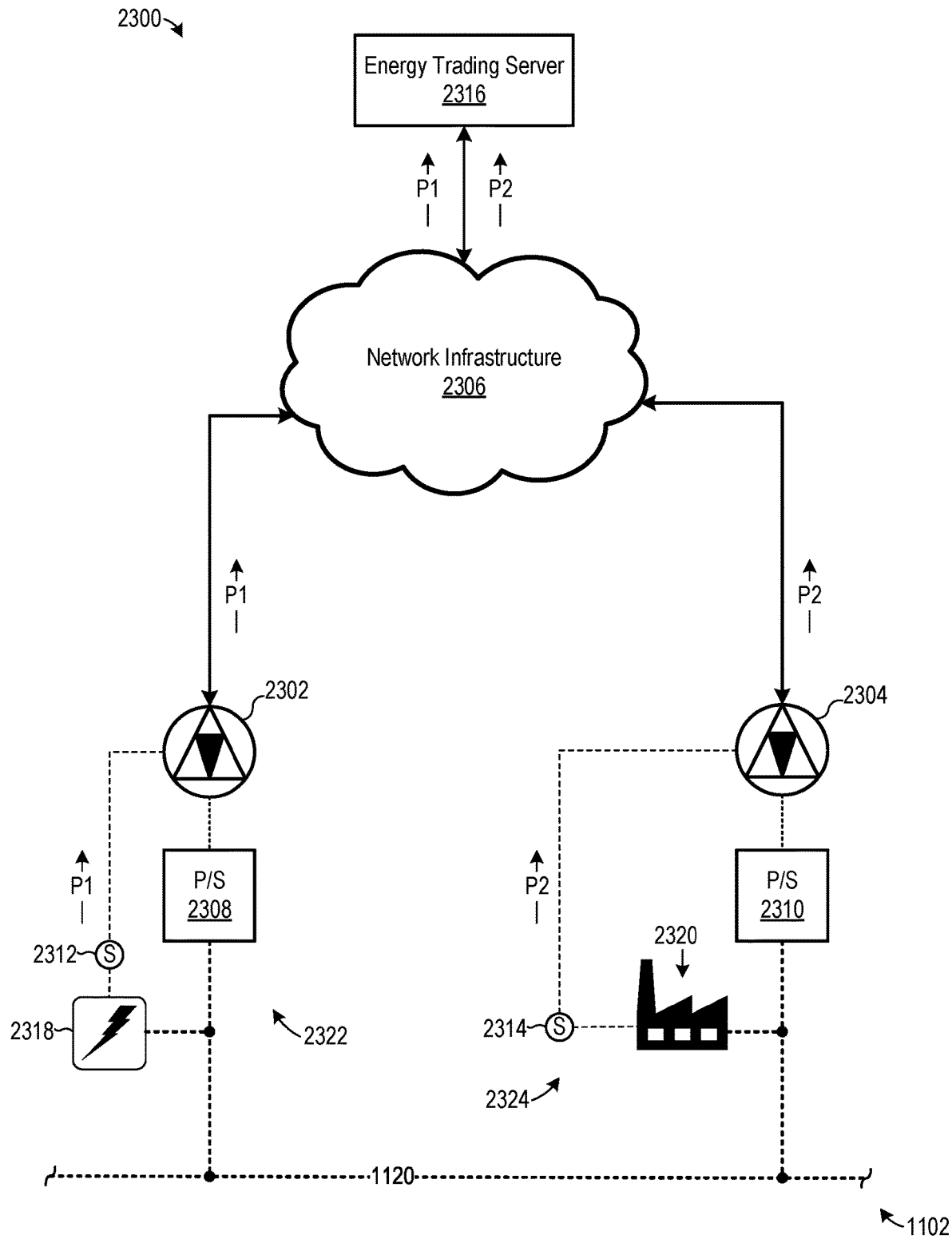
FIG. 23 is a block diagram of an alternate embodiment of the FIG. 11 system that is configured to verify energy trading transactions on an electrical power grid.

The systems disclosed above could also be configured to support energy trading, such as trading of electrical power via an electrical power grid, by verifying energy trading transactions. For example, FIG. 23 is a block diagram of a system 2300, which is an alternate embodiment of system 1100 (FIG. 11) that is configured to verifying energy trading transactions performed using electrical power grid 1102. System 2300 includes fiber network nodes 2302 and 2304, network infrastructure 2306, power supplies 2308 and 2310, sensors 2312 and 2314, an energy trading server 2316, an electrical power supplier 2318, and an electrical power consumer 2320. Fiber network nodes 2302 and 2304 are located at node sites 2322 and 2324 respectively, and fiber network nodes 2302 and 2304 are similar to fiber network nodes 1122, 1124, and 1126 of FIG. 11. Power supply 2308 is located at node site 2322, and power supply 2308 is configured to electrically power fiber network node 2302 and sensor 2312 from electrical power grid 1102. Similarly, power supply 2310 is located at network node site 2324 and is configured to electrically power fiber network node 2304 and sensor 2314 from electrical power grid 1102. Accordingly, power supplies 2308 and 2310 are similar to power supplies 1144, 1146, and 1148 of FIG. 11. Network infrastructure 2306, which is similar to network infrastructure 1128 of FIG. 11, is configured to communicatively couple elements of system 2300, such as fiber node 2302, fiber node 2304, and energy trading server 2316, with each other. Network infrastructure 2306 is optionally further configured to communicatively couple elements of system 2300 with external resources (not shown), such as the public Internet and/or one or more external communications networks.

Electrical power supplier 2318, which is located at or near node site 2322, is configured to provide electrical power to electrical power grid 1102. In some embodiments, electrical power supplier 2318 includes a photovoltaic system, a wind farm, a fossil fuel power plant, an energy storage system, an electrical utility, etc. Electrical power consumer 2320, which is located at or near node site 2324, is configured to consume electrical power from electrical power grid 1120. Electrical power consumer 2320 may include, for example, a residence, a business, an energy storage system, another electrical utility, etc.

Figure 24:
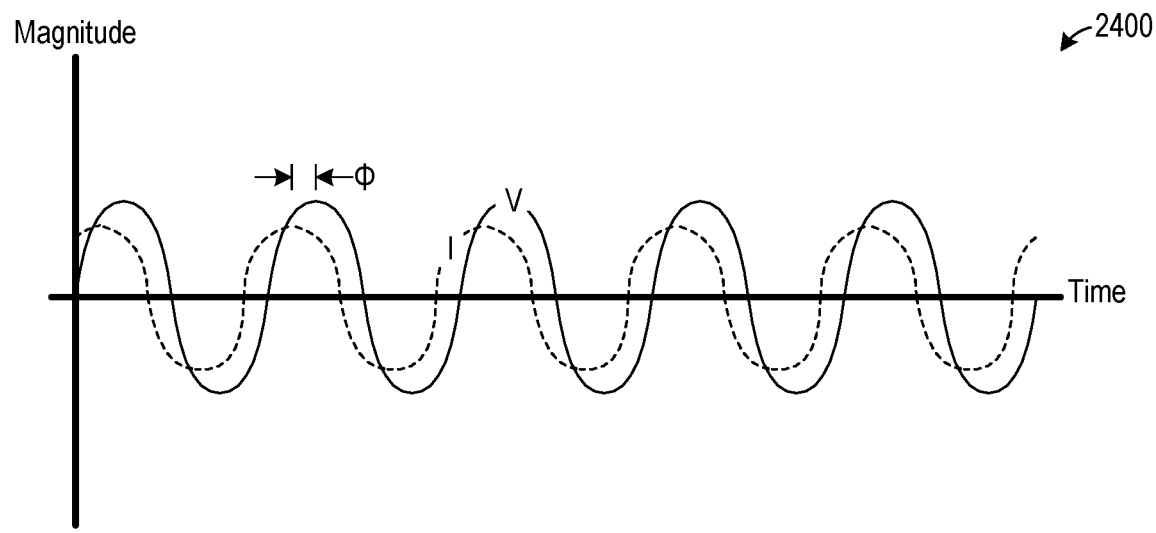
FIG. 24 is a graph illustrating one example of sensor data generated in the FIG. 23 system.

Sensor 2312 is configured to generate sensor data P1 establishing that electrical power supplier 2318 is providing electrical power to electrical power grid 1102, and sensor 2312 is configured to send sensor data P1 to energy trading server 2316 via fiber network node 2302 and network infrastructure 2306. In some embodiments, sensor 2312 is configured to continuously stream sensor data P1 to energy trading server 2316, such as using a RDTP. Sensor 2312 and/or energy trading server 2316 are optionally configured to embed sensor data P1 in a blockchain to prove its authenticity. In some embodiments, sensor data P1 includes waveforms, such as current and voltage waveforms, which can be analyzed to confirm positive transfer of electrical power from electrical power supplier 2318 to electrical power grid 1102. In some other embodiments, sensor data P1 includes power data itself. FIG. 24 is a graph 2400 illustrating one example of sensor data P1 where the sensor data includes waveforms which can be analyzed to confirm that electrical power supplier 2318 is supplying electrical power to electrical power grid 1102. In the FIG. 24 example, sensor data P1 includes data representing voltage (V) and current (I) waveforms at an output of electrical power supplier 2318. Phase offset $\phi$ between the voltage and current waveforms can be used to determine direction of power transfer, and root-mean-square (RMS) magnitudes of the current and voltage waveforms can be used to determine power transfer magnitude.

Referring again to FIG. 23, some embodiments of electrical power supplier 2318 are configured to inject a code on power line 1120. The code indicates, for example, an identity of electrical power supplier 2318, whether electrical power supplier 2318 is providing electrical power to electrical power grid 1102, and/or a magnitude of electrical power provided to electrical power grid 1102. In some embodiments, sensor 2312 is configured to recognize the code and include the code, or data representing the code, in sensor data P1. In some other embodiments, sensor 2312 is configured to capture waveforms on power line 1120 including the code, and sensor 2312 is configured to include these waveforms in sensor data P1, such as to enable energy trading server 2316 to recognize the code.

Electrical power supplier 2318 is configured to inject a code on power line 1120, for example, by modulating amplitude and/or frequency of current supplied to power line 1120. Alternately or additionally, electrical power supplier 2318 may be configured to inject an out-of-band, e.g., high frequency, modulated carrier wave on power line 1120, where the modulation of the carrier wave represents the code.

Figure 25:
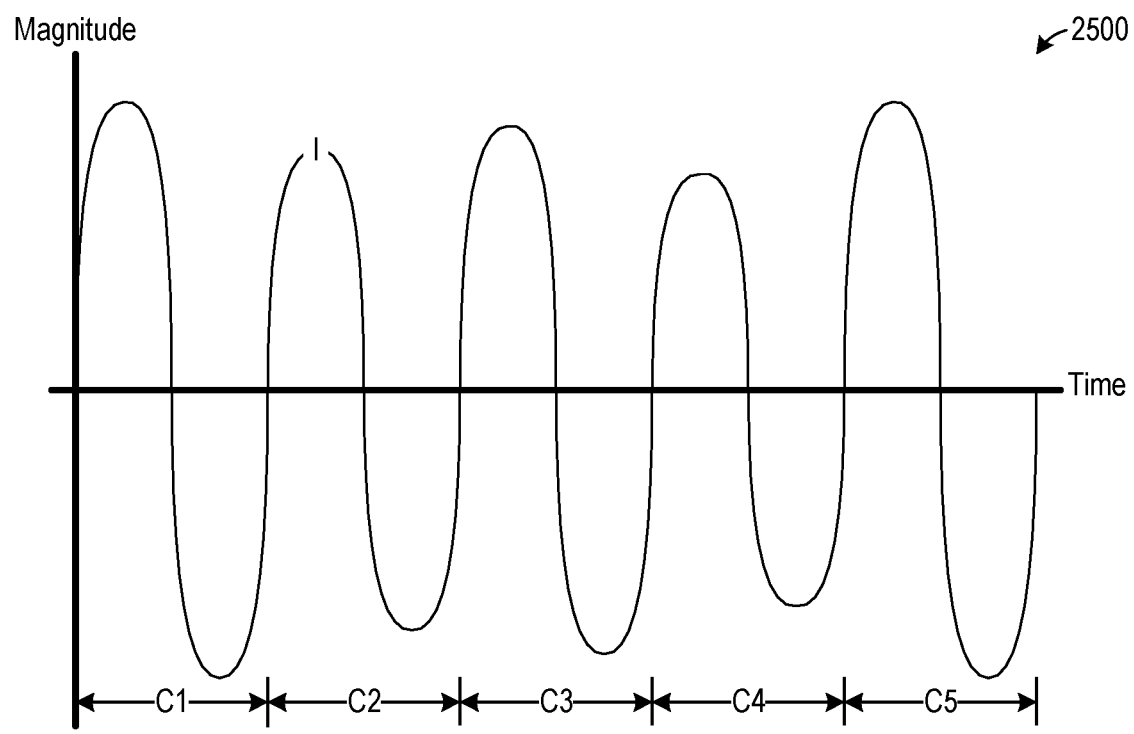
FIG. 25 is a graph illustrating one example of how an electrical power supplier of the FIG. 23 system may inject a code on a power line.

FIG. 25 is a graph 2500 illustrating one example of electrical power supplier 2318 modulating magnitude of current (I) supplied to electrical power grid 1102 to represent a code. In this example, the code is expressed by a sequence of current waveform amplitudes over four cycles, i.e., cycles C1-C4, and the sequence starts over again in the fifth cycle, i.e., cycle C5. The current waveform amplitude in each cycle may have two or more different values, and the amplitude value of each cycle C1-C4 collectively determines the code.

Referring again to FIG. 23, sensor 2314 is configured to generate sensor data P2 establishing that electrical power consumer 2320 consumed electrical power from electrical power grid 1102, and sensor 2314 is configured to send sensor data P2 to energy trading server 2316 via fiber network node 2304 and network infrastructure 2306. In some embodiments, sensor 2314 is configured to continuously stream sensor data P2 to energy trading server 2316, such as using a RDTP. Sensor 2314 and/or energy trading server 2316 are optionally configured to embed sensor data P2 in a blockchain to prove its authenticity. In some embodiments, sensor data P2 includes waveforms, such as current and voltage waveforms, which can be analyzed to confirm positive transfer of electrical power from electrical power grid 1102 to electrical power consumer 2320. In some other embodiments, sensor data P2 includes power data itself.

Energy trading server 2316 is configured to confirm from sensor data P1 that electrical power supplier 2318 provided electrical power to electrical power grid 1102, and energy trading server 2316 is configured to confirm from sensor data P2 that electrical power consumer 2320 consumed electrical power from electrical power grid 1102. Accordingly, energy trading server 2316 can confirming energy trading via electrical power grid 1102. In some embodiments, energy trading server 2316, sensor 2312, and sensor 2314 are operated by a different party than either of electrical power supplier 2318 or electrical power consumer 2320, such that confirmation received from energy trading server 2316 may be considered unbiased.

FIG. 26 illustrates one example of a data packet payload 2600 complying with a raw data transport protocol. The FIG. 26 payload is binary, and the associated data packets are User Datagram Protocol (UDP) data packets. Certain embodiments of the FIG. 26 payload are used, for example, when generating data packets in the FIG. 11 system to send sensor data from one network node to another. The following is a description of the FIG. 26 fields:

HdrVer: an 8-bit field indicating a header version.

TimeSrc: a 4-bit field indicating a type of time source used to provide the fields TimeSeconds and TimeNs. Table 4 below lists possible values of TimeSrc.

TABLE 4

TimeSrc Values

| Value | Source |
| --- | --- |
| 0 | None (Free running, zero-based) |
| 1 | GPS |
| 2 | NTP (Network Time Protocol) |
| 3 | IEEE1588 Precision Time Protocol |
| 4-15 | Reserved |

MintType: a 4-bit field indicating the units of the measurement. Bits 0-2 indicate the units or measurement as shown in Table 5 below. Bit 3 indicates whether a measurement is absolute or RMS as shown in Table 6 below.

TABLE 5

| Value | \multicolumn{7}{c}{Units} |
|---|---|---|---|---|---|---|---|
| | Voltage | Current | Power | Temp. | Humidity | Pressure | Acceleration |
| 0 | Millivolts | Milliamps | MilliWatts/ MilliVA | Degrees Celsius | Percentage Relative Humidity | Pascal | Meters per Second per Second |
| 1 | Volts | Amps | W/VA | Degrees Fahrenheit | Grams/ Cubic Meter | Bar | G |
| 2 | Kilovolts | Kiloamps | kW/kVA | Degrees Kelvin | Dew Point Celsius Square Inch | Pounds per | |
| 3 | | | | | Dew Point Fahrenheit | | |
| 4-7 | Reserved | | | | | | |

TABLE 6

MmtType Bit 3 Values

| Value | Source |
|---|---|
| 0 | Absolute |
| 1 | RMS |

SensorType: an 8-bit field indicating the sensor type, as shown in Table 7 below.

TABLE 7

SensorType Values

| Value | Source |
|---|---|
| 0 | Undefined |
| 1 | DC Voltage |
| 2 | AC Voltage |
| 3 | DC Current |
| 4 | AC Current |
| 5 | Active Power |
| 6 | Reactive Power |
| 7 | Apparent Power |
| 8 | Temperature |
| 9 | Humidity |
| 10 | Barometric Pressure |
| 11 | Speed (wind) |
| 12 | Direction (wind) |
| 13 | Accelerometer - 1 axis |
| 14 | Accelerometer - 2 axis |
| 15 | Accelerometer - 3 axis |
| 16-255 | Reserved |

Seq: a 4-bit rolling packet sequence number. The sequence number increments with each transmitted packet and rolls to zero, and the sequence number provides an indicator of dropped packets in a packet stream.

Flags: a 4-bit value containing flags, as shown in Table 8 below.

TABLE 8

| Bit | Flags Source |
|---|---|
| 0 | 1 indicates presence of Latitude/Longitude/Altitude fields. If zero, these fields are absent from the packet payload (the payload is 12 bytes shorter). |
| 1-3 | Reserved |

SensorID: a 32-bit value in network byte order indicating the sensor ID. For multi-sensor devices, the ID for each sub-sensor, e.g., sensor element, (and hence data stream) should be unique.

TimeSeconds: a 32-bit value in network byte order expressing time in seconds since a baseline. For a free running time source, the baseline is seconds since device boot. For other time sources, this field is GPS-UTC time, expressed as seconds since midnight, Jan. 5-Jan. 6, 1980, including leap seconds.

TimeNs: a 32-bit value in network byte order expressing fractional seconds in nanoseconds.

LaRes: a six-bit value expressing Latitude Resolution in bits. This field indicates the number of valid bits in the fixed-point value of Latitude. A value of zero indicates unknown Latitude. This field should be zero if Flags bit zero is zero.

LoRes: a six-bit value expressing Longitude Resolution in bits. This field indicates the number of valid bits in the fixed-point value of Longitude. A value of zero indicates unknown Longitude. This field should be zero if Flags bit zero is zero.

AltRes: a six-bit value expressing Altitude Resolution in bits. This field indicates the number of valid bits in the fixed-point value of Altitude. A value of zero indicates unknown altitude. This field should be zero if Flags bit zero is zero.

Reserved: a 14-bit reserved value which should be zero.

Latitude: a 32-bit, network byte order fixed point value consisting of 9 bits of signed integer and 23 bits of fraction. Positive number are north of the equator, and negative numbers are south of the equator.

Longitude: a 32-bit, network byte order fixed point value consisting of 9 bits of signed integer and 23 bits of fraction. Positive numbers are east of the prime meridian, and negative numbers are west of the prime meridian.

Altitude: a 30-bit, network byte order fixed-point value in meters, consisting of a 22-bit signed integer and 8-bit fraction.

Rsv: a 2-bit reserved value that should be zero.

SampleCount: a 16-bit network byte order count of samples following the header.

SampleWidth: an 8-bit value indicating the width of each sample in bits. This is used to advance between samples in the packet.

SampleFormat: an 8-bit field indicating the format of each sample, as shown in Table 9 below.

TABLE 9

| | SampleFormat |
|---|---|
| Bit | Source |
| 0-5 | Number of bits in the sample. In this is less than the SampleWidth, the data is the lowest significant bits of the sample field. |
| 6 | Absolute/Delta. Zero indicates the sample value is absolute, 1 indicates the sample value is a delta from prior sample. |
| 7 | Signed. Zero indicates unsigned sample value, 1 indicates signed sample value. |

SampleRate: a 32-bit network byte order signed value indicating sample rate. Positive values indicate samples per second, and negative values indicate seconds per sample.

SampleFSDInt: a 24-bit value containing integer part of full scale (or positive full scale) measurement, as defined by SampleFormat and SensorType, in the units of MmtType.

SampleFSDFrac: an 8-bit value containing fractional part of full scale (or full positive scale) measurement, as defined by SampleFormat, in the units of MmtType.

Samples: this is where N samples are stored, where N is defined by SampleCount. The number of bits each sample occupies is defined by SampleWidth. The interpretation of each sample is defined by SensorType, SampleFormat, and MmtType. If a sample uses fewer bits than SampleWidth, the samples will be in the lower bits, and the upper bits should be zero.

The concept of continuously sending raw, lossless sensor data to another network node is not limited to use at telecommunications system node sites. To the contrary, the concept can be applied to essentially any application where it is desirable to provide lossless sensor (or at least substantially lossless) data to a remote node in real-time, such as for stream processing of the sensor data. For example, the concept may be used in medical applications, such as to enable real-time remote monitoring of potentially fast-changing medical data, such as pulse rate, oxygen level, heart rate, breathing rate, etc.

Figure 27:
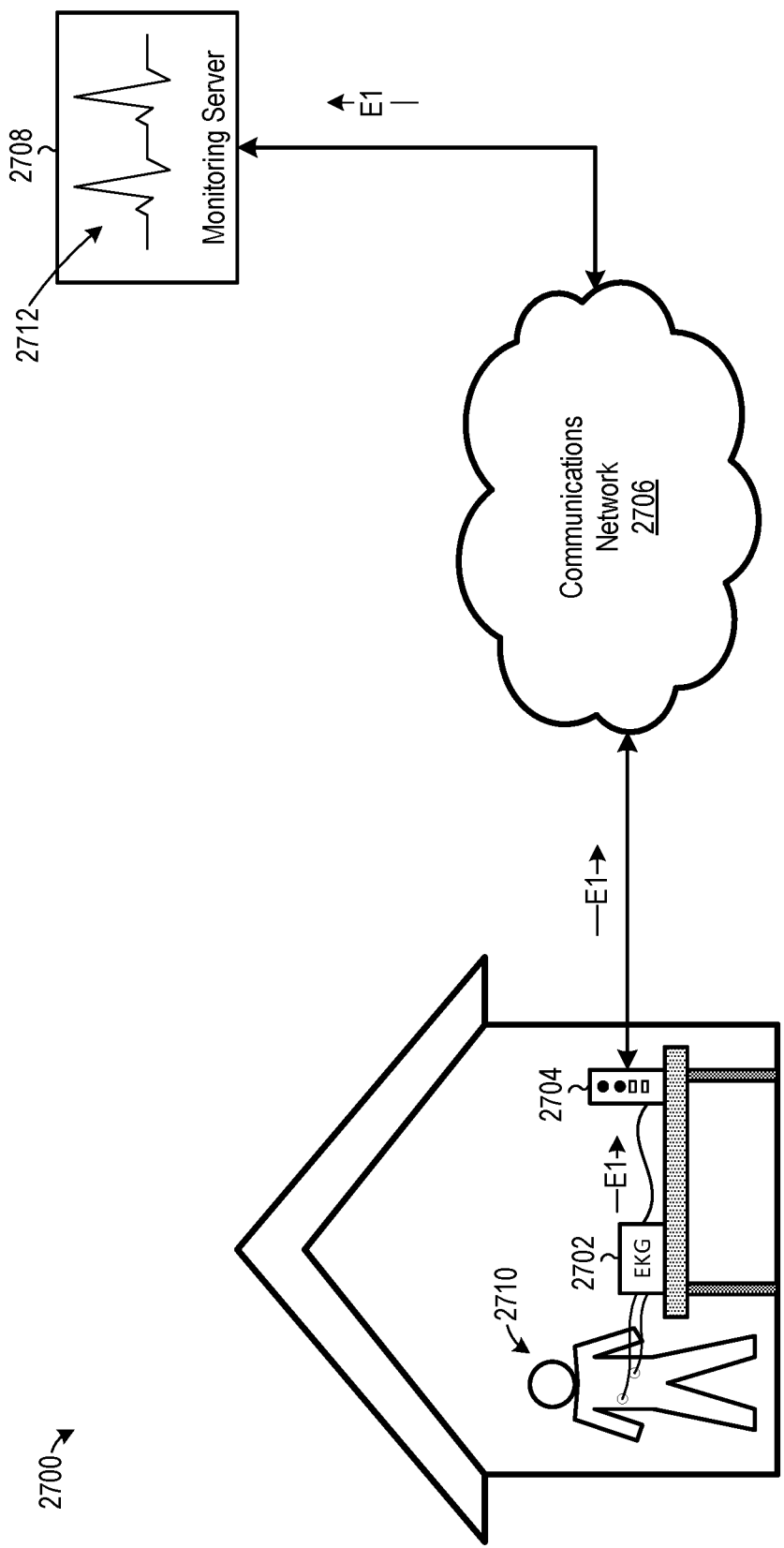
FIG. 27 is a block diagram of a system for remotely monitoring electrocardiogram data in real-time, according to an embodiment.

For example, FIG. 27 is a block diagram a system 2700 for remotely monitoring electrocardiogram (EKG) data in real-time. System 2700 includes an EKG machine 2702, network termination equipment 2704, a communications network 2706, and a monitoring server 2708. EKG machine 2702 is configured to generate sensor data E1 from a patient 2710, where sensor data E1 represents EKG data of patient 2702. EKG machine 2710 is configured to continuously send all generated sensor data E1 to network termination equipment 2704, such as using a RTDP. Network termination equipment 2704, which includes, for example, a modem or optical network termination (ONT), interfaces EKG machine 2702 with communications network 2706. Communications network 2706 includes, for example, a cable communications network, a wireline telecommunications network, and/or a wireless telecommunications network. Communications network 2706 transfers sensor data E1 from network termination equipment 2704 to monitoring server 2708. Monitoring server 2708 is configured to generate EGK waveforms 2712 from sensor data E1, where EGK waveforms 2712 represent real-time EGK information from patient 2710.

It should be noted that the methods described herein describe possible implementations, and that the operations and the steps may be rearranged or otherwise modified and that other implementations are possible. Further, aspects from two or more of the methods may be combined.

The various illustrative blocks and modules described in connection with the disclosure herein may be implemented or performed with a general-purpose processor, a digital signal processor (DSP), an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

In the following specification and the claims, reference will be made to a number of terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc —read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for remote monitoring, comprising:
   generating first sensor data from a first sensor in communication with a first network node of a communications network, the first network node being powered from an electrical power distribution grid that is separate from the communications network, the first network node being configured to provide communication services to one or more locations that are powered by the electrical power distribution grid; and
   sending the first sensor data from the first sensor to a second network node that is remote from the first network node, via the communications network.

2. The method of claim 1, wherein sending the first sensor data from the first sensor to the second network node comprises sending the first sensor data via a secure connection between the first sensor and the second network node.

3. The method of claim 1, wherein there is a backup electrical power source at the first network node that is capable of powering the first network node when the electrical power distribution grid is unavailable to provide electrical power.

4. The method of claim 1, wherein the first sensor data is raw sensor data generated by the first sensor.

5. The method of claim 1, wherein sending the first sensor data from the first sensor to the second network node comprises sending the first sensor data from the first sensor to the second network node in real-time.

6. The method of claim 1, wherein the first sensor data is substantially lossless.

7. The method of claim 1, further comprising generating data packets for transmission from the first sensor to the second network node, the data packets including the first sensor data.

8. A method for remote monitoring, comprising:
generating first sensor data from a first sensor at a first network node of a communications network, the first network node being powered from an electrical power distribution grid that is separate from the communications network;
generating data packets for transmission from the first sensor to a second network node that is remote from the first network node, the data packets including the first sensor data and complying with a raw data transmission protocol (RDTP); and
sending the data packets from the first sensor to the second network node via the communications network.

9. The method of claim 8, wherein the RDTP is a binary protocol.

10. The method of claim 7, further comprising including timing data in the data packets.

11. The method of claim 7, further comprising including location data in the data packets.

12. The method of claim 1, further comprising establishing a first private network encompassing the first sensor and the second network node.

13. The method of claim 12, wherein the first private network is selected from the group consisting of a virtual private network and a Micronet.

14. The method of claim 1, further comprising storing the first sensor data at the first network node.

15. The method of claim 1, further comprising storing a first subset of the first sensor data at the first network node while the communications network is unavailable.

16. The method of 1, wherein the first sensor is selected from the group consisting of a voltage sensor, a current sensor, a temperature sensor, a humidity sensor, a visible light sensor, an infrared light sensor, an ultraviolet light sensor, a radio-frequency signal sensor, an air quality sensor, a smoke sensor, a radiation sensor, an electromagnetic pulse sensor, a motion sensor, an audio sensor, and a moisture sensor.

17. The method of claim 1, wherein the first sensor is a virtual sensor.

18. The method of claim 1, wherein the first sensor data represents a characteristic of the electrical power distribution grid at the first network node.

19. The method of claim 1, wherein the first network node is one or more of a cable fiber node, a telecommunications remote terminal (RT), an optical network unit (ONU), a cellular wireless base station, and a satellite ground station.

* * * * *